US007864167B2

(12) United States Patent
Morosawa et al.

(10) Patent No.: US 7,864,167 B2
(45) Date of Patent: Jan. 4, 2011

(54) DISPLAY DEVICE WHEREIN DRIVE CURRENTS ARE BASED ON GRADATION CURRENTS AND METHOD FOR DRIVING A DISPLAY DEVICE

(75) Inventors: Katsuhiko Morosawa, Higashiyamato (JP); Tomoyuki Shirasaki, Higashiyamato (JP)

(73) Assignee: Casio Computer Co., Ltd., Tokyo (JP)

( * ) Notice: Subject to any disclaimer, the term of this patent is extended or adjusted under 35 U.S.C. 154(b) by 1558 days.

(21) Appl. No.: 10/532,889

(22) PCT Filed: Oct. 29, 2003

(86) PCT No.: PCT/JP03/13819

§ 371 (c)(1), (2), (4) Date: Apr. 27, 2005

(87) PCT Pub. No.: WO2004/040543

PCT Pub. Date: May 13, 2004

(65) Prior Publication Data

US 2006/0139251 A1 Jun. 29, 2006

(30) Foreign Application Priority Data

| | | | |
|---|---|---|---|
| Oct. 31, 2002 | (JP) | ............................. | 2002-317225 |
| Nov. 28, 2002 | (JP) | ............................. | 2002-345876 |
| Apr. 8, 2003 | (JP) | ............................. | 2003-103871 |
| Jun. 16, 2003 | (JP) | ............................. | 2003-170376 |

(51) Int. Cl.
*G06F 3/038* (2006.01)

(52) U.S. Cl. ...................................................... 345/204

(58) Field of Classification Search .............. 315/169.3, 315/169.4; 345/76, 77, 204; 313/498, 495
See application file for complete search history.

(56) References Cited

U.S. PATENT DOCUMENTS 6,266,000 B1 7/2001 Jusuf et al.

(Continued)

FOREIGN PATENT DOCUMENTS

CN 1402208 A 3/2003

(Continued)

OTHER PUBLICATIONS

Japanese Office Action (and English translation thereof) dated Dec. 18, 2008, issued in counterpart Japanese Application JP 2003-186270 of related U.S. Appl. No. 10/880,298.

*Primary Examiner*—Richard Hjerpe
*Assistant Examiner*—Shaheda A Abdin
(74) *Attorney, Agent, or Firm*—Frishauf, Holtz, Goodman & Chick, P.C.

(57) ABSTRACT

A display device that displays image information in response to a digital display signal includes a display panel signal lines and scanning lines which intersect at right angles with each other, and a plurality of display pixels with optical elements arranged near the intersecting points of the signal lines and scanning lines. A signal driver circuit has a plurality of current generation circuits including a drive current generation circuit for generating drive current from a plurality of gradation currents based on the display signal value supplied to each of the scanning lines, a scanning driver circuit for sequentially applying a scanning signal to each of the scanning lines for setting the selection state of each line of each display pixel, and a gradation current generation circuit for generating gradation currents according to each display signal bit at least based on a constant predetermined reference current.

52 Claims, 54 Drawing Sheets

U.S. PATENT DOCUMENTS

| | | | |
|---|---|---|---|
| 6,323,631 | B1 | 11/2001 | Juang |
| 6,528,951 | B2 * | 3/2003 | Yamazaki et al. ........ 315/169.3 |
| 6,556,176 | B1 * | 4/2003 | Okuyama et al. ............. 345/76 |
| 6,765,560 | B1 | 7/2004 | Ozawa |
| 6,777,885 | B2 | 8/2004 | Koyama |
| 6,882,186 | B2 | 4/2005 | Nishitoba |
| 7,012,597 | B2 | 3/2006 | Kasai |
| 7,091,937 | B2 | 8/2006 | Nakamura |
| 7,256,756 | B2 | 8/2007 | Abe |
| 2002/0021293 | A1 | 2/2002 | Tam |
| 2002/0041276 | A1 | 4/2002 | Kimura |
| 2002/0084812 | A1 | 7/2002 | Nishitoba |
| 2002/0135314 | A1 | 9/2002 | Kitahara et al. |
| 2003/0040149 | A1 * | 2/2003 | Kasai ......................... 438/200 |
| 2003/0048669 | A1 | 3/2003 | Abe |
| 2003/0058199 | A1 | 3/2003 | Kasai |
| 2003/0128200 | A1 | 7/2003 | Yumoto |
| 2003/0151616 | A1 | 8/2003 | Morita |
| 2004/0075621 | A1 | 4/2004 | Shiuan et al. |
| 2004/0108998 | A1 | 6/2004 | Imamura |
| 2004/0239668 | A1 | 12/2004 | Morosawa et al. |
| 2004/0263437 | A1 | 12/2004 | Hattori |
| 2005/0017765 | A1 | 1/2005 | Sasaki et al. |
| 2005/0017931 | A1 | 1/2005 | Toyoshima et al. |
| 2005/0057580 | A1 | 3/2005 | Yamano et al. |
| 2005/0157581 | A1 | 7/2005 | Shiurasaki et al. |
| 2007/0217275 | A1 | 9/2007 | Abe |

FOREIGN PATENT DOCUMENTS

| | | | |
|---|---|---|---|
| DE | 100 28 598 | A1 | 3/2001 |
| EP | 0 365 445 | A2 | 4/1990 |
| EP | 1 039 440 | A1 | 9/2000 |
| EP | 1 061 497 | A1 | 12/2000 |
| EP | 1 182 636 | A2 | 2/2002 |
| EP | 1 282 103 | A2 | 2/2003 |
| EP | 1288901 | A2 | 3/2003 |
| EP | 1 333 422 | A1 | 8/2003 |
| JP | 04-042619 | A | 2/1992 |
| JP | 07-202599 | A | 8/1995 |
| JP | 8-129359 | A | 5/1996 |
| JP | 10-93436 | A | 4/1998 |
| JP | 2000-105574 | A | 4/2000 |
| JP | 2000-122608 | A | 4/2000 |
| JP | 2000-340842 | A | 12/2000 |
| JP | 2002-140041 | A | 5/2002 |
| JP | 2002-202823 | A | 7/2002 |
| JP | 2003-122303 | A | 4/2003 |
| JP | 2003-150082 | A | 5/2003 |
| JP | 2003-150112 | A | 5/2003 |
| JP | 2003-150115 | A | 5/2003 |
| JP | 2003-195812 | A | 7/2003 |
| JP | 2003-195815 | A | 7/2003 |
| JP | 2003-308043 | A | 10/2003 |
| JP | 2004-037656 | A | 2/2004 |
| JP | 2004-054234 | A | 2/2004 |
| KR | 1988-0014748 | A | 12/1988 |
| KR | 2000-0073726 | A | 12/2000 |
| KR | 2001-0007609 | A | 1/2001 |
| WO | WO 02/17289 | A1 | 2/2000 |
| WO | WO 01/06484 | A1 | 1/2001 |
| WO | WO 02/39420 | A1 | 5/2002 |
| WO | WO 03/023752 | A1 | 3/2003 |
| WO | WO 03/027998 | A1 | 4/2003 |

OTHER PUBLICATIONS

Japanese Office Action (and English translation thereof) dated Aug. 20, 2008, issued in counterpart Japanese Application JP 2003-186270 of related U.S. Appl. No. 10/880,298.

Japanese Office Action (and English translation thereof) dated May 27, 2008, issued in counterpart Japanese Application JP 2003-103871.

Japanese Office Action (and English translation thereof) dated May 27, 2008, issued in counterpart Japanese Application JP 2003-103876.

Japanese Office Action (and English translation thereof) dated Aug. 20, 2008, issued in counterpart Japanese Application JP 2003-103876.

Joon-Chul Goh et al; A New Pixel Circuit for Active Matrix Organic Light Emitting Diodes; IEEE Electron Device Letters, vol. 23, No. 9, Sep. 2002; pp. 544-546.

S.C. Tan et al; Designing of Circuit Building Blocks for OLED-on-Silicon Microdisplays; SID; 2002 Digest; pp. 980-983.

Goh, Joon-Chul, et al, “A New Pixel Circuit for Active Matrix Organic Light Emitting Diodes”, IEEE Electron Device Letters, vol. 23, No. 9, Sep. 2002, pp. 544-546.

Tan, S.C. et al, “Designing of Circuit Building Blocks for OLED-on-Silicon Microdisplays”, SID, 2002 Digest, pp. 980-983, School of Electrical & Electronic Engineering, pp. 980-983.

Related U.S. Appl. No. 10/855,584, filed May 26, 2004; Inventors: Katsuhiko Morisawa et al; Title: Display Device and Method for Driving Display Device.

Related U.S. Appl. No. 10/880,298, filed Jun. 28, 2004; Inventors: Tsuyoshi Toyoshima et al; Title: Current Generation Supply Circuit and Display Device.

Related U.S. Appl. No. 10/891,904, filed Jul. 14, 2004; Inventors: Kazuhiro Sasaki et al; Title: Current Generation Supply Circuit and Display Device.

Goh, Joon-Chul, et al, “A New Pixel Circuit for Active Matrix Organic Light Emitting Diodes”, IEEE Electron Device Letters, vol. 23, No. 9, Sep. 2002, pp. 544-546.

Tan, S.C. et al, “Designing of Circuit Building Blocks for OLED-on-Silicon Microdisplays”, SID, 2002 Digest, pp. 980-983, School of Electrical & Electronic Engineering, pp. 980-983.

* cited by examiner

A-A CROSS-SECTION

B-B CROSS-SECTION

DISPLAY DEVICE WHEREIN DRIVE CURRENTS ARE BASED ON GRADATION CURRENTS AND METHOD FOR DRIVING A DISPLAY DEVICE

This application is a U.S. National Phase Application under 35 USC 371 of International Application PCT/JP2003/013819 filed Oct. 29, 2003.

BACKGROUND OF THE INVENTION

This invention relates to a display device which displays desired image information on a display panel comprising a plurality of display pixels which have current drive type optical elements, and more particularly regarding a display device and the method for driving the display device.

In recent years, personal computer and visual equipment monitors with an electronic screen called a Cathode Ray Tube (CRT) are fast becoming obsolete with the emergence of flat panel display devices, such as Liquid Crystal Display (LCD) flat panel monitors, at an astonishing rate. In particular, LCD's are commonplace because they offer some real advantages over other display technologies. They are thinner, lighter and draw much less power than conventional CRT's. LCD's are all around us everyday as they come in all shapes and sizes ranging from large screen televisions to small laptop computers and Personal Digital Assistants (PDA's), and even smaller cellular phones, digital cameras and many other electronic devices.

As the display device (display) of the next generation following in this revolutionary LCD technology, such as organic electroluminescent (EL) devices (hereinafter referred to as organic EL devices), inorganic electroluminescent elements (hereinafter referred to as inorganic EL elements), or Light Emitting Diodes (LEDs) and the like, full-scale application of the self-light type display (display device) comprising a display panel configured with self-light type light emitting elements called active matrix is evolving. Specifically, an active matrix is a type of LCD where each display element (each pixel) includes an active component such as a transistor to maintain its state between scans, and is also known as Thin-Film Transistor or TFT.

In such a self-light generation display, notably, a self-light type display which applies an active matrix drive method as compared with LCD's, the display speed response is fast with an unrestricted viewing angle. Also, higher luminosity, higher contrast, high definition display panels with much lower power consumption and the like are inevitable in the future. Since backlight is not needed in such an LCD display, it has very predominant characteristics that still more thinly shaped and lightweight models are possible.

This particular type of display panel, briefly, is comprises an array of display pixels which contain light emitting elements arranged near each of the intersecting points of the signal lines and in the direction of the scanning lines set in the line writing direction; a scanning driver applies sequentially scanning signals to predetermined timing and sets the display pixels of a specified line in a selection state; and a data driver generates write-in current (drive current) according to the display data which is supplied to each of the display pixels via signal lines and the above-mentioned write-in current is supplied to each of the display pixels. Each of the light emitting elements performs a light generation operation by predetermined luminosity gradation according to the display data, and the desired image information is displayed on the display panel. Afterwards, the configuration of a self-light generation type display will be described.

In the display drive operation of such a display, individual write-in currents are generated which have a current value according to the display data from the data driver to a plurality of display pixels and supplied simultaneously to the display pixels of a specified line selected by the scanning driver. This is in contrast to a current specification type drive method which repeats successively an operation to make each light emitting element emit light by predetermined luminosity gradation for each line of one screen and the display pixels of a specified line selected by a scanning driver. A Pulse Width Modulation (PWM) type drive method and the like which repeats successively for one screen an operation which supplies constant drive current of a constant value from the data driver, individual time width (signal width) according to the display data, and makes each of the light emitting elements emit light by predetermined luminosity gradation is commonly known.

However, there is a problem in the light emitting element type display mentioned above and the fact they do suffer from this drawback will be explained below.

Specifically, the data driver generates the write-in current according to the display data corresponding to each of the display pixels and the above-mentioned write-in current changes according to the display data in a conventional configuration and a conventional drive controlling method, which are supplied to the display pixels via each of the signal lines connected to an output terminal of the data driver. Thus, the current supplied to a circuit arrangement of transistors, latch circuits and the like which are individually formed in the data driver corresponding to each of the signal lines from a predetermined current source will also change. Here, generally a capacitative element (wiring capacity) exists in the signal wiring. Consequently, current supplied from the above-mentioned current source to the data driver, when supplied to the circuit arrangement via the signal wiring for current supply, the operation which alters the current supplied from the current source is equivalent to the charge or discharging of predetermined electric potential in parasitic capacitance which exists in the signal wiring. As a result, when the current supplied via the signal wiring is extremely low, the charge and discharge operation of the signal wiring for current supply takes time, and by the time the electric potential of the signal lines are stabilized, a relatively lengthy period will be required.

On the other hand, the operational period assigned to a current holding operation and the like in each of the signal lines becomes brief and attains high-speed operation essential in the data driver so the number of signal lines increases in proportion to the buildup of the number of display pixels of the display panel.

However, as mentioned above, the charge and discharge operation of the current supply in the signal wiring requires a certain amount of time, particularly; the current value of the write-in current supplied via the signal lines to the display panel in connection with miniaturization of the display panel or high definition (high resolution) and the like becomes low. It has disadvantages in the amount of time required in the charge and discharge operation of the signal wiring increases, rate controlling of the operating speed of data driver due to the rate of the charge and discharge operation has to be performed and achieving favorable image quality becomes difficult.

Additionally, display devices comprising a conventional data driver are configured so the write-in current is generated according to the display data by the data driver and supplied to the display pixels via each signal line. However, because the write-in current is an analog signal which changes according to the light generation state of the light emitting elements, the signal is easily influenced by external noise or signal degradation which produces a decline or change in the light generation luminosity in the light emitting elements. This problem makes it difficult to obtain a stable image display in suitable luminosity gradation.

SUMMARY OF THE INVENTION

The present invention has been made in view of the circumstances mentioned above. Accordingly, the present invention has an advantage to provide a display device which displays image information in response to a display signal on a display panel which has display pixels that have current drive type optical elements to enhance the operating speed with regard to generation of drive current in response to the display signals supplied to the optical elements, even in the case of reduced drive current during periods of low gradation; to reduce the amount of time required for generation of the drive current; and to improve the display response characteristics with the resultant effect to achieve favorable display image quality.

To achieve the foregoing advantage, the first display device in the present invention comprises a display panel with a plurality of signal lines and a plurality of scanning lines which intersect at right angles with each other, and a plurality of display pixels with optical elements arranged near the intersecting point of the plurality of signal lines and the plurality of scanning lines; a scanning driver circuit for sequentially applying a scanning signal to each of the scanning lines for setting the selective state of each line of each display pixel; and a signal driver circuit comprises a plurality of current generation circuits; the current generation circuits comprise at least a gradation current generation circuit and a drive current generation circuit; the gradation current generation circuit generates a plurality of gradation currents corresponding to each of the display signal bits based on constant, predetermined reference current, and the drive current generation circuit generates drive current from a plurality of gradation currents based on the value of the display signals which supplies the generated drive current to each signal line.

According to the display device of this invention, each of the current generation circuits in the above-mentioned signal drive circuit further comprise a signal holding circuit which takes in and holds the display signal; selects and integrates the gradation currents according each bit value of the display signal from the plurality of gradation currents based on a value of the signals held in the signal holding circuit and generates drive current.

According to the present invention, each of the current generation circuits generate a plurality of gradation currents which comprises a plurality of gradation current transistors, wherein the channel width of each the gradation current transistors is set at a different ratio with each other specified by 2n. Each control terminal thereof is connected in parallel and the gradation currents flow in the current path of each of the gradation current transistors. Furthermore, each of the gradation current generation circuits comprise a reference voltage generation circuit for generating reference voltage based on the reference current. The reference voltage generation circuits comprise reference current transistors for generating reference voltage to the control terminals, and the reference current is supplied to the current path. The reference current transistor control terminals are connected in common to the control terminals of a plurality of gradation current transistors. The reference current transistors and the plurality of gradation current transistors constitute a current mirror circuit.

In addition, according to the present invention, the signal driver circuit comprises a configuration in which the reference current is supplied to a plurality of gradation current generation circuits. The reference current is supplied via a reference current supply line. Each of the gradation generation circuit comprises a supply control switching circuit for controlling the supply state of the reference current from the reference current supply line to the proper gradation current generation circuit. The supply control switching circuit synchronizes to timing when taking in and holding the display signals for the signal holding means in each of the current generation circuits, and selectively performs switching control so that the reference current is supplied only to any one of the gradation current circuits of the plurality of gradation current generation circuits.

According to the present invention, each of the current generation circuits comprise a specified state setting circuit for setting the signal line to a specified voltage which makes the optical elements drive in a specified operating state when the display signal has a specified value. The display signal specified value is a value from which all of each of the gradation currents is non-selected from the display signals. The specified voltage is the voltage for setting the optical elements drive in a state of lowest gradation.

In addition, according to the present invention, each of the current generation circuits further comprises a reset circuit for applying predetermined reset voltage to the signal lines in advance of the timing which supplies the drive current to the signal lines. The reset voltage is at least the low potential voltage for discharging the electric charge stored up in the capacitative element attached to the optical elements in the display pixels and for initializing the optical elements. The reset voltage is applied when the display signal specified value presupposes non-selection of all of the plurality of gradation currents.

Moreover, according to the present invention, the optical elements in the display pixels comprise light emitting elements for accomplishing light generation operation by way of luminosity gradation according to the current value of the supply current. For example, the optical elements have light emitting elements consisting of organic EL devices. The display pixels comprise at least a pixel driver circuit which has a voltage holding circuit for holding the voltage component in response to the drive current supplied by the signal driver circuit; and a current supply circuit for supplying luminescent drive current to the light emitting elements based on the voltage component held in the voltage holding circuit and for making the light emitting elements emit light. The current supply circuit comprises transistors for use of luminescent drive for supplying luminescent current to the light emitting elements.

To achieve the foregoing advantage, the second display device in the present invention set to a display device for displaying image information according to display signals consisting of digital signals comprises: (1) a display panel equipped with a plurality of display pixels equipped with a current generation circuit; the current generation circuit comprises a plurality of signal lines and a plurality of scanning lines which intersect at right angles with each other; at least optical elements formed of the current drive type and arranged close to the intersecting point of a plurality of signal lines and a plurality of scanning lines; a gradation current generation circuit for generating a plurality of gradation currents corresponding to each of the display signal bits based on predetermined, constant reference current; a drive current generation circuit for generating drive current based on the value of the display signals which supplies the drive current to the optical elements; (2) a scanning driver circuit for sequentially applying a scanning signal for setting the selective state of each line of each scanning line; and (3) a signal driver circuit for supplying the display signals to a plurality of signal lines.

According to the present invention, the current generation circuit comprises a signal holding circuit which takes in the display signals and holds the signals based on the value of the display signals held in the holding circuit; selects and integrates the gradation currents according each bit value of the display signal from the plurality of gradation currents; and generates drive current.

According to the present invention, according to the present invention, each of gradation current generation circuits generate a plurality of gradation currents which comprise a plurality of gradation current transistors, wherein the channel width of each of the gradation current transistors are set at a different ratio with each other specified by 2n. Each control terminal thereof is connected in parallel and the gradation currents flow in the current path of each of the gradation current transistors. Also, each of the gradation current generation circuits comprise a reference voltage generation circuit for generating reference voltage based on the reference current. The reference voltage generation circuits comprise reference current transistors for generating reference voltage to the control terminals, and the reference current is supplied to the current path. The reference current transistor control terminals are connected in common to the control terminals of a plurality of gradation current transistors. The reference current transistors and the plurality of gradation current transistors constitute a current mirror circuit.

According to the present invention, each of the current generation circuits comprise a specified state setting circuit for setting the signal line to a specified voltage which makes the optical elements drive in a specified operating state when the display signal has a specified value. The display signal specified value is a value from which all of each of the gradation currents is non-selected from the display signals. The specified voltage is the voltage for setting the optical elements drive in a state of lowest gradation.

In addition, according to the present invention, each of the current generation circuits further comprises a reset circuit for applying predetermined reset voltage to the signal lines in advance of the timing, which supplies the drive current to the signal lines. The reset voltage is at least the low potential voltage for discharging the electric charge stored up in the capacitative element added in the optical elements in the display pixels and for initializing the optical elements. The reset voltage is applied when the display signal specified value presupposes non-selection of all of the plurality of gradation currents.

According to the present invention, the optical elements in the display pixels comprise light emitting elements for accomplishing light generation operation by way of luminosity gradation according to the current value of the supply current. For example, the optical elements have light emitting elements consisting of organic EL devices.

Additionally, according to the present invention, the reference current transistors, the gradation current transistors and the light generation drive at least any has a configuration of transistors comprising a body terminal electrode.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE INVENTION

The present invention will hereinafter be described in detail with reference to the preferred embodiments shown in the accompanying drawings is applied to a display device and a drive method of the display device related to this invention.

First, the configuration of the data driver in the display device related to this invention or a current generation circuit is applied to a pixel driver circuit, and a controlling method of the current generation circuit will be explained with reference to the drawings.

1. Current Generation Circuit

<<The First Embodiment of a Current Generation Circuit>>

Initially, the first embodiment of the current generation circuit in the display device related to this invention will be explained with reference to the drawings.

Figure 1:
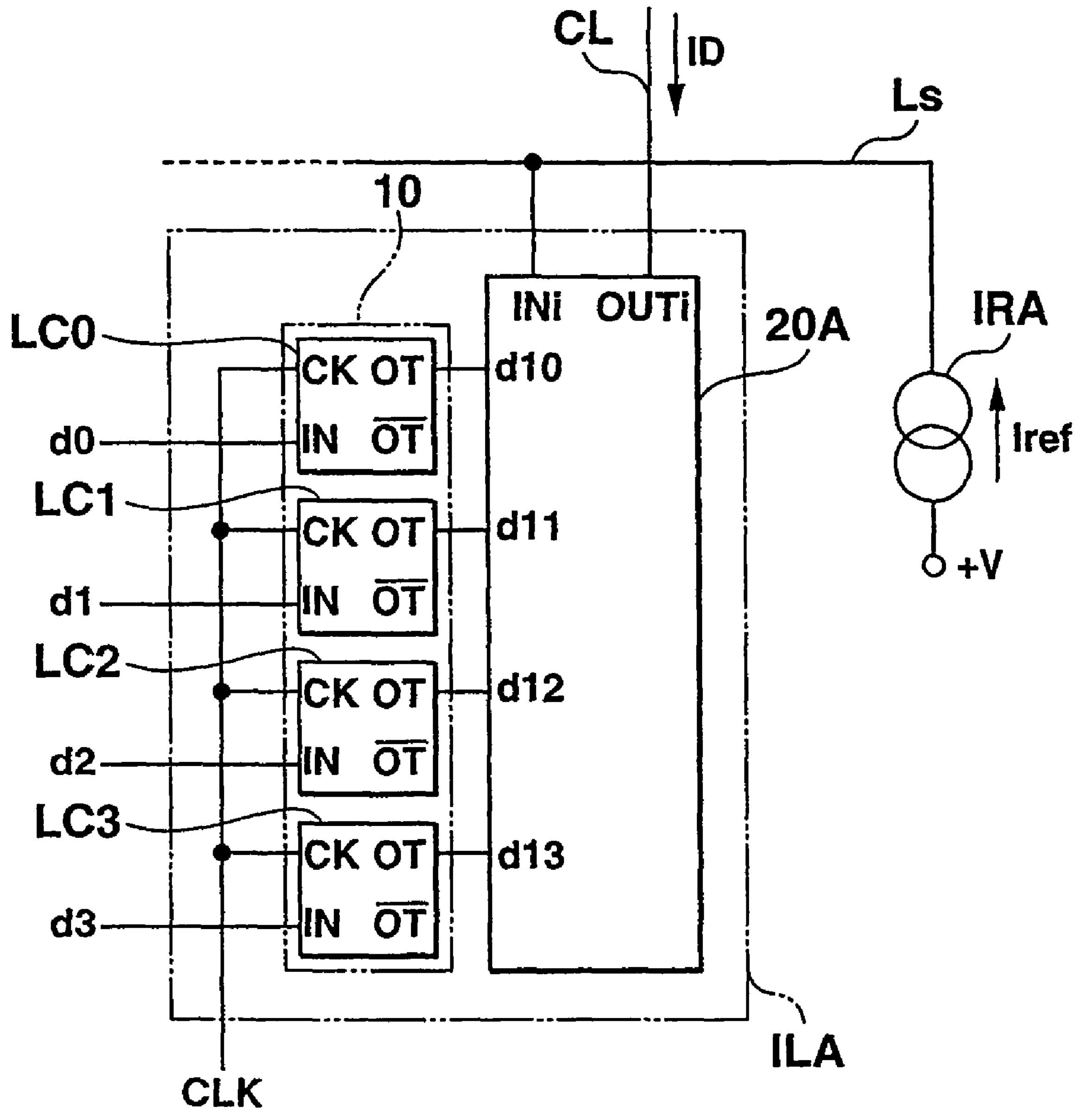
FIG. 1 is an outline block diagram showing the first embodiment of the current generation circuit in the display device related to this invention.

FIG. 1 is an outline block diagram showing the first embodiment of the current generation circuit in the display device related to this invention.

As shown in FIG. 1, the current generation circuit ILA related to this embodiment has a configuration formed with a signal latch section 10 (signal holding circuit) and a current generation section 20A. The signal latch section 10 comprises latch circuits LC0, LC1, LC2 and LC3 (LC0-LC3) which take in individually a plurality of bits (A case of four bits is illustrated in this embodiment) of the digital signals d0, d1, d2 and d3 (d0-d3) for specifying a current value and hold them (latch or latches, as applicable). A current generation section 20A outputs to a load current supply line CL connected to a load which takes in a reference current Iref that has a constant current value supplied from a current generator IRA, and generates a drive current ID that has a current value of a predetermined ratio as opposed to the reference current Iref based on the output signals d10, d11, d12 and d13 (d10-d13) output from the above-mentioned signal latch section 10 (each of the latch circuits (LC0-LC3).

Here, the current generator IRA is connected to a voltage contact +V connected to high supply voltage to flow reference current Iref in the direction of the current generation section 20A through a reference current supply line Ls.

Hereafter, the above-mentioned configuration will be explained in detail.

Figure 2:
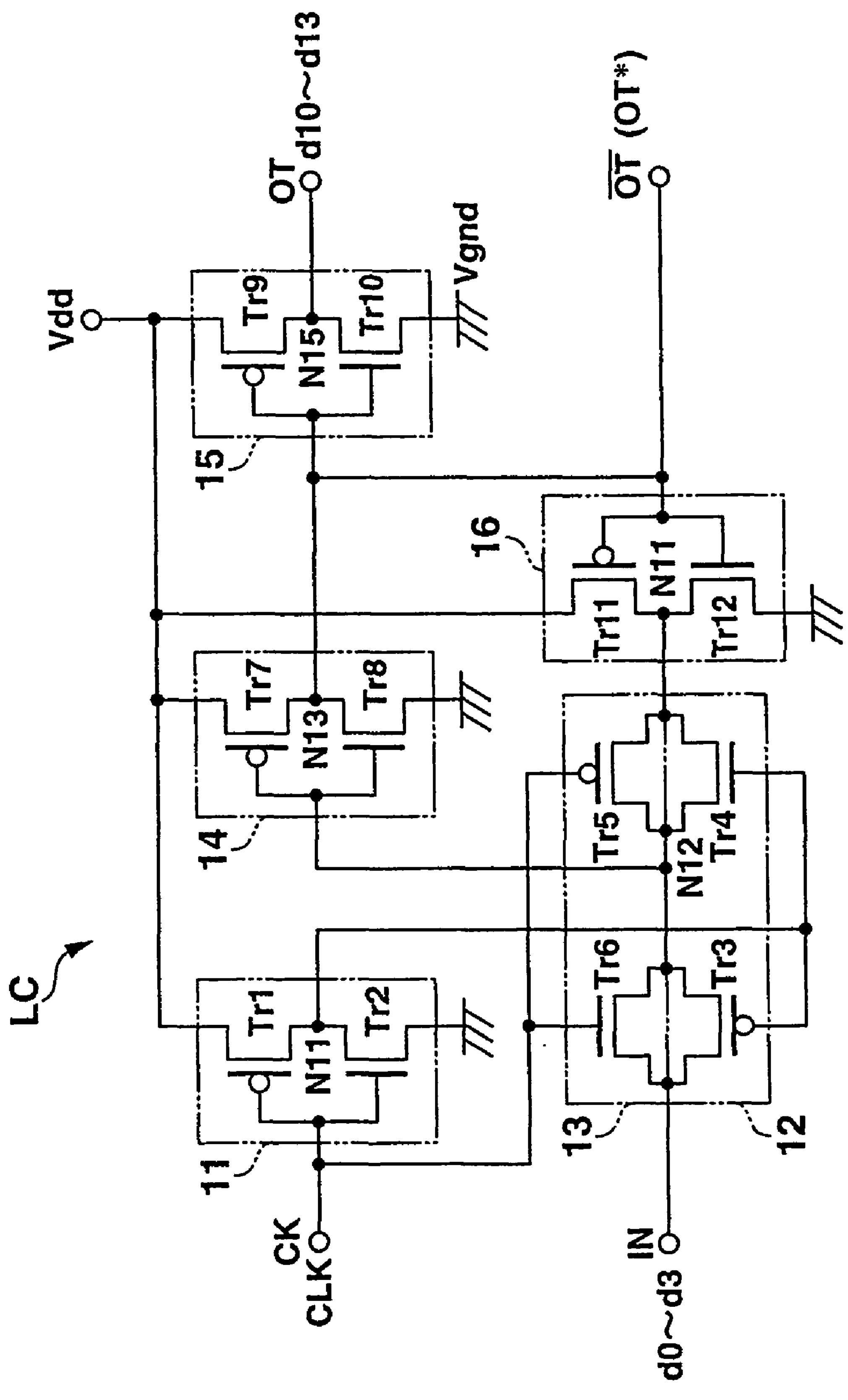
FIG. 2 is a circuit arrangement drawing showing one example of the latch circuits applied to the current generation circuit in this embodiment.

FIG. 2 is a circuit arrangement drawing showing one example of the latch circuits applied to the current generation circuit in this embodiment.

Figure 3:
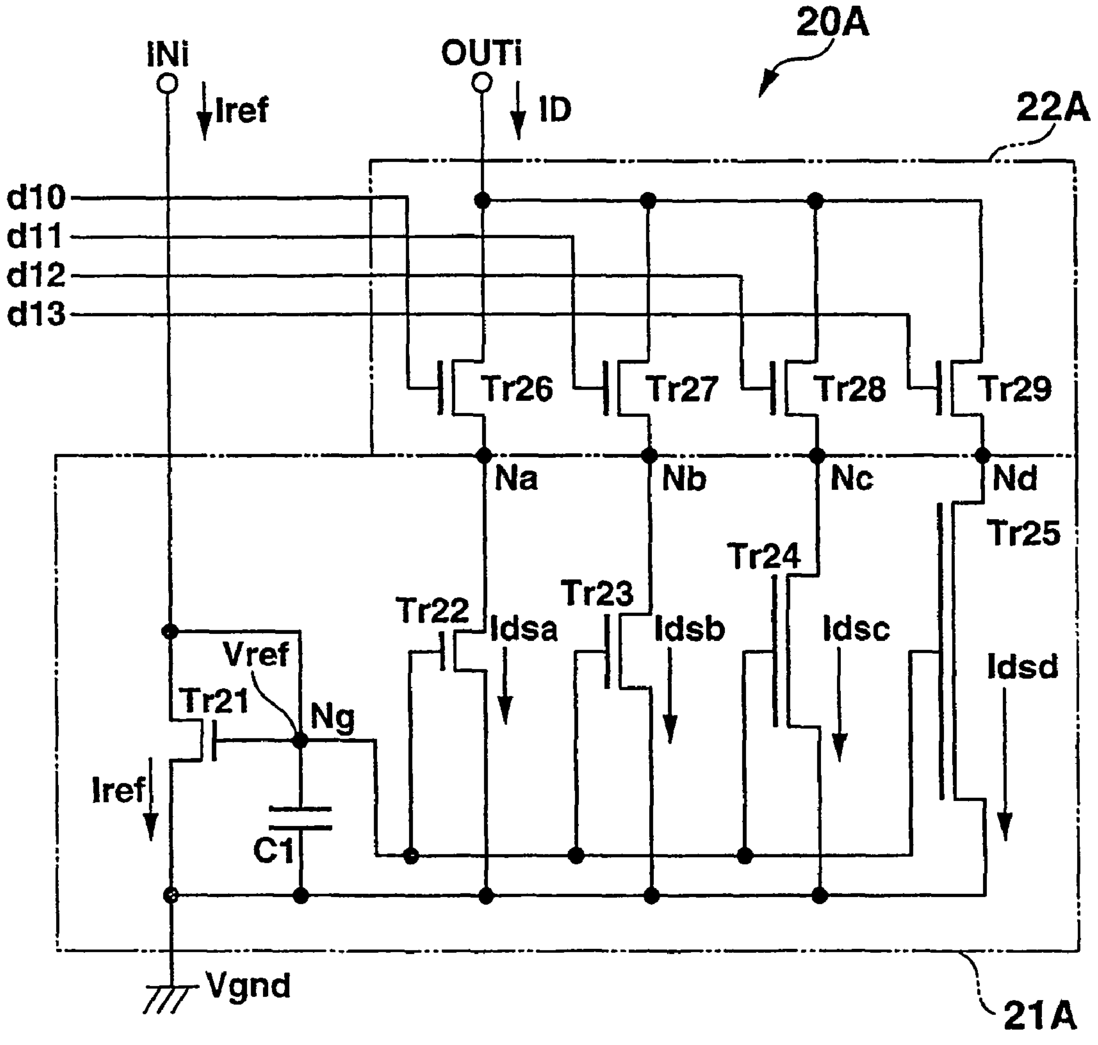
FIG. 3 is a circuit arrangement drawing showing one example of the current generation section applied to the current generation circuit in this embodiment.

FIG. 3 is a circuit arrangement drawing showing one example of the current generation section applied to the current generation circuit in this embodiment.

The signal latch section 10, as shown in FIG. 1, a number of the latch circuits LC0-LC3 are formed in parallel according to the number of digital signals d0-d3 bits (4 bits); takes in simultaneously the above-mentioned digital signals d0-d3 supplies each one individually based on a timing control signal CLK output from a timing generator, a shift register and the like (omitted from the diagram); and performs an operation which holds and outputs signal levels based on the proper digital signals d0-d3.

Here, each of the latch circuits LC0-LC3 which constitute the signal latch section 10, as shown in FIG. 2, have a configuration comprising a plurality of universally known Complementary Metal Oxide Semiconductor (CMOS) type transistor circuits, which are connected in series to p-channel type (hereinafter referred to as Pch transistor) and n-channel type (hereinafter referred to as Nch transistor) Metal Oxide Semiconductor Field-Effect Transistor (MOSFET) type transistors.

Specifically, as illustrated in FIG. 2, the latch circuits LC (LC0-LC3) has a configuration comprising a CMOS 11 consisting of a Pch transistor Tr1 and an Nch transistor Tr2; a CMOS 12 consisting of a Pch transistor Tr3 and an Nch transistor Tr4; a CMOS 13 consisting of a Pch transistor Tr5 and an Nch transistor Tr6; a CMOS 14 consisting of a Pch transistor Tr7 and an Nch transistor Tr8; a CMOS 15 consisting of a Pch transistor Tr9 and an Nch transistor Tr10; and a CMOS 16 consisting of a Pch transistor Tr11 and an Nch transistor Tr12.

At the CMOS 11 input contact point (clock input terminal of latch circuit LC) CK, the timing control signal (clock signal) CLK is supplied and an output contact point N11 (hereinafter references to "contact point" will be denoted as "contact" for convenience of explanation) is connected to the CMOS 12 input contact. Further, the above-mentioned timing control signal CLK is supplied to the CMOS 13 input terminal. The CMOS 13 output contact N12 connects the CMOS 12 output contact with the CMOS 14 input contact. The CMOS 14 output contact N13 is connected to the CMOS 15 and CMOS 16 input contacts. On one side, the signal levels of output contact N13 are output as inverse output signals from an inverted output terminal OT* (Denoted as "OT*" for convenience of explanation in the description and reference element in FIG. 2) of the latch circuit LC. On the other side, the signal levels of CMOS 15 output contact N15 is output from a non-inverted output terminal OT of the latch circuits LC as a non-inverted output signals.

In addition, CMOS 11, CMOS 14, CMOS 15 and CMOS 16 are constituted by each of the Pch transistors Tr1, Tr7, Tr9 and Tr11 whereby one end of the current path is connected to the high supply voltage Vdd, as well as each of the Nch transistors Tr2, Tr8, Tr10, and Tr12 whereby one end of the current path is connected to a low supply voltage Vgnd (voltage to ground). As for the CMOS 12 Pch transistor Tr3 and the CMOS 13 Nch transistor Tr6, one end of the current path is connected to a signal input terminal IN of the latch circuit LC and the above-mentioned digital signals d0-d3 are supplied. Further, CMOS 12 Nch transistor Tr4 and CMOS 13 Pch transistor Tr5, one end of the current path is connected to the above CMOS 16 output contact N14.

In the signal latch section 10 which has such a configuration, initially when the timing control signal CLK (a high-level pulse signal which has a predetermined signal width) is applied, CMOS 12 Pch transistor Tr3 side and CMOS 13 Nch transistor Tr6 perform an "ON" operation, the digital signals d0-d3 in suitable timing are taken in, and the signal levels of CMOS 12 and CMOS 13 common output contact N12 are specified by the digital signals d0-d3. Accordingly, based on the signal levels (signal levels of the digital signals d0-d3) of the output contact N12, each signal level (high-level/low-level) of the non-inverted output terminal OT and the inverted output terminal OT* supplied to CMOS 16 output contact N14 is determined.

Here, while CMOS 12 Pch transistor Tr3 side and CMOS 13 Nch transistor Tr6 performs an "OFF" operation after application of the above-mentioned timing control signal CLK (that is, the timing control signal CLK low-level state), the CMOS 12 Nch transistor Tr4 and CMOS 13 Pch transistor Tr5 perform an "ON" operation. The signal level of common output contact N12 of CMOS 12 AND CMOS 13 is specified, and the signal level (equivalent to the non-inverted output signals (signal levels of the non-inverted output terminal OT)) of CMOS 16 output contact N14 is taken in. Accordingly, the non-inverted output signals (signal levels of the non-inverted output terminal OT) and the inverted output signal (signal level of inverted output terminal OT*), which have signal levels equivalent to the time of application of the timing control signal CLK, continue and are output. The signal levels of this output signal are held in the same output state until the signal levels (signal levels of digital signals d0-d3) of the signals input terminal IN changes at the time of application of the next timing control signal CLK.

As shown in FIG. 3, a current generation section 20A comprises a current mirror circuit (gradation current generation circuit) 21A and a switching circuit (drive current generation circuit) 22A. The current mirror circuit 21A generates a plurality of the gradation currents Idsa, Idsb, Idso and Idsd which have a current value of an individually different ratio (each one has a different ratio) with response to reference current Iref. The switching circuit 22A randomly selects gradation currents from the plurality of the above-mentioned gradation currents Idsa-Idsd, based on the output signals d10, d11, d12, and d13 (the signal levels of the non-inverted output terminal OT as illustrated in FIG. 2) from each of the latch circuits LC0-LC3 of the above-mentioned signal latch section 10.

Specifically, as shown in FIG. 3, the current mirror circuit 21A is applied to the current generation section 20A is configured with the Nch transistor Tr21 (reference current transistor) and a plurality of Nch transistors (gradation current transistors) Tr22, Tr23, Tr24,Tr25. The Nch transistor Tr21 is provided with the reference current Iref supplied via reference current supply line Ls connected to the current path in between the current input contact INi and the low supply voltage Vgnd (voltage to ground). The control terminal (gate terminal) of the Nch transistor Tr21 (reference current transistor) is connected to the contact Ng, along with each current path (source-drain terminals) connected in between each of the contacts Na, Nb, Nc, and Nd and the low supply voltage Vgnd. Each control terminal of Nch transistors (gradation current transistors) Tr22, Tr23, Tr24 and Tr25 (corresponding to the plurality of latch circuits LC0-LC3) are connected in common to the contact Ng. Here, the contact Ng is configured with a direct connection to the current input contact INi along with a capacitor C1 connected in between the low supply voltage Vgnd.

The reference current transistor Tr21 generates a reference voltage Vref for the control terminal (gate terminal: contact Ng). When the reference current Iref is supplied to the current input contact INi the reference current Iref flows to the current path. Each of the gradation current transistors Tr22-Tr25, based on the reference voltage Vref supplied to each control terminal, gradation currents flow to each current path.

Additionally, a switching circuit 22A is applied to the current generation section 20A, which has a configuration whereby the current path is connected between a current output contact OUTi and each of the contacts Na, Nb, No and Nd to which a load is connected. The output signals d10-d13 output individually from each of the above-mentioned latch circuits LC0-LC3 to control terminals applied in parallel with a plurality (4 devices) of Nch transistors Tr26, Tr27, Tr28 and Tr29.

Here, in the current generation section 20A as applied to this embodiment, in particular the gradation currents Idsa-Idsd, which flow to each of the gradation current transistors Tr22-Tr25 and constitute the current mirror circuit 21A, are set to have a current value of an individually different predetermined ratio as opposed to the reference current Iref which flows to the reference current transistor Tr21. Specifically, the transistor size of each of the gradation current transistors Tr22-Tr25 is an individually different ratio. For example, in the case where the fixed channel length of each of the gradation current transistors Tr22-Tr25, the ratio (W2:W3:W4:W5) is formed so each channel width corresponds to 1:2:4:8.

Accordingly, if the channel width of the reference current transistor Tr21 is presupposed as W1, the current value of the gradation currents Idsa-Idsd which flow to each of the gradation current transistors Tr22-Tr25 will be individually set as Idsa=(W2/W1)×Iref, Idsb=(W3/W1)×Iref, Idsc=(W3/W1)×Iref, and Idsd=(W4/W1)×Iref. Thus, the current value between gradation currents can be set to a ratio specified as $2^n$ by setting each one to the channel width of the gradation current transistors Tr22-Tr25 as $2^n$ (n=0, 1, 2, 3, . . . ; $2^n$=1, 2, 4, 8, . . . ).

In this way, the current value from each of the gradation currents Idsa-Idsd is set up to generate the drive current ID comprising the current value $2^n$ step. Further described later, random gradation currents are selected and integrated based on the plurality of digital signal d0-d3 bits (output signals d10-d13). Thus, as illustrated in FIGS. 1-3, the drive current ID generated becomes $2^4$=16 different current values when the 4-bit digital signals d0-d3 are applied according to the "ON" state of the transistors Tr26-Tr29 connected to each of the gradation current transistors Tr22-Tr25.

In the current generation section 20A which has such configuration, depending upon the signal levels of the output signals d10-d13 output from the above-mentioned latch circuits LC0-LC3, the particular transistor(s) of switching circuit 22A performs an "ON" operation (When comprised of any one or more of the transistors Tr26-Tr29 that perform an "ON" operation, other than cases of any of the transistors Tr26-Tr29 that perform an "OFF" operation.). The reference current Iref flows to the reference current transistor Tr21 to the gradation current transistors (any one or more of Tr22-Tr25) of the current mirror circuit 22A connected to the relevant transistor(s) that performed an "ON" operation. The gradation currents Idsa-Idsd have a current value of a predetermined ratio ($2^n$ gradation) and flow as mentioned above. At the current output contact OUTi, the drive current ID has a current value consisting of a composite value of these gradation currents. From the load side connected to the current output contact OUTi, the current output at contact OUTi flows to the low supply voltage Vgnd via the "ON" state transistor (whichever Tr26-Tr29) and the gradation current transistor (whichever Tr22-Tr25).

Therefore, in the current generation circuit ILA related to this embodiment, the drive current ID generated is converted to analog current which has a predetermined current value from the current generation section 20A, based on the timing specified by the timing control signal CLK in response to the plurality of digital signal d0-d3 bits input into signal latch section 10 and supplied to the load. (In this embodiment as mentioned above, the drive current is drawn in the direction of the current generation circuit from the load side.)

Thus, in the current generation circuit ILA related to this embodiment, reference current Iref is supplied to the current generation section 20A via the reference current supply line Ls from the current generator IRA, based on a plurality of digital signal d0-d3 bits (output signals d10-d13 of the signal latch section 10). Specified gradation currents are selected and integrated from a plurality of gradation currents Idsi-Idsl which have a current value of a predetermined ratio to the relevant reference current Iref. The drive current ID is constituted so the generated output has the desired current value. The current (reference current) supplied to the above-mentioned referenced current supply line Ls (signal wiring) is constant, since a current supply voltage fluctuation following a change is not produced. For example, even if negligible drive current is generated, there is no delay in the operation of the current generation circuit resulting from the electrical charge or discharge of present parasitic capacitance; thereby, the operating speed of the current generation circuit can be raised and the load can be driven at a faster speed.

Furthermore, as described later in detail, the above-mentioned plurality of digital signal bits apply the display data on the display device for the purpose of displaying desired image information. In this case, the drive current generated and output by the current generation circuit corresponds to the write-in current supplied to each display pixel which forms the display panel or supplied to the light emitting element of each of the display pixels.

<<The Second Embodiment of the Current Generation Circuit>>

Next, the second embodiment of the current generation circuit related to this invention will be explained with reference to the drawings.

Figure 4:
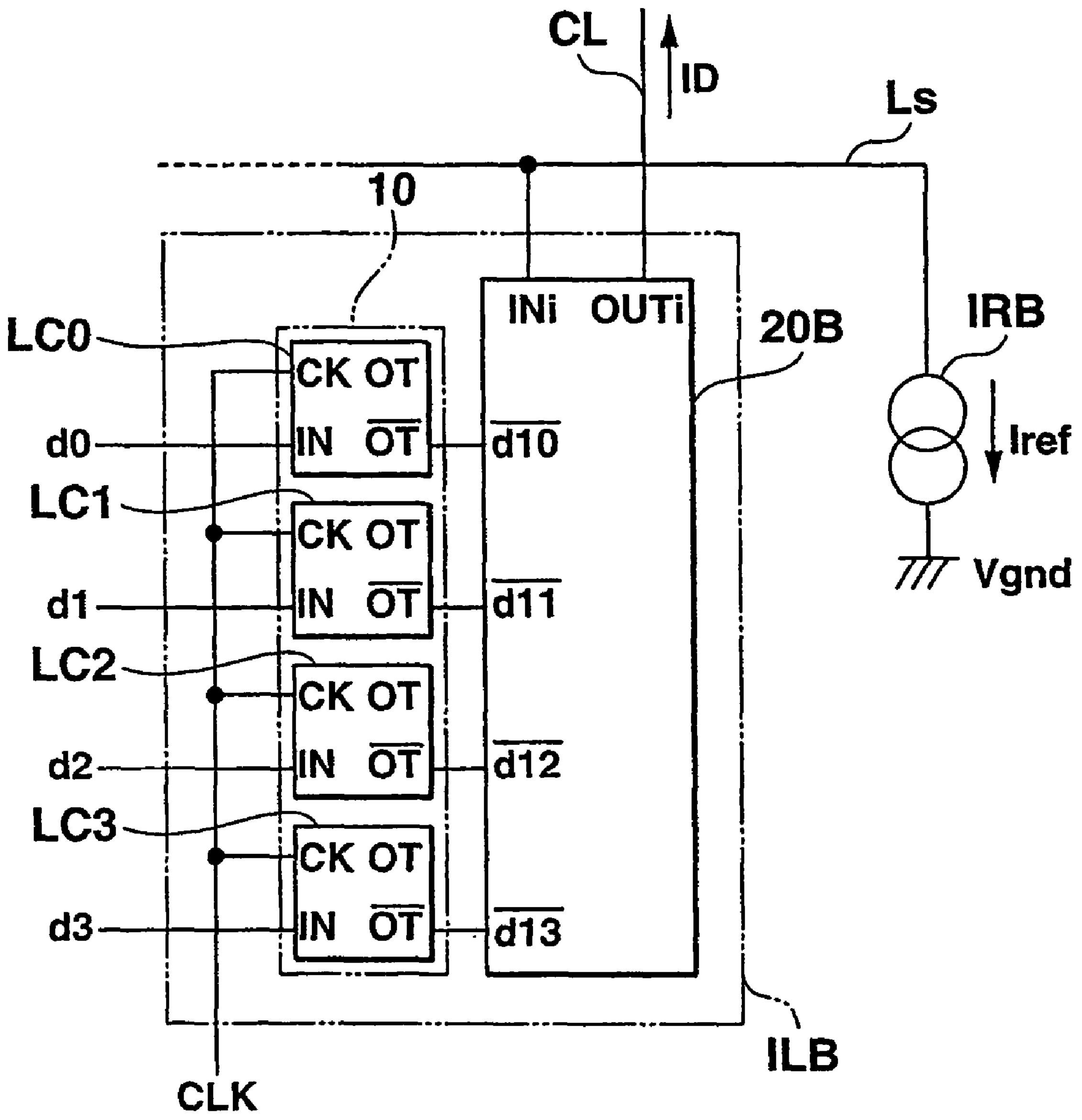
FIG. 4 is an outline block diagram showing the second embodiment of the current generation circuit in the display device related to this invention.

FIG. 4 is an outline block diagram showing the second embodiment of the current generation circuit in the display device related to this invention.

Figure 5:
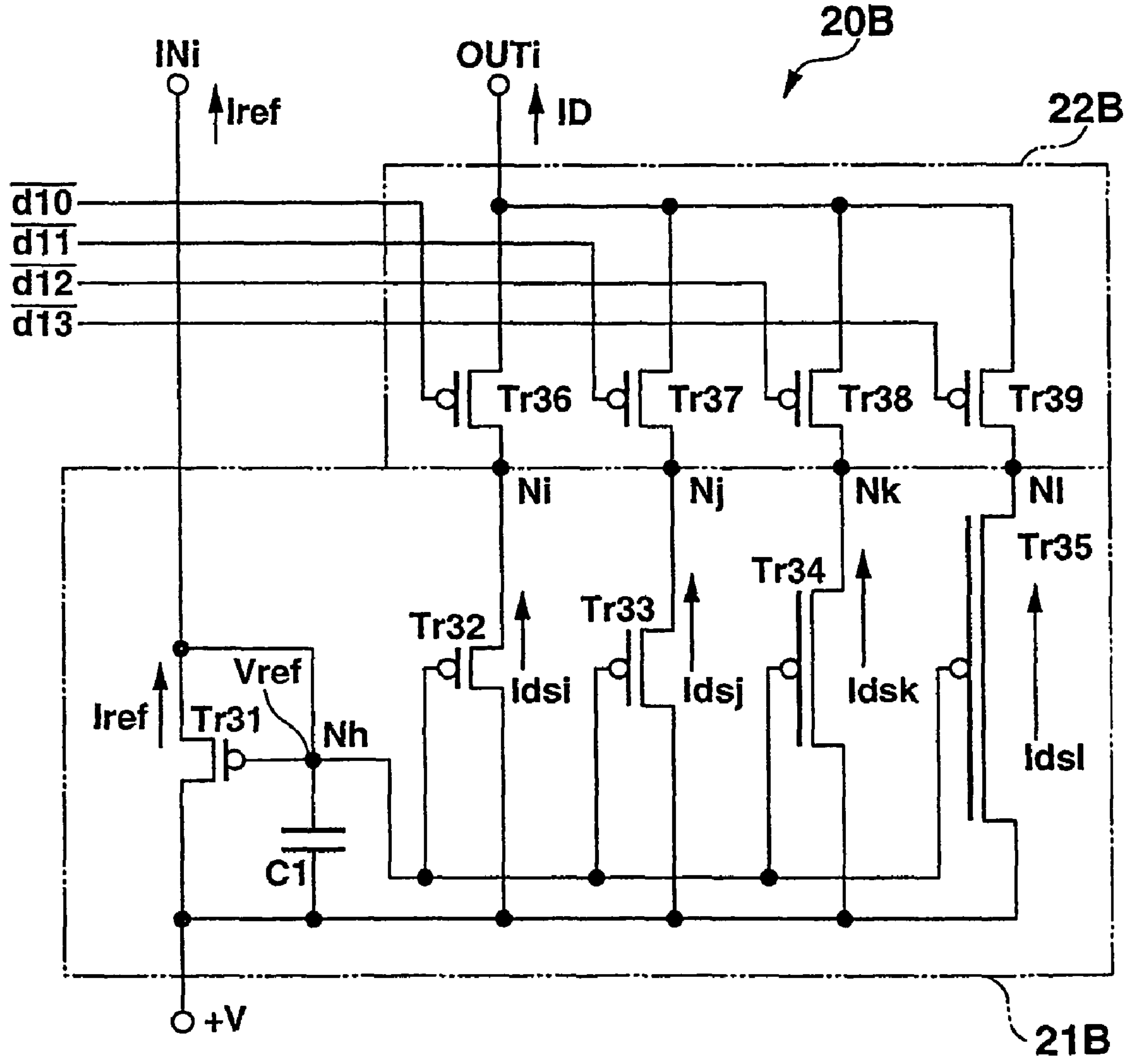
FIG. 5 is a circuit arrangement drawing showing one example of the current generation section applied to the current generation circuit in this embodiment.

FIG. 5 is a circuit arrangement drawing showing one example of the current generation section applied to the current generation circuit in this embodiment.

Here, concerning any configuration equivalent in the embodiment mentioned above, the same or equivalent nomenclature is appended and the explanation is simplified or omitted from the description.

In the embodiment mentioned above, although the case illustrated is configured (described as "current sinking method" for convenience) from the load side connected to the current generation circuit ILA so the drive current ID is drawn in the direction of current generation circuit ILA, this embodiment has a configuration (described as "current application method" for convenience) which flows (pours) the drive current ID in the direction of the load from the current generation circuit ILA side.

Specifically, as shown in FIG. 4, a current generation circuit ILB related to this embodiment has a configuration equivalent to the first embodiment comprising the signal latch section 10 and the current generation section 20B along with the current generator IRB connected to the current generation section 20B via the reference current supply line Ls. The reference current Iref flows from the current generation section 20B side in the direction of the current generator IRB connected to a low supply voltage Vgnd.

The signal latch section 10 has a configuration in which the latch circuits LC0-LC3 are individually formed corresponding to a plurality of the digital signals d0-d3. The inverted output signals d10*-d13* (Denoted in the description for convenience as d10*-d13* in reference to the same element in FIG. 4, represents the signal levels of the inverted output terminal OT* shown in FIG. 2.) connected to each of the latch circuits LC0-LC3 output to the current generation section 20B.

As shown in FIG. 5, the current generation section 20B related to this embodiment, in brief, has a current mirror circuit 21B and a switching circuit 22B which have a circuit arrangement resembling the first embodiment (Reference FIG. 3) mentioned above and are almost equivalent. This section is configured so the drive current ID randomly selects and integrates a plurality of the gradation currents Idsi, Idsj, Idsk and Idsl which have a current value of a predetermined ratio relative to the reference current Iref and generates the current supplied to the load current supply line CL, based on the output signals d10*-d13* from each of the latch circuits LC0-LC3.

Specifically, the configuration of current mirror circuit 21B and the switching circuit 22B consist of the Pch transistors Tr31-Tr39. A reference current transistor Tr31 is connected in between current input contact INi and the voltage contact +V, along with the control terminal connected to the voltage contact +V via the current input contact INi and contact Nh together with the capacitor C1. In addition, the gradation current transistors Tr32-Tr35 are individually connected in between the contacts Ni, Nj, Nk and Nl and the voltage contact +V, along with the control terminals connected in common to the contact Nh. Also, the transistors Tr36-Tr39 for switching are configured so each one is connected in between the above-mentioned contacts Ni, Nj, Nk and Nl and the current output contact OUTi, along with the output signals d10*-d13* output from the latch circuits LC0-LC3 each applied to the control terminals in parallel.

Here also set in the embodiment configuration of current mirror circuit 21B, the size (Namely, the channel width at the time of setting the fixed channel length.) of each of the gradation current transistors Tr32-Tr35 is formed to correspond to a predetermined ratio based on the reference current transistor Tr31. The gradation currents Idsi-Idsl which flow in each current path are set up so the current value of each one is a different predetermined ratio as opposed to the reference current Iref.

Therefore, also in the current generation circuit 20B related to this embodiment, in response to the signal levels of output signals d10*-d13* output from the signal latch section 10 (the latch circuits LC0-LC3), the particular transistor(s) Tr36-Tr39 of the switching circuit 22B perform an "ON" operation. Accordingly, the gradation currents Idsi-Idsl, which have a current value twice the predetermined ratio of the reference current Iref, flows via the gradation current transistors Tr32-Tr35. These composite currents are supplied to a load connected to the current output contact OUTi as the drive current ID via the current output contact OUTi. (In this embodiment, the drive current flows in the direction of the load from the current generation circuit side).

Also, the current generation circuit ILB of this embodiment, resembling the case of the first embodiment, has a configuration which selects and integrates particular gradation currents from the plurality of gradation currents Idsi-Idsl to generate and output the drive current ID having the desired current value. Since the current (reference current) supplied to the above-mentioned reference current supply line LS (signal wiring) is constant, even if negligible drive current is generated, the operating speed of the current generation circuit can be raised and the load can be driven at a faster speed.

<<the Third Embodiment of the Current Generation Circuit>>

Next, the third embodiment of the current generation circuit related to this invention will be explained with reference to the drawings.

Figure 6:
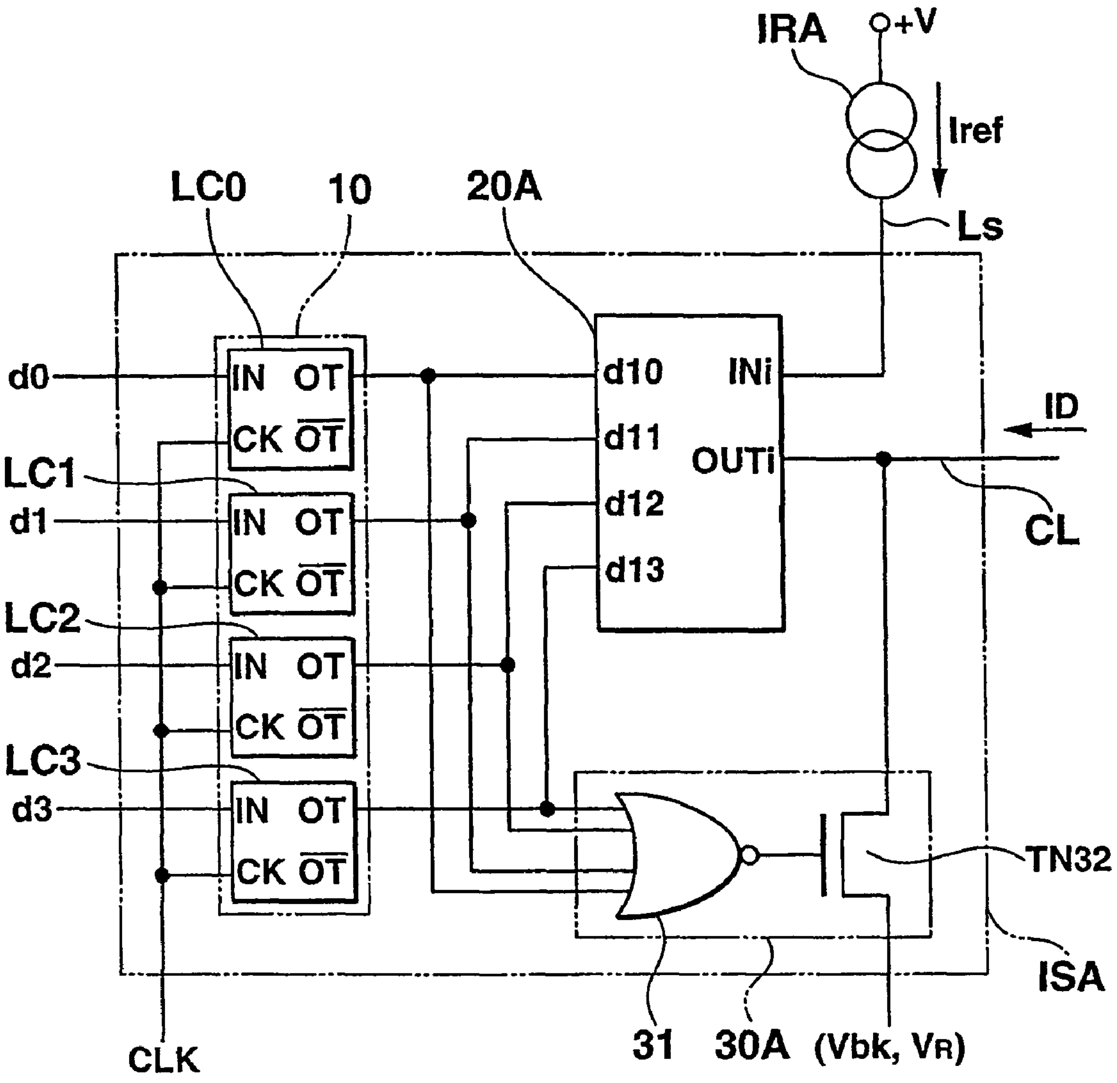
FIG. 6 is an outline block diagram showing the third embodiment of the current generation circuit in the display device related to this invention.

FIG. 6 is an outline block diagram showing the third embodiment of the current generation circuit in the display device related to this invention.

Figure 7:
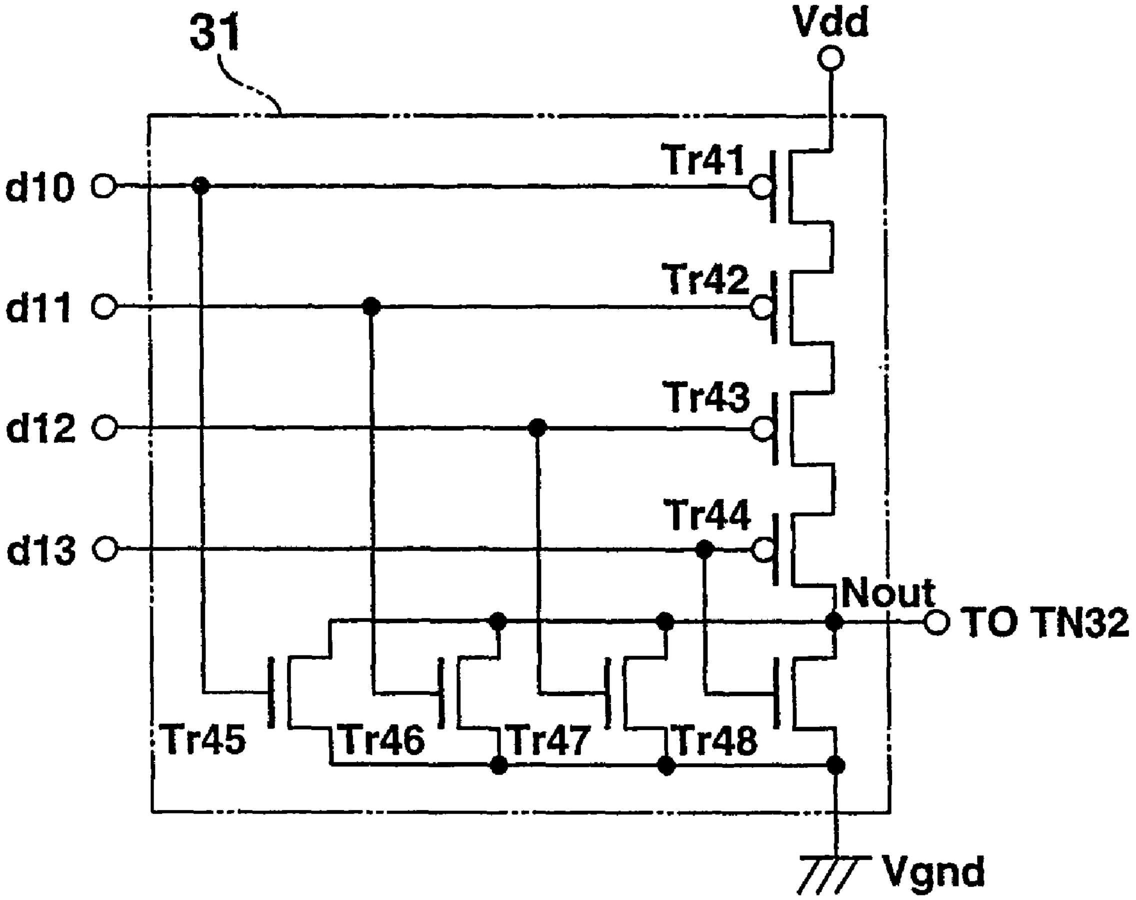
FIG. 7 is a circuit arrangement drawing showing an example of the detailed configuration of the logic circuit applicable to the specified state setting section of the current generation circuit in this embodiment.

FIG. 7 is a circuit arrangement drawing showing an example of the detailed configuration of the logic circuit applicable to the specified state setting section of the current generation circuit in this embodiment.

Here, concerning any configuration equivalent in the embodiments mentioned above, the same or equivalent nomenclature is appended and the explanation is simplified or omitted from the description.

As shown in FIG. 6, the current generation circuit ISA related to this embodiment has a configuration equivalent to the first embodiment comprising the signal latch section 10, the current generation section 20A and a specified state setting section 30A. The specified state setting section 30A (specified state setting circuit) has a configuration which applies specified voltage (Specified voltage: A black display voltage Vbk or a reset voltage Vr described later) to the load current supply line CL, which connects to the non-inverted output terminal OT of the latch circuits LC0-LC3 only to drive the load by the specified operating state.

Here, the current generator IRA connected to the voltage contact +V connected to the high supply voltage flows (pours) the reference current Iref in the direction of the current generation section 20A via the reference current supply line Ls.

The specified state setting section 30A, shown in FIG. 6, configuration comprises a NOT/OR operation circuit 31 (specified digital value judgment section) (hereinafter referred to as the NOR circuit) and a specified voltage application transistor TN32 (specified voltage application section). The NOT/OR operation circuit 31 processes the incoming signals of the output signals d10-d13 output from each of the above-mentioned latch circuits LC0-LC3. The specified voltage application transistor TN32 consisting of a Nch type Field-Effect Transistor (hereinafter referred to as FET) is individually connected to a voltage source applied to the control terminal (NOR gate) on one end of the current path to the specified voltage (Vbk,Vr) and the output terminal of the relevant NOR circuit 31 on the opposite side to the load current supply line CL.

Here, the NOR circuit 31 as shown in FIG. 7, is configured with a series circuit and a parallel circuit. The series circuit is connected in series to a plurality of Pch type FETs Tr41-Tr44 in between the high supply voltage Vdd and an output contact Nout. The parallel circuit is connected in parallel to a plurality of Nch FETs Tr45-Tr48 in between the low supply voltage Vgnd (voltage to ground) and the output contact Nout. Thus, the NOR circuit 31 is realized and it is feasible with common knowledge circuit arrangement to individually apply the output signals d10-d13 from each of the latch circuits LC0-LC3 to the control terminals of each Pch and Nch FETs Tr41-Tr44 and Tr45-Tr48, respectively.

In the specified state setting section 30A which has such as configuration, the NOR circuit 31 judges whether or not all of the signal levels of the output signals d10-d13 output from the above-mentioned latch circuits LC0-LC3 are in the specified state set to zero (0). Only when in this specified state, the specified voltage application transistor TN32 performs an "ON" operation, and the specified voltage (Vbk, Vr) is applied to the load current supply line CL.

Therefore, according to the current generation circuit ISA of this embodiment, along with the same effect as the first embodiment, the current generation circuit performs drive control of the load from a plurality of digital signal bits. When all of the digital signal bits (output signals d10-d13) are set to zero (0), by isolating the current output in the current generation section 20A, the signal levels of the current supply source line CL will be in a high impedance state. This problem which makes the operating state of the load unstable can be solved. Furthermore, with all of the digital signal bits (output signals d10-d13) set to zero, by setting the signal levels of the load current supply line CL as a specified voltage the load can be driven by a specified operating state. These functions are suitable for eliminating abnormalities in the display, or application of the reset voltage when applied to the display device data driver of this current generation circuit (described later in detail).

<<The Fourth Embodiment of the Current Generation Circuit>>

Next, the fourth embodiment of the current generation circuit related to this invention will be explained with reference to the drawings.

Figure 8:
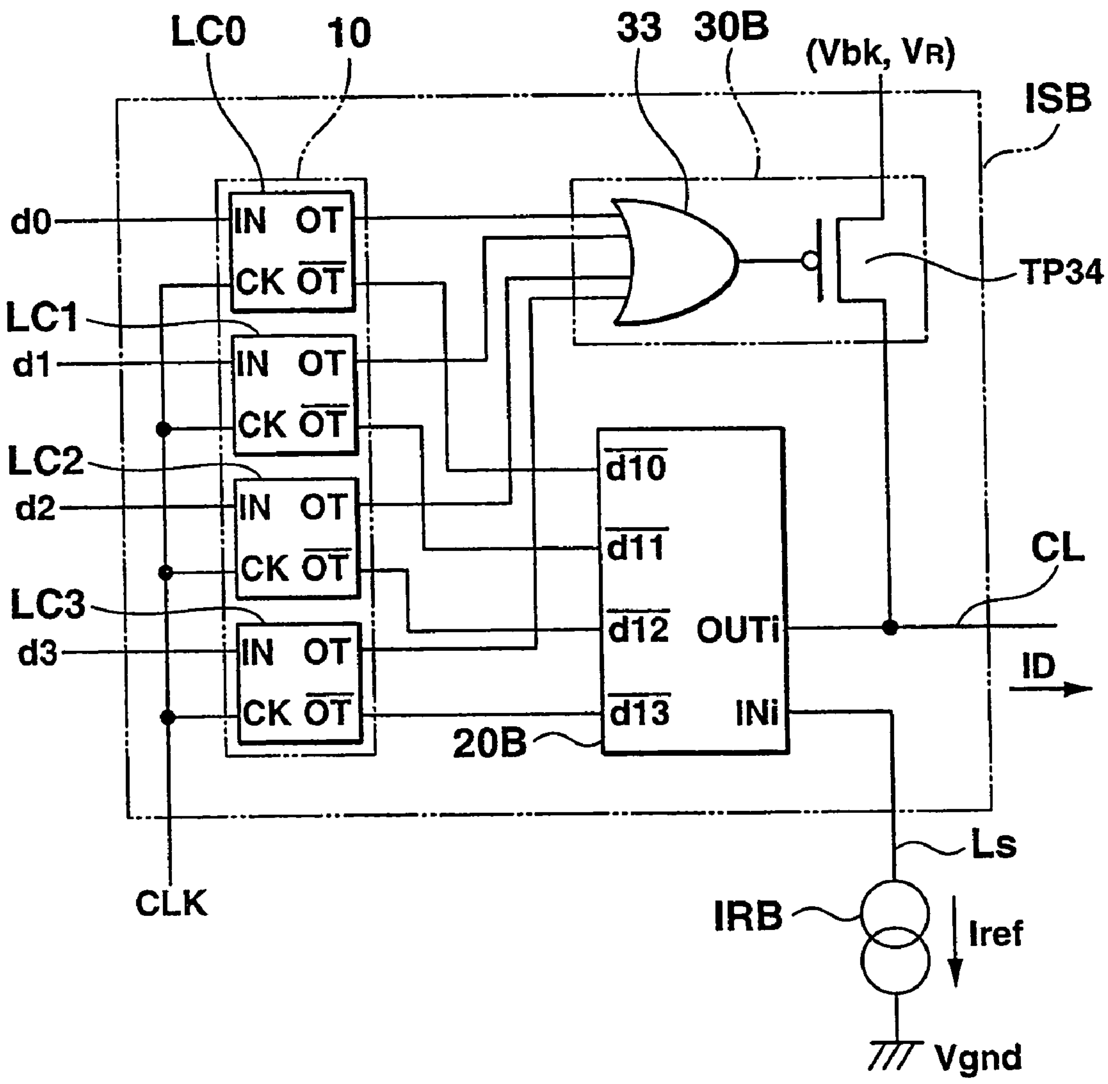
FIG. 8 is an outline block diagram showing the fourth embodiment of the current generation circuit in the display device related to this invention.

FIG. 8 is an outline block diagram showing the fourth embodiment of the current generation circuit in the display device related to this invention.

FIG. 9 is a circuit arrangement drawing showing an example of the detailed configuration of the logic circuit applicable to the specified state setting section of the current generation circuit in this embodiment.

Here, concerning any configuration equivalent in the embodiments mentioned above, the same or equivalent nomenclature is appended and the explanation is simplified or omitted from the description.

Although the case illustrated in the third embodiment mentioned above is configured (described as "current sinking method" for convenience) so the load drive current ID is drawn in the direction of the current generation circuit ISA from the load side connected to the current generation circuit ISA, the fourth embodiment has a configuration (described as "current application method" for convenience) which flows (pours) the load drive current ID in the direction of the load from the current generation circuit ISB side.

Specifically, as shown in FIG. 8, the current generation circuit ISB related to this embodiment has a configuration equivalent to the second embodiment mentioned above comprising the signal latch section 10, the current generation section 20B and a specified state setting section 30B. The specified state setting section 30B applies the specified voltage (Vbk, Vr) to the load current supply line CL only when connecting with the non-inverted output terminal OT of the latch circuits LC0-LC3 to drive the load by a specified operating state.

Here, the current generator IRB is connected to the low supply voltage Vgnd so reference current Iref flows in the current generator IRB direction from the current generation section 20B side via the reference current supply line Ls.

The specified state setting section 30B, as shown in FIG. 8, comprises an OR operation circuit 33 and a specified voltage application transistor TP34. The OR operation circuit 33 (hereinafter referred to as OR circuit as the digital value judgment section) which sets the incoming signals of the output signals d10-d13 output from each of the above-mentioned latch circuits LC0-LC3. The specified voltage application transistor TP34 (specified voltage application section) consists of a Pch FET connected individually from the output of the OR circuit 33 control terminal to a voltage source to which one end of the current path applies the specified voltage Vbk and the other end side to the current supply source line CL.

Figure 9A:
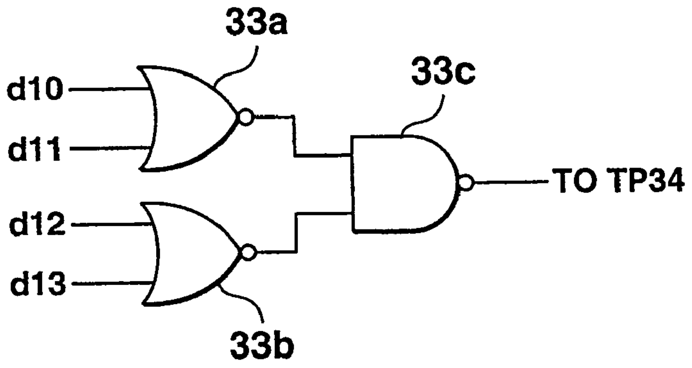
FIGS. 9A and 9B are circuit arrangement drawings showing examples of the detailed configuration of the logic circuit applicable to the specified state setting section of the current generation circuit in this embodiment.

Here, OR circuit 33, for example as shown in FIG. 9A, is realized with a common knowledge circuit configuration comprises a Not-AND gate 33*c* (hereinafter referred to as a NAND circuit) with fanout from two input NOR circuits 33*a* and 33*b* as an input. Two sets of two input NOR circuits 33*a* and 33*b* individually input the output signals d10-d11 and d12-d13 from each of the latch circuits LC0-LC3.

Figure 9B:
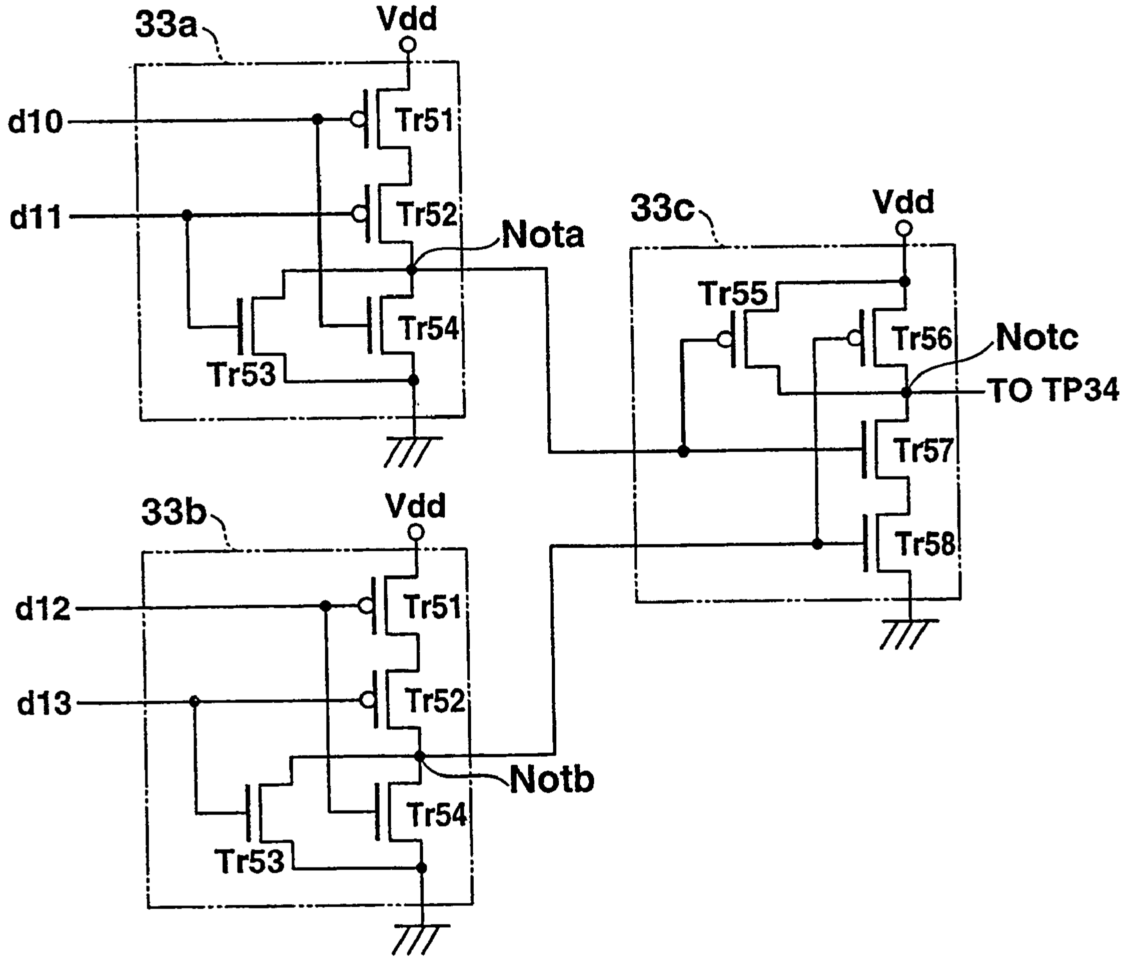

Specifically, as shown in FIG. 9B, such a common knowledge circuit arrangement applies the concept of two inputs in the NOR circuits 33*a* and 33*b* with Pch transistors Tr51*a*-Tr52*a* and Tr51*b*-Tr52*b* individually connected in series in between the high supply voltage Vdd and the output contacts Nota and Notb; Nch transistors Tr53*a*-Tr54*a* and Tr53*b*-Tr54*b* are connected in parallel in between the low supply voltage Vgnd and the output contacts Nota and Notb; and the output signals d10-d13 of each of the latch circuits LC0-LC3 individually applied to the control terminal of the Pch and Nch transistors Tr-51*a*-Tr54*a* and Tr51*b*-Tr54*b*.

Also, a NAND circuit 33*c* illustrated, as shown in FIG. 9B, utilizes a common knowledge circuit arrangement to apply the concept of applying individually Pch transistors Tr55-Tr56 connected in parallel between the high supply voltage Vdd and the output contact Notc; Nch transistors Tr57-Tr58 connected in parallel between the low supply voltage Vgnd and the output contact Notc; and fanout of each of the above-mentioned two input NOR circuits 33*a* and 33*b* (signal level of the output contacts Nota and Notb) is applied to the control terminals of each Pch and Nch transistors Tr55-Tr56 and Tr57-Tr58.

Also, in the specified state setting section 30B which has such a configuration, the OR circuit 33 judges whether or not all of the signal output signals d10-d13 output from the above-mentioned latch circuits LC0-LC3 are in the specified state set to zero (0). The specified voltage application transistor TP34 performs an "ON" operation only in this specified state, and the specified voltage Vbk is applied to the load via the current supply source line CL.

Therefore, also in the current generation circuit ISB of this embodiment, the same effect as the case of the third embodiment can be acquired in the current application method.

<<The Fifth Embodiment of the Current Generation Circuit>>

Next, the fifth embodiment of the current generation circuit related to this invention will be explained with reference to the drawings.

As described later, in the case of applying the current generation circuits in accordance with the present invention to the write-in current generation circuit clusters of the display device data driver, although configured so the plurality of current generation circuits operate in parallel and configured so the predetermined reference current is supplied to each of the plurality of current generation circuits, when the reference current is supplied in common to the plurality of current generation circuits from one constant current power source, the value of the current supplied to each current generation circuit becomes the current value into which the reference current supplied from the constant current power source was divided according to the number of current generation circuits. At this time, the current supplied to each current generation circuit, where the component characteristics (channel resistance and the like) of the reference current transistors of the current generation section of each current generation circuit are almost identical to each other, the current supplied to each current generation circuit as reference current becomes almost uniform current (constant current) as it is divided almost equally. Therefore, equal drive current can be generated.

However, if a variation occurs in one another of the component characteristics of each of the current generation circuit reference current transistors (e.g., manufacturing differences or environmental surroundings, a change in the physical properties such as aging with time and the like), because the current supplied to each current generation circuit becomes that in which a variation divided unequally has reference current, the drive current generated will also produce variation.

Then, in addition to the configuration in each of the above-mentioned embodiment, this embodiment comprises a configuration which is intermittent in the supply of reference current in the current generation circuit from a current generator. Accordingly, applying to the data driver of the display device which describes the current generation circuit related to this invention later, when operating simultaneously in parallel with a plurality of current generation circuits, along with supplying selectively to each of the current generation circuits reference current from a current generator, that is to say, it can be constituted so reference current can be supplied to the current generation circuits one at a time. Therefore, each current generation circuit generates drive current using the same reference current and drive current variations can be controlled. When applied to the display device, it can control variations in the luminosity gradation of each display pixel and can acquire excellent display image quality.

Figure 10:
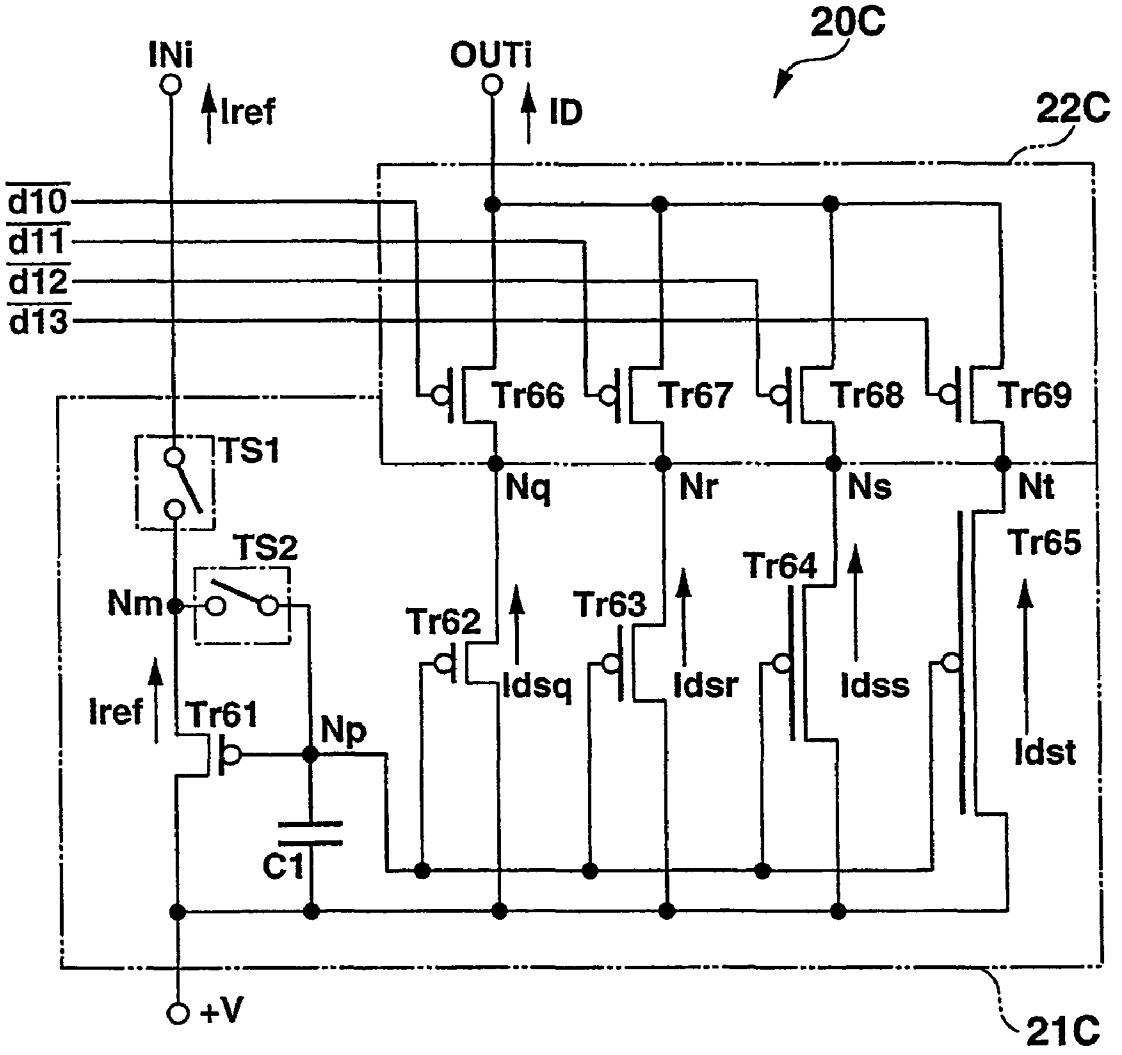
FIG. 10 is an outline block diagram showing one example of the current generation section applied to the fifth embodiment of the current generation circuit in the display device related to this invention.

FIG. 10 is an outline block diagram showing one example of the current generation section applied to the fifth embodiment of the current generation circuit in the display device related to this invention.

Figure 11:
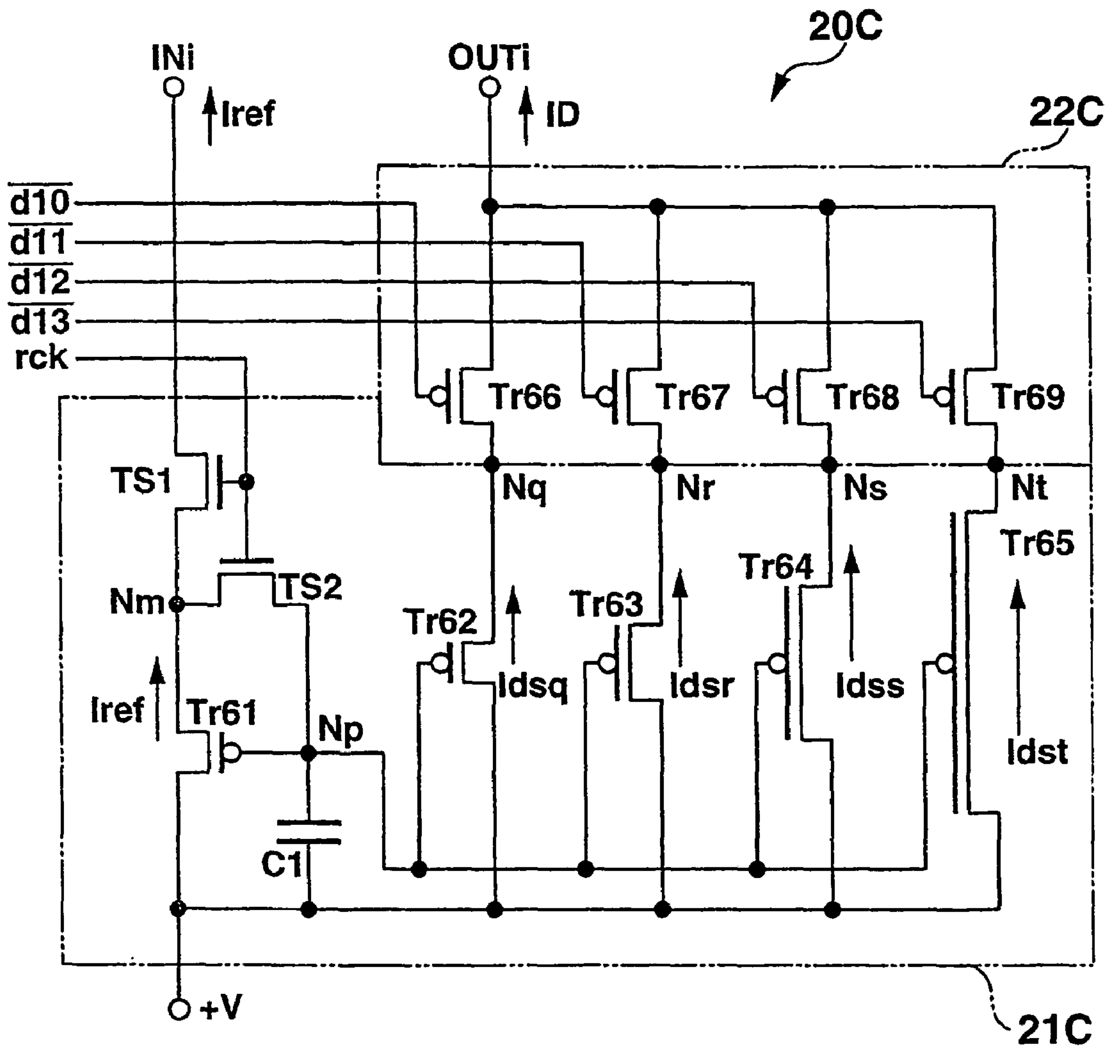
FIG. 11 is a drawing showing an example of the detailed circuit of the current generation section of the current generation circuit in this embodiment.

FIG. 11 is a drawing showing an example of the detailed circuit of the current generation section of the current generation circuit in this embodiment.

Figure 12:
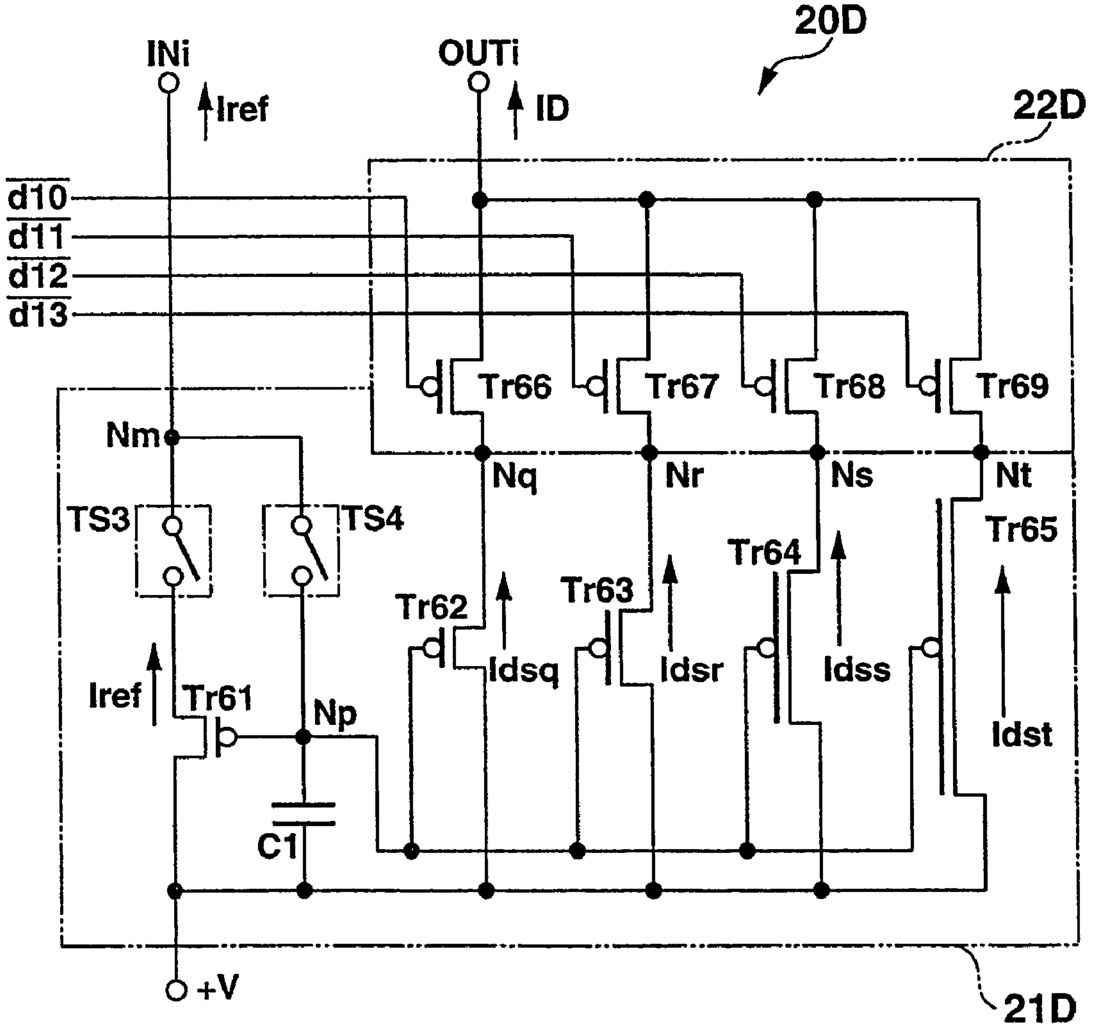
FIG. 12 is an outline block diagram showing another example of the current generation section applied to the current generation circuit in this embodiment.

FIG. 12 is an outline block diagram showing another example of the current generation section applied to the current generation circuit in this embodiment.

Here, concerning any configuration equivalent in the embodiments mentioned above, the same or equivalent nomenclature is appended and the explanation is simplified or omitted from the description.

FIG. 10 illustrates a current generation section 20C as applied to the current generation circuit related to this embodiment. For example, the current generation section 20C has an almost equivalent circuit arrangement of the current generation section 20B (Reference FIG. 5) illustrated in the above second embodiment, along with being equipped with a current mirror circuit 21C and a switching circuit 22C. The current mirror circuit 21C has a configuration with switching circuits attached, which control (supply or cutoff) the supply state of the reference current Iref from the current supply source.

In particular, the current mirror circuit 21C is configured with Pch transistors Tr61-Tr65 and switching circuits TS1 and TS2. A reference current transistor Tr61 is connected in between contact Nm and the voltage contact +V, along with the control terminal connected to contact Np. In addition, gradation current transistors Tr62-Tr65 are individually connected in between the voltage contact +V and contacts Nq, Nr, Ns and Nt, along with the control terminals connected in common to contact Np. A capacitor C1 is connected in between the above-mentioned contact Np and the voltage contact +V. Further, the switching circuit TS1 is connected in between the current input INi and the above-mentioned contact Nm, and the switching circuit TS2 is connected in between the above-mentioned contact Nm and contact Np.

Resembling the current generation section 20B mentioned above, the switching circuit 22C is configured with Pch transistors Tr66-Tr69 applied in parallel connected in between each of the above-mentioned contacts Nq, Nr, Ns and Nt and the current output contact OUTi, along with the output signals d10*-d13* output to each control terminal from a plurality of latch circuits.

Thus, also in this embodiment, the current mirror 21C is formed so the transistor size of each gradation current transistor Tr62-Tr65 consists of a predetermined ratio based on the reference current transistor Tr61, and the gradation current Idsq-Idst which flows to each current path is set up so the current value of each one is a different predetermined ratio as opposed to the current (reference current Iref) which flows to the reference current transistor Tr61. Accordingly, in response to the signal levels of output signals d10*-d13*, the specified transistors Tr66-Tr69 of the switching circuit section 22C perform an "ON" operation. The gradation currents Idsq, Idsr, Idss, Idst which have a current value twice the predetermined ratio of the reference current Iref flows via the gradation current transistors Tr62-Tr65. Random gradation currents are selected and integrated from a plurality of the gradation currents Idsq, Idsr, Idss and Idst, the drive current ID is generated and output from the current output contact OUTi.

Further, the current mirror circuit 21C related to this embodiment is configured with the switching circuit TS1 formed between the current input contact INi and contact Nm, and the switching circuit TS2 formed between contact Nm and contact Np. The switching circuits TS1 and TS2 perform setting control to correctly execute the "ON" and "OFF" operations. Thus, the switching circuits TS1 and TS2 are configured to supply or cutoff the current path of the reference current Iref of reference current transistor Tr61, as well as perform switching control of the connection or cutoff between the current path of the reference current transistor Tr61 and the control terminal.

Here, for example as shown in FIG. 11, specifically the switching circuits TS1 and TS2 can be configured with an Nch FET so the switching control of the "ON" and "OFF" state is performed by a single control signal rck (described later in detail). In the circuit arrangement shown in FIG. 11, by applying a high-level control signal rck, both the switching circuits TS1 and TS2 perform an "ON" operation. Thus, the reference current Iref generated by the current generator is supplied to contact Nm and contact Np, and performs an "ON" operation of the reference current transistor Tr61. Likewise, by applying a low-level control signal rck, both of the switching circuits TS1 and TS2 perform an "OFF" operation and isolate supply of the reference current Iref to contact Nm and contact Np, and performs an "OFF" operation of the reference current transistor Tr61.

Additionally, when applied to the data driver which describes a plurality of current generation circuits comprising a current generation section 20C later in this embodiment, generation of the drive current in each current generation circuit is addressed. By performing "ON" and "OFF" control selectively of switching circuits TS1 and TS2 formed in each of current generation circuits; perform an "ON" operation only of the switching circuits TS1 and TS2 formed in any one current generation circuit; and perform and "OFF" operation of the switching circuits TS1 and TS2 formed in the other current generation circuits, it controls all at one time so the reference current Iref is supplied only to the relevant current generation circuit. Accordingly, as reference current Iref is supplied to the reference current transistors of only one current generation circuit of the plurality of current generation circuits, drive current is generated based on the present reference current Iref.

Furthermore, the current generation circuit shown in this embodiment and a configuration which can realize the equivalent functions, for example, the current generation section 20D (current mirror circuit 21D) which has the circuit arrangement shown in FIG. 12 can also be applied. In other words, the current mirror circuit 21D shown in FIG. 12, in addition to the reference current transistor Tr61 and the gradation current transistors Tr62-Tr65 which constitute a current mirror circuit equivalent to the current mirror circuit 21C as shown in FIG. 11, has a configuration comprising a switching circuit TS3 connected in between the current input contact INi and the current path of the reference current transistor Tr61, and a switching circuit TS4 connected between the current input contact INi and the control terminal (contact Np) of the reference current transistor Tr61.

Thus, the current mirror circuit 21D, along with the current mirror circuit 21C shown in FIG. 11, the above-mentioned switching circuits TS3 and TS4 are configured so the switching control supply or cutoff to the reference current Iref current path and control terminal of the reference current transistor Tr61 may be performed.

In addition, in this embodiment although the circuit arrangement attached the switching circuits TS1-TS2 or TS3-TS4 to a configuration comprises the current generation section 20B shown in FIG. 5, that is, the current mirror circuit 21B and the switching circuit 22B which are configured with Pch transistors is shown, this invention is not limited to this type only. Thus, the current generation section 20A shown in FIG. 3, it is possible to have a circuit arrangement with attached switching circuits TS1-TS2 or TS3-TS4 in a configuration comprises the current mirror circuit 21A and the switching circuit 22A consisting of Nch transistors. The switching circuits TS1-TS2 or TS3-TS4 are not limited to Nch transistors as Pch transistors may also be used, as well as perform switching control of the "ON" and "OFF" states with signals of the opposite polarity of the above-mentioned control signal rck. A detailed configuration of a current generation circuit comprising these current generation sections is shown in the configuration of the display device data driver described later.

2. Display Device

A current generation circuit which has such a composition and functions mentioned above is applicable as a favorable pixel driver circuit which forms the drive control device of a display device or the display pixels of a display panel. A display device comprising such a current generation circuit related to the present invention will be described in detail below.

First, an embodiment in the case of applying a current generation circuit related to this invention to the drive control device of a display device will be explained with reference to the drawings.

<<The First Embodiment of the Display Device>>

Figure 13:
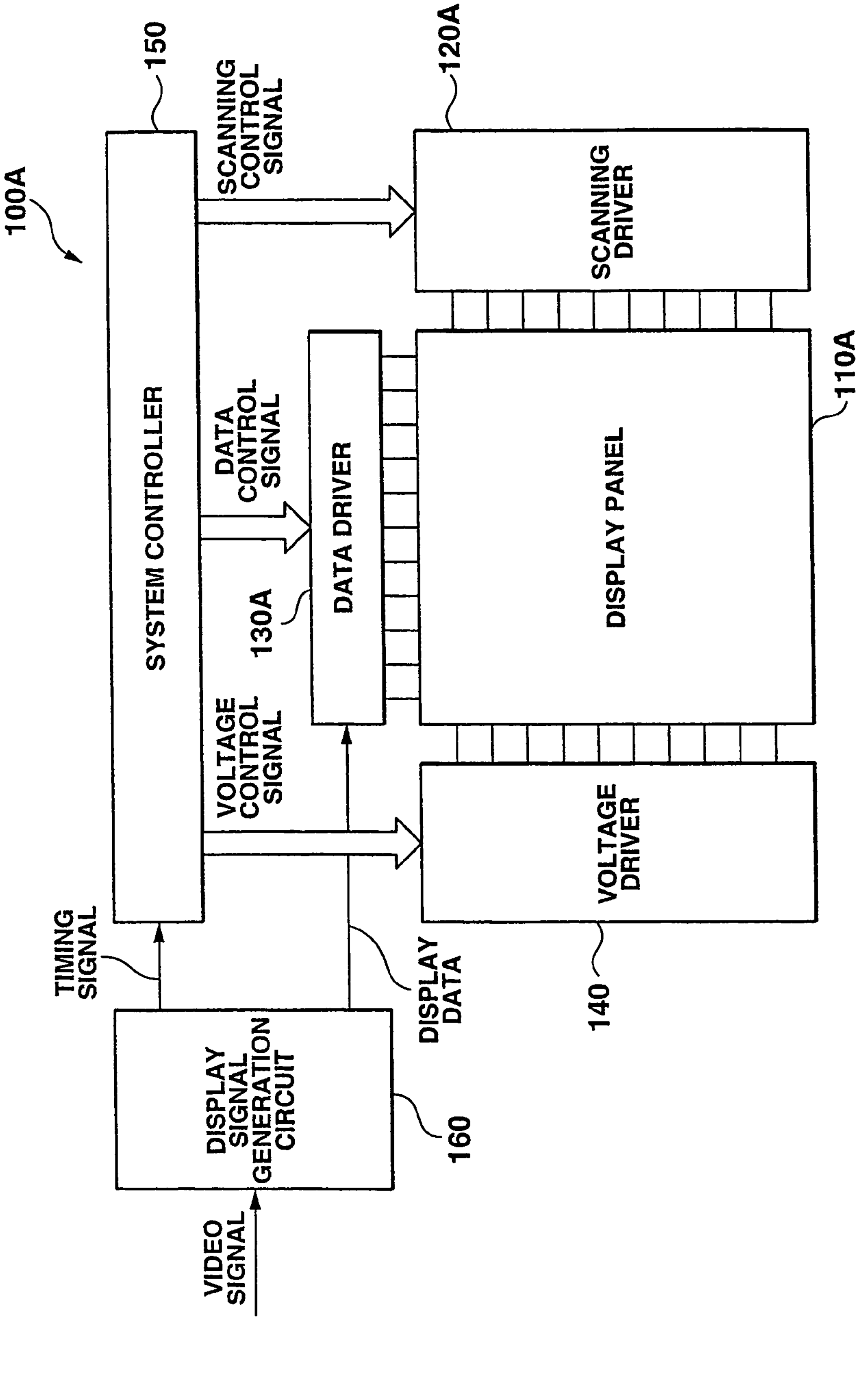
FIG. 13 is an outline block diagram showing the first embodiment of the display device related to this invention.

FIG. 13 is an outline block diagram showing the first embodiment of the display device related to this invention.

Figure 14:
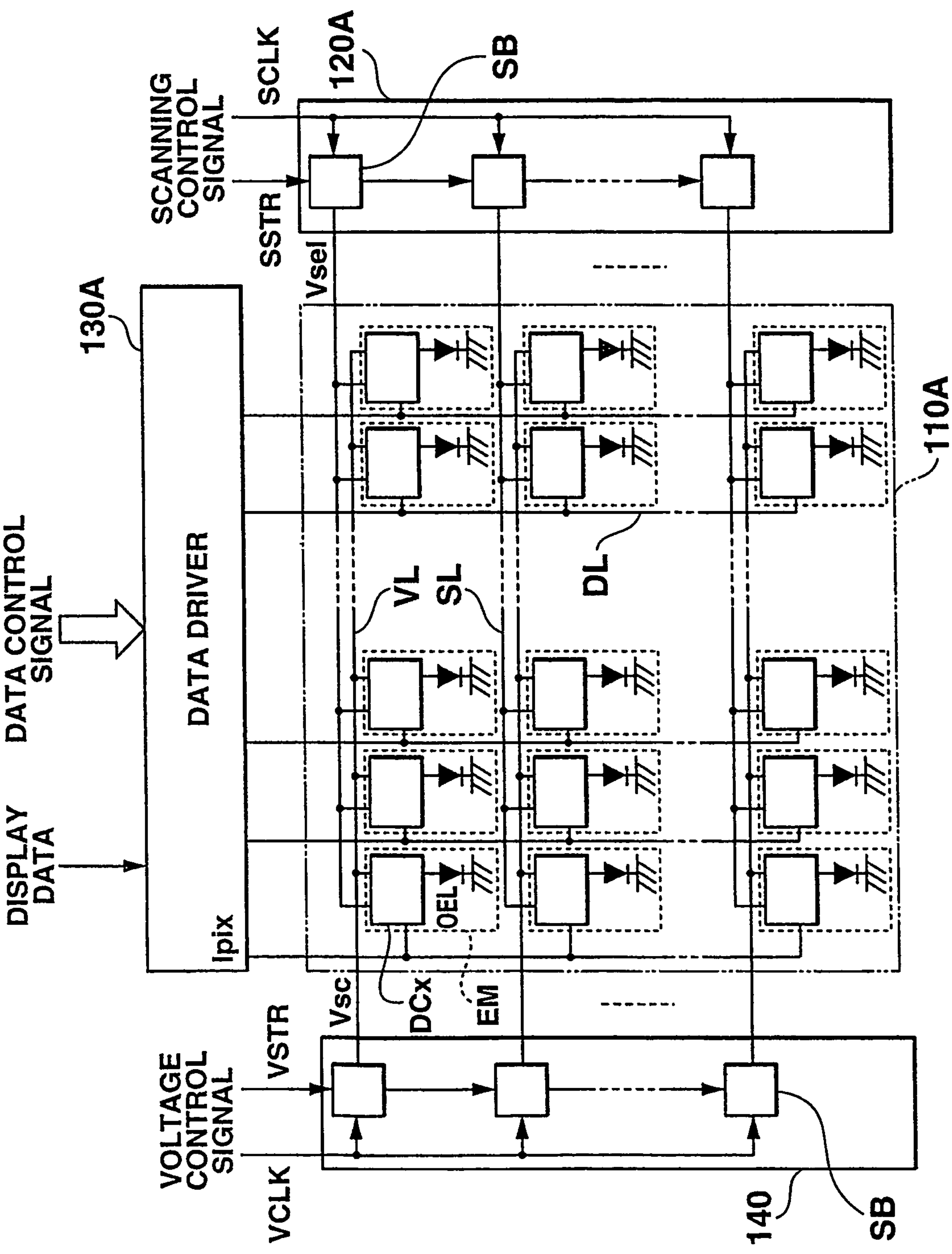
FIG. 14 is an outline block diagram showing an example of the configuration of the display panel applied to the display device related to this embodiment.

FIG. 14 is an outline block diagram showing an example of the configuration of the display panel applied to the display device related to this embodiment.

Figure 15:
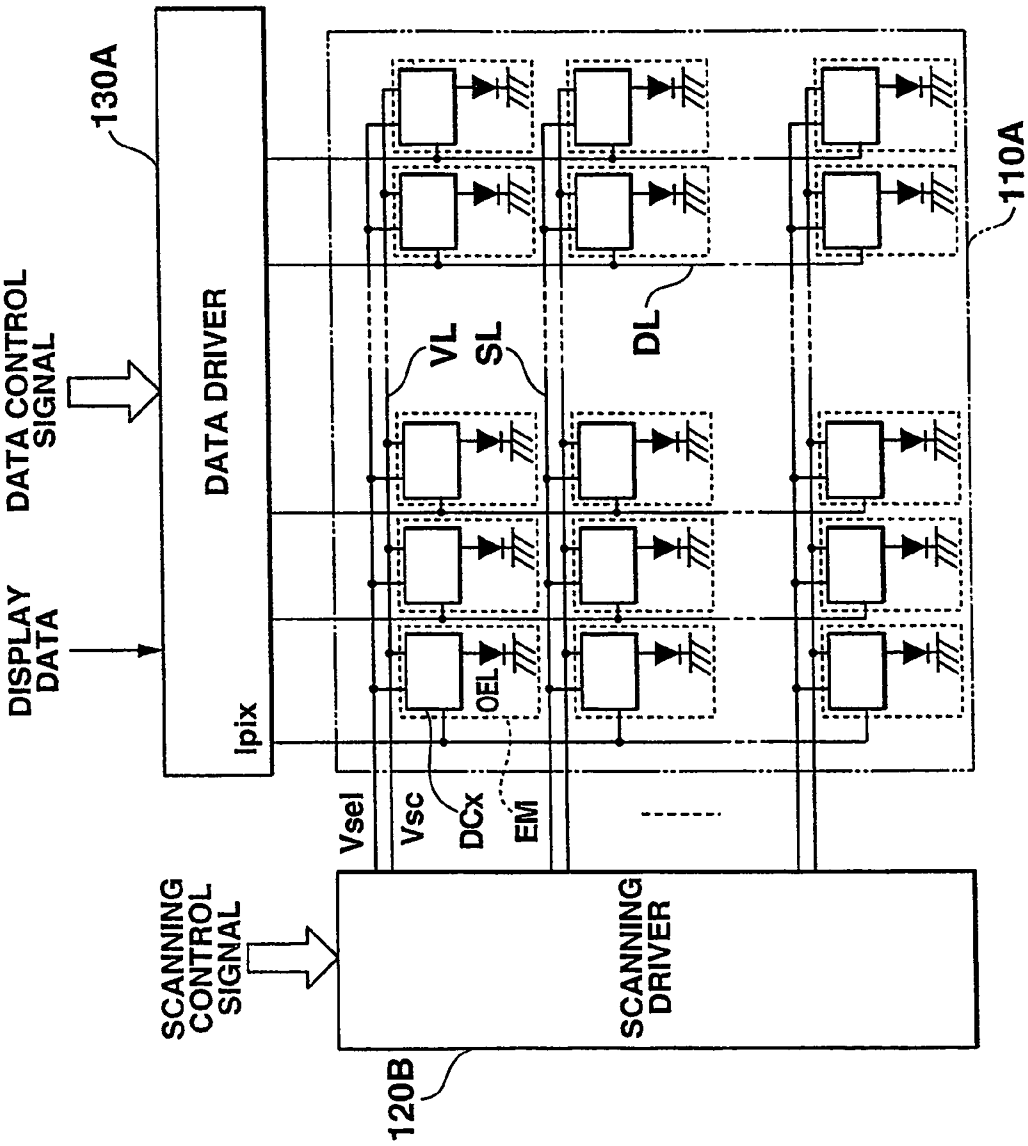
FIG. 15 is an outline block diagram showing another example of the configuration of the display device related to this embodiment.

FIG. 15 is an outline block diagram showing another example of the configuration of the display device related to this embodiment.

Here, explanation will be made to the configuration comprising display pixels corresponding to an active-matrix display panel. Also, in this embodiment, explanation will be made to the adopted configuration of the current sinking method.

As shown in FIGS. 13-14, a display device 100A related to this embodiment, in brief, comprises a display panel 110 consisting of a plurality of display pixels EM arranged in a matrix shape; a scanning driver 120A (scanning driver circuit) connected to the scanning lines SL; a data driver 130A (signal driver circuit) connected to the signal lines DL; a voltage driver 140 connected to the voltage lines VL connected in common for every display pixel cluster arranged in the line writing direction of the display panel 110A and arranged in parallel to the above-mentioned scanning lines SL; a system controller 150 output which generates various control signals to control the operating state of the scanning driver 120A, the data driver 130A and the voltage driver 140; and a display signal generation circuit 160 which generates display data, the timing signal and the like based on a video signal supplied externally from the display device 100A.

Hereinafter, explanation of each of the above-mentioned construction will be explained in detail.

<<Display Panel>>

Specifically, the display panel 110A as shown FIG. 14, has a plurality of scanning lines SL and voltage lines VL, a plurality of the signal lines DL (data lines) and a plurality of display pixels EM. The plurality of scanning lines SL is arranged in parallel with each other. The plurality of the signal lines DL are arranged to intersect perpendicularly with the scanning lines SL and the voltage lines VL. The plurality of display pixels EM are arranged close to the intersecting point of each line that intersects perpendicularly. (A configuration which forms pixel driver circuits DCx and organic EL devices described later.)

The display pixels EM, for example, consist of having pixel driver circuits DCx and optical elements. The pixel driver circuits DCx control the write-in operation of the write-in current Ipix and a light generation operation in each of the display pixels EM, based on the scanning signal Vsel applied via the scanning lines SL from the scanning driver 120, and the write-in current Ipix (drive current) supplied via the signal lines DL from the data driver 130A, and the power supply voltage Vsc applied via the voltage lines VL from the voltage driver 140. The optical elements consist of light emitting elements, which are universally known organic EL devices OEL as the current drive type optical elements by which the light generation luminosity (also known as brightness or intensity) is controlled according to the current value of the light generation drive current supplied from the pixel driver circuits DCx. In this embodiment, although the case where the organic EL devices OEL are applied as the current drive type light emitting elements, light emitting elements beside light emitting diodes and the like may be applied.

Here, the pixel driver circuits DCx, briefly, have the functions to take in write-in current Ipix in response to the display data selection state and hold as the voltage level, which is controlled according to the selection/non-selection state of each of the display pixels EM in response to the scanning signal Vsel; to supply light generation drive current to the organic electroluminescent (EL) devices OEL (hereinafter referred to as organic EL devices) (optical elements) according to the voltage level held (above-mentioned) in the non-selection state; and to maintain operation to emit light by predetermined luminosity gradation. In addition, explanation of a possible example circuit arrangement applicable to the pixel driver circuits DCx will be described later.

<<Scanning Driver>>

The scanning driver 120A sets the selection state for each line of the display pixel clusters by sequentially applying the scanning signal Vsel to each scanning lines SL at predetermined timing, based on the scanning control signal supplied from the system controller 150; supplies the write-in current Ipix based on the display data to each of the signal lines DL by the data driver 130A; and controls the write of predetermined write-in current in each display pixel.

Specifically, the scanning driver 120A shown in FIG. 14 is formed by a shift block SB consisting of a shift register and a buffer and has a plurality of steps. In this scanning driver 120, shift signals are output sequentially shift from the upper part to the lower part of the display panel 110A by a shift register and are applied to each of the scanning lines SL as the scanning signal Vsel, which have a predetermined voltage level (selection level) via a buffer, based on a scanning control signal (scanning start signal SSTR, scanning clock signal SCLK and the like) supplied from the system controller 150.

<<Data Driver>>

The data driver 130A takes in and holds the display data which comprises a plurality of digital signal bits supplied from the display signal generation circuit 160, based on the data control signals supplied from the system controller 150; generates a write-in current Ipix which has a current value according to the relevant display data; and controls the write-in current supply to each of the signal lines DL simultaneously and parallel. Thus, in the data driver 130A related to this embodiment, the current generation circuit of each embodiment mentioned above is favorably compatible. A detailed circuit arrangement example of the data driver 130A and its drive control operation will be described later.

<<Voltage Driver>>

The voltage driver 140 draws in the predetermined write-in current Ipix based on the display data and synchronizing with the timing sets the selection state for each line of every display pixel cluster from the scanning driver 120 based on a voltage control signal supplied from the system controller 150, by applying the power supply voltage Vsc selection level (For instance, a low-level set less than the ground supply (voltage to ground)) to the voltage lines VL, for example, in the direction of the data driver 130A via the display pixels EM (pixel driver circuits DCx) from the voltage lines VL. Meanwhile, the voltage driver 140 controls the flow of the light generation drive current equivalent to the above-mentioned write-in current Ipix in the direction of the organic EL devices OEL (optical elements) via the display pixels EM (pixel driver circuits DCx) from the voltage lines VL, synchronizing with the timing sets of the non-selection state for each line of every display pixel cluster from the scanning driver 120 by applying the power supply voltage Vs. non-selection level (For example, a high-level) to the voltage lines VL.

Specifically, the voltage driver 140 shown in FIG. 14 is formed by a shift block SB consisting of a shift register and a buffer like the scanning driver 120A mentioned above corresponding to each and every one of the voltage lines VL, has a plurality of steps and supplied from the system controller 150. In this voltage driver 140, based on a voltage control signal (a power start signal VSTR, a voltage clock signal VCLK and the like) which synchronizes with the above-mention scanning control signal, shift signals are output sequentially shift from the upper part to the lower part of the display panel 110A from a shift register and applied to each of the voltage lines VL as the power supply voltage Vsc, which has a predetermined voltage level via a buffer.

<<System Controller>>

The system controller 150 receives each of at least the scanning driver 120A, the data driver 130A and the voltage driver 140 according to the timing signal supplied from the display signal generation circuit 160 described later. By generating and outputting the scanning control signal (the scanning start signal SSTR, the scanning clock signal SCLK and the like which were mentioned above), the data control signals and a voltage control signal (the power start signal VSTR, the voltage clock signal VCLK and the like which were mentioned above), each driver operates to predetermined timing. The power supply voltage Vsc, the scanning signal Vsel and the write-in current Ipix are made to output to the display panel 110A; perform continuously predetermined drive control operations in the pixel driver circuits DCx; and perform control to the display panel 110A made to display predetermined image information based on the video signal.

The system controller 150 generates and outputs the scanning control signal, the data control signals (the scanning start signal SSTR, the scanning clock signal SCLK; the sampling start signal STR and the shift clock signal SFC and the like; the voltage control signal (the power start signal VSTR and the voltage clock signal VCLK and the like) to each of at least the scanning driver 120A, the data driver 130A and the voltage driver 140 according to the timing signal supplied from the display signal generation circuit 160 described later. By generating and outputting the above mentioned signals, the system controller 150 performs each driver to operate at predetermined timing; to output the power supply voltage Vsc, the scanning signal Vsel and the write-in current Ipix to the display panel 110A; to perform continuously predetermined drive control operations in the pixel driver circuits DCx; and to perform control to the display panel 110A made to display predetermined image information based on the video signal.

<<Display Signal Generation Circuit>>

The display signal generation circuit 160, for example, extracts the luminosity gradation signal component from the video signal supplied from outside the display device 100A; supplies a luminosity gradation signal component for every one line period (horizontal scanning period) of the display data panel 110A; and supplies the display data and the data driver 130A, which is made up from a plurality of digital signal bits. Here, when the above-mentioned video signal contains the timing signal component which specifies the display timing of image information such as a television broadcasting signal (composite video signal), the display signal generation circuit 160 has a function which extracts the timing signal component supplied to the system controller 150 and another function which extracts the above-mentioned luminosity gradation signal component. In this case, the above-mentioned controller 150 generates the above-mentioned scanning control signal, the data control signal and the voltage control signal supplied to the scanning driver 120, the data driver 130A and the voltage driver 140 based on the timing signal supplied from the display signal generation circuit 160.

In addition, although in this embodiment, as shown in FIG. 13 and FIG. 14, a configuration which arranges individually the scanning driver 120A and the voltage driver 140 as the driver attached on the periphery of the display panel 110A was explained, this invention is not limited to this. For example, as mentioned above, since it operates based on an equivalent control signal (the scanning control signal and the voltage control signal) which has synchronized timing, as shown in FIG. 15, the scanning driver 120A and the voltage driver 140 may be formed, for example, so it has a function which supplies the power supply voltage Vsc synchronizing the output timing with generation of the scanning signal Vsel to the scanning driver 120B. According to such an arrangement, the configuration of the periphery circuit can be simplified and made space-saving.

Furthermore, the configuration of the display device as shown in FIGS. 13-15, the pixel driver circuits DCx formed in each of the display pixels EM form the display panel by performing setting control according to the status of the power supply voltage Vsc signal levels with the scanning signal Vsel described later (Reference FIG. 16). Although corresponding to a situation whereby the circuit arrangement realizes a predetermined drive control operation, in order that this invention not be limited to this, it will be described later (Reference FIG. 20). For example, the pixel driver circuit directly connected to the high supply voltage may have a circuit arrangement by which a regular constant voltage level is applied and set to the display device shown in FIG. 13 and FIG. 14 in this case. A configuration which does not have a voltage driver 140 is also applicable.

<<Pixel Driver Circuit>>

Subsequently an example of the configuration of the pixel driver circuit as applied to each display pixel of the display panel mentioned above will be described.

Figure 16:
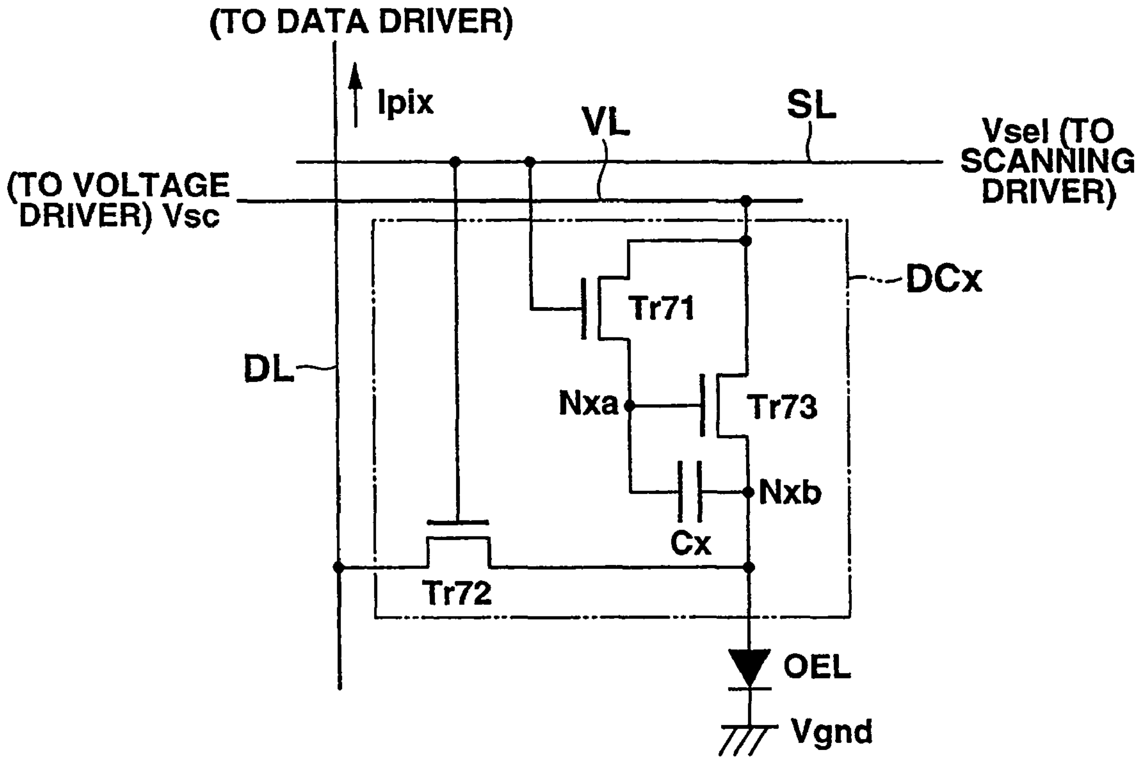
FIG. 16 is a circuit arrangement drawing showing an example of one configuration of the pixel driver circuit corresponding to the current sinking method applicable to the display device related to this embodiment.

FIG. 16 is a circuit arrangement drawing showing an example of one configuration of the pixel driver circuit corresponding to the current sinking method applicable to the display device related to this embodiment.

In addition, the pixel driver circuit shown here only represents an example applicable to the display device related to this invention. Needless to say, there can be other circuit arrangements having an equivalent operational function.

As shown in FIG. 16, the pixel driver circuits DCx related to this example case has a configuration an Nch transistor Tr71, an Nch transistor Tr72, an Nch transistor Tr73 and a capacitor Cx. In the pixel driver circuits DCx, near the intersecting point in which the scanning lines SL and the signal lines DL are arranged so these lines intersect at right angles with each other, the Nch transistor Tr71 is individually connected by means of the source terminal to contact Nxa, the drain terminal to the voltage lines VL arranged in parallel with the scanning lines SL and the gate terminal to the scanning lines SL. An Nch transistor Tr72 is individually connected by means of the gate terminal to the scanning lines SL, as well as the drain terminal and the source terminal is individually connected to the signal lines DL and contact Nxb. An Nch transistor Tr73 is individually connected by means of the gate terminal to contact Nxa, and the drain terminal and source terminal individually connected to the voltage lines VL and contact Nxb. The capacitor Cx is connected in between contact Nxa and Nxb.

Additionally, the organic EL devices OEL described earlier for light generation luminosity are controlled by the light generation drive current supplied from the pixel driver circuits DCx. The organic EL devices OEL anode terminal is connected to contact Nxb of the above-mentioned pixel driver circuit, and the cathode terminal is individually connected to the low supply voltage Vgnd (voltage to ground). Here, the capacitor Cx may be parasitic capacitance formed in between the gate-source of the Nch transistor Tr73, and a capacitative element (a capacitor) can be attached (added) separately in between the gate-source in addition to the parasitic capacitance.

Initially, the drive control operation of the organic EL devices OEL in the pixel driver circuits DCx of such construction, in a write-in operation period, while applying a high-level (selection level) scanning signal Vsel to the scanning lines SL, the power supply voltage Vsc at the same time applies a low-level to the voltage lines VL. Also, synchronizing with this timing, the pixel driver circuits DCx supplies the predetermined write-in current Ipix (equivalent to the drive current ID mentioned above) to the signal lines DL, which is required to perform a light generation operation of the organic EL devices OEL byway of predetermined luminosity gradation. Here, negative polarity current is supplied as the write-in current Ipix and set up so the relevant current is drawn in the direction of the data driver 130A via the signal lines DL from the side of the pixel driver circuits DCx (current sinking method).

Accordingly, Nch transistors Tr71 and Tr72 which constitute the pixel driver circuits DCx perform an "ON" operation. At the same time, a low-level of the power supply voltage Vsc is applied to contact Nxa (Namely, the gate terminal of the Nch transistor Tr73 and one end side of the capacitor Cx), along with a low supply voltage level applied to contact Nxb (Namely, the source terminal side of the Nch transistor Tr73 and the other end side of the capacitor Cx) rather than a low-level of the power supply voltage Vsc via the Nch transistor Tr72 by the drawing in operation of the write-in current Ipix.

In this way, when a voltage potential difference occurs between the contacts Nxa and Nxb (between the gate-source of the Nch transistor Tr73), Nch transistor Tr73 performs an "ON" operation and the write-in operating current according to the write-in current Ipix flows in the signal lines DL direction via Nch transistor Tr73, contact Nxb and Nch transistor Tr72 from the voltage lines VL (Reference FIG. 19 described later).

At this time, the electric charge corresponding to the voltage potential difference produced between the contacts Nxa and Nxb is stored in capacitor Cx, and is held as the voltage component (the capacitor charges). Also, at this time since the supply applied to the anode terminal (contact Nxb) of the organic EL device OEL becomes lower than the supply (voltage to ground) of the cathode terminal, reverse-bias voltage is applied to the organic EL devices OEL. The light generation drive current does not flow into the organic EL devices OEL, and light generation is not performed.

Subsequently, in the light generation operation period, at the same time it applies a low-level (non-selection level) scanning signal Vsel to the scanning lines SL, a high-level of the power supply voltage Vsc is applied to the voltage lines VL. Also, synchronizing with this timing, the drawing in operation of the write-in current Ipix (Namely, write-in control current) is suspended.

Accordingly, since application of the voltage level resulting from the drawing in operation of the write-in current Ipix to contact Nxb is interrupted (shut down) while Nch transistors Tr71 and Tr72 perform an "OFF" operation, application of the power supply voltage Vsc to contact Nxa is accordingly interrupted. The capacitor Cx then holds the electric charge stored in the write-in operation mentioned above.

In this way, when capacitor Cx holds the charge voltage at the time of the write-in operation, the voltage potential difference between contact Nxa and Nxb (between gate-source of the Nch transistor Tr73) will be held, and Nch transistor Tr73 maintains an "ON" state. Also, because the power supply voltage Vsc which has a voltage level higher than the voltage to ground is applied to the voltage lines VL, the supply applied to the anode terminal (contact Nxb) of the organic EL devices OEL becomes higher than the supply (voltage to ground) of the cathode terminal.

Therefore, the light generation drive current flows into the organic EL devices OEL in the forward-bias direction via Nch transistor Tr73 and contact Nxb from the voltage lines VL, and the organic EL devices OEL emit light by predetermined luminosity gradation. Here, since the voltage potential difference (charge voltage) held by the capacitor Cx is equivalent to the voltage potential difference when flowing in the write-in operating current to Nch transistor Tr73 at the time of the above-mentioned write-in operation, the light generation drive current which flows to the organic EL devices OEL will have the current value equivalent to the above-mentioned operating current. Accordingly, in the light generation operation period, based on the voltage component in response to the predetermined light generation state (luminosity gradation) written in the write-in operation period, the light generation drive current will be supplied continuously and the organic EL devices OEL continue operation and emit light by the desired luminosity gradation (Reference FIG. 19 described later). In this way, in the pixel driver circuit related to this embodiment, Nch transistor Tr73 has the function as the transistor for light generation drive.

<<The First Embodiment of the Data Driver>>

Subsequently, the first embodiment of the data driver applied to the display device related to this invention will be explained. The current generation circuit of each of the above-mentioned embodiment is formed individually in each signal line, and the data driver related to this embodiment is constituted so the supplied reference current has a constant value via a common current supply source line from a single current generator for example, as opposed to each current generation circuit.

Figure 17:
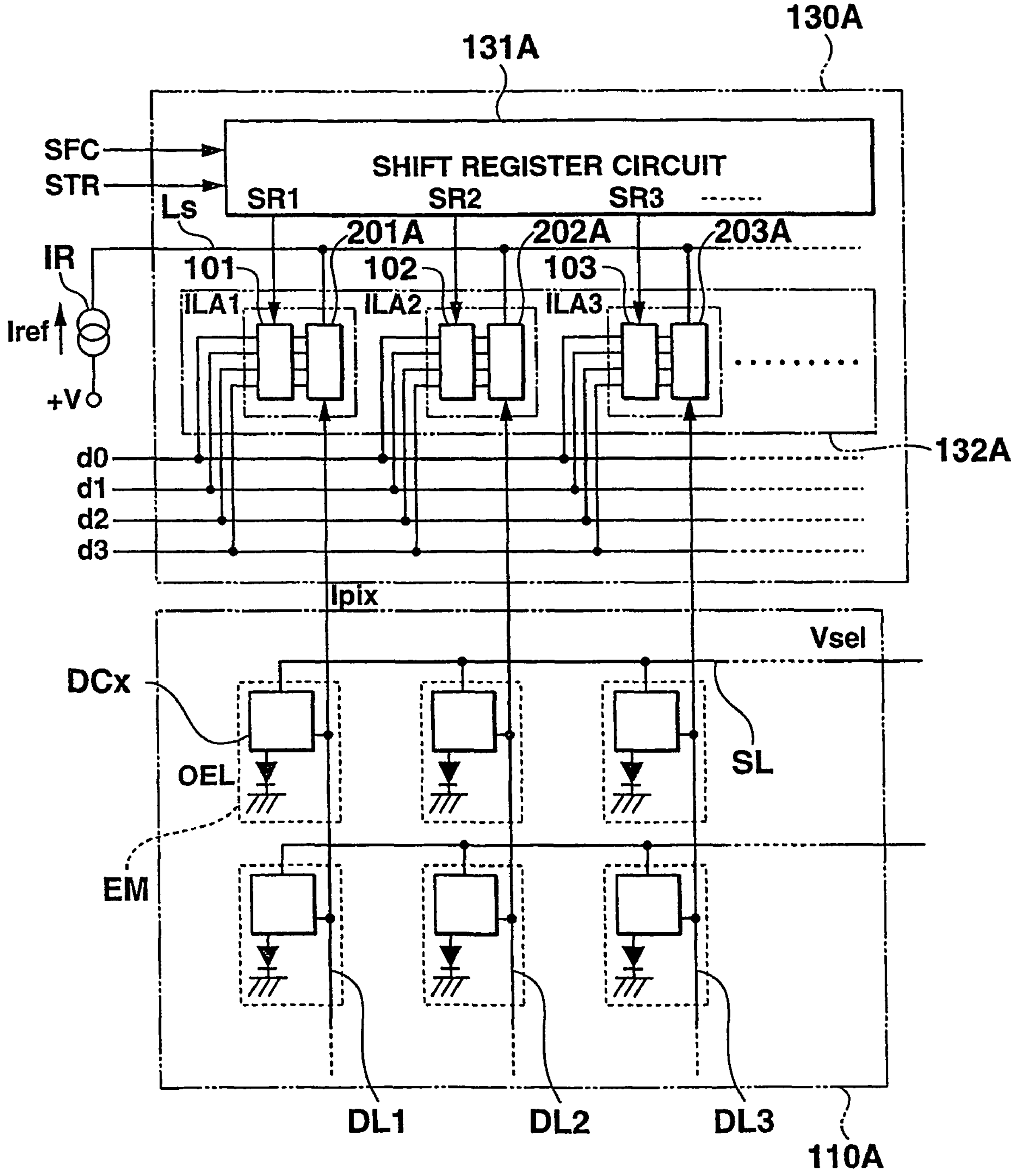
FIG. 17 is a circuit arrangement drawing showing the configuration of the first embodiment of the data driver in the display device concerning this invention.

FIG. 17 is a circuit arrangement drawing showing the configuration of the first embodiment of the data driver in the display device concerning this invention.

Here, an explanation will be provided matching the configuration of the current generation circuit mentioned above. Furthermore, with reference to any configuration equivalent in each embodiment mentioned above, the same or equivalent nomenclature is appended and hereinafter the explanation is simplified or omitted from the description.

As shown in FIG. 17 for example, the data driver 130A related to this embodiment has a configuration which has a shift register circuit 131A which outputs sequentially the shift signals SR1, SR2, SR3 . . . (equivalent to the timing control signal CLK mentioned above) to predetermined timing, while shifting a sampling start signal STR based on a shift clock signal SFC supplied as data control signal from the system controller 150; a write-in current generation circuit cluster 132A which takes in sequentially the display data d0-dk (Here, equivalent to the digital signals d0-d3 mentioned above which are set to k=3 for convenience of explanation) in one line periods supplied sequentially from the display signal generation circuit 160 based on the timing input of the shift signals SR1, SR2, SR3 . . . from the shift register circuit 131A, generates the write-in current Ipix in response to the light generation luminosity in each of the display pixels EM, and supplied via each of the signal lines DL1, DL2, DL3, A common reference current supply line Ls which regularly supplies the reference current Iref that has a constant current value to each of the write-in current generation circuits ILA1, ILA2, ILA3 . . . , which form the write-in current generation circuit cluster 132A. The reference current Iref from the current generator IR (equivalent to the current generator IRA mentioned above) is formed externally of data driver 130A. Here, the configuration of the current generation circuit ILA of the first embodiment mentioned above is applied to each of the write-in current generation circuits ILA1, ILA2, ILA3 . . . , which form the write-in current generation circuit cluster 132A, provided with the signal latch circuits 101, 102, 103 . . . (equivalent to the signal latch section 10 mentioned above) and the current generation circuits 201A, 202A, 203A, . . . (equivalent to the current generation section 20A mentioned above).

<<Drive Control Method>>

Next, the drive control method of the display device which has the configuration mentioned above will be explained with reference to the drawings.

Figure 18:
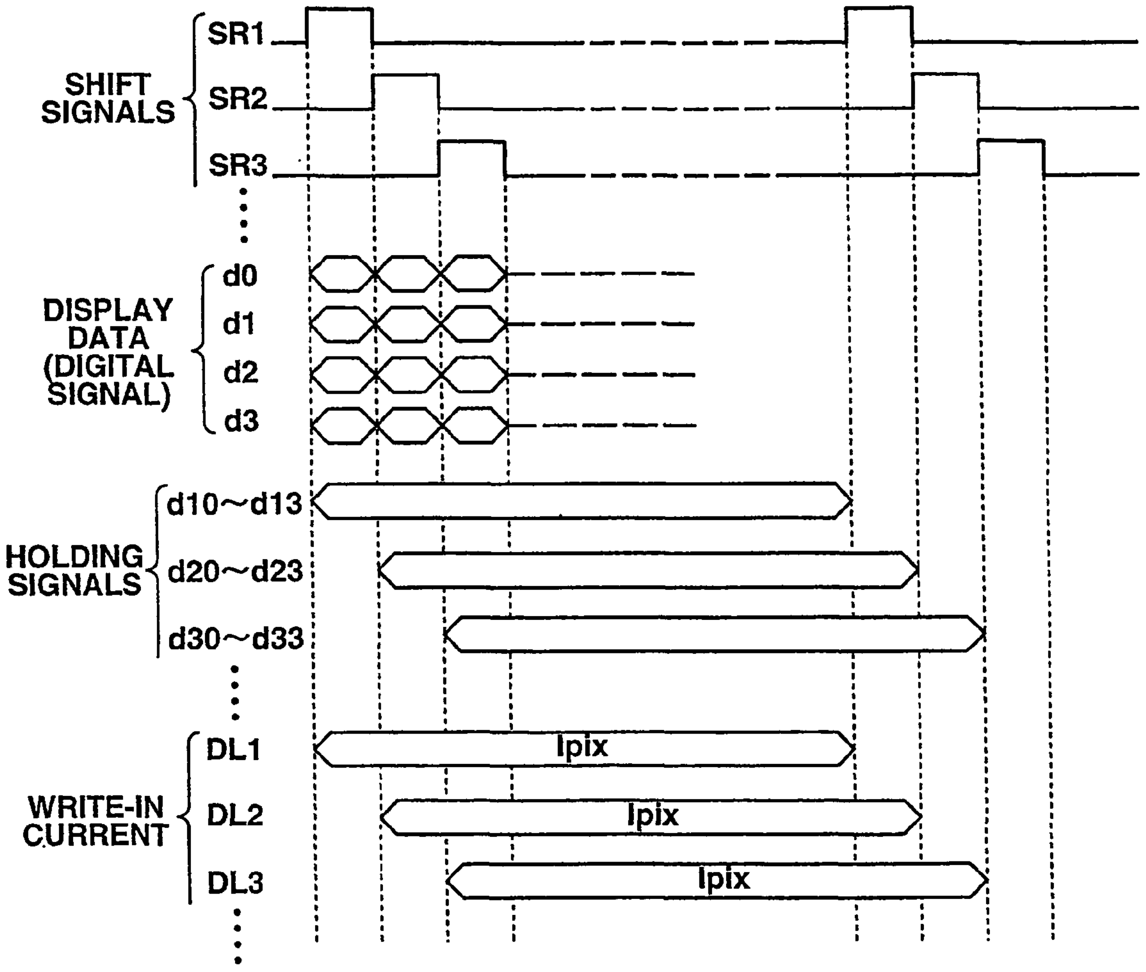
FIG. 18 is a timing chart which shows an example of the drive control operation of the data driver in this embodiment.

FIG. 18 is a timing chart which shows an example of the drive control operation of the data driver in this embodiment.

Figure 19:
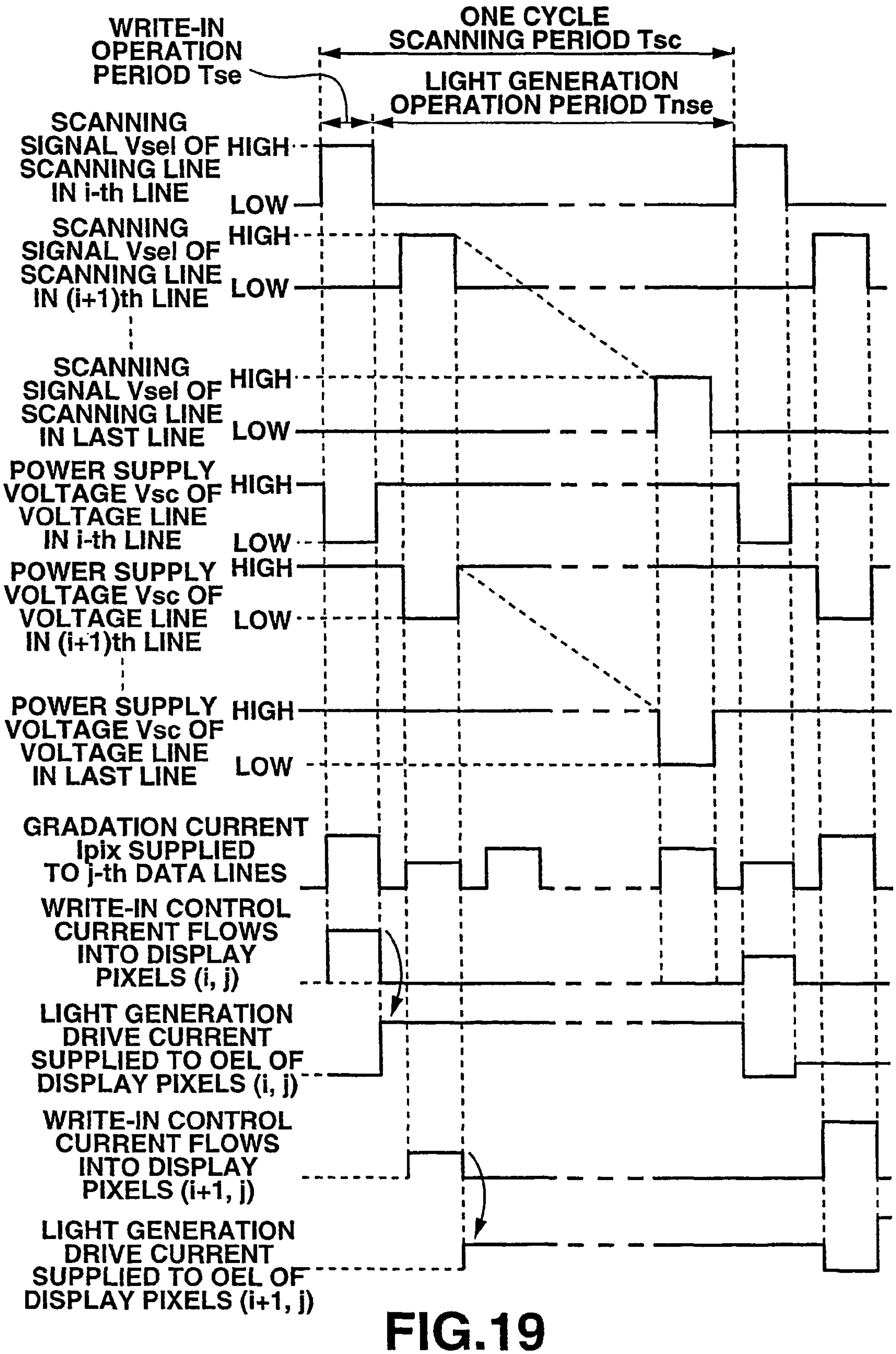
FIG. 19 is a timing chart which shows an example of the drive control operation of the display panel in this embodiment.

FIG. 19 is a timing chart which shows an example of the drive control operation of the display panel in this embodiment.

Here, in addition to the configuration shown in FIG. 17, explanation will accordingly refer to the configuration of the current generation circuit shown in FIG. 1 and FIG. 3.

Initially, the drive control operation in the data driver 130A performs a signals holding operation which takes in the display data d0-d3 supplied from the display signal generation circuit 160 to the signal latch circuits 101, 102, 103 . . . formed in the write-in current generation circuits ILA1, ILA2, ILA3 . . . mentioned above and holds the display data d0-d3 during a fixed period; and performs by setting the current generation supply operation which generates the write-in current Ipix according to the above-mentioned display data d0-d3 that is supplied to each display pixel via each of the signal lines DL1, DL2, DL3 . . . , based on the holding signals d10-d13, d20-d23, d30-d33, of the display data d0-d3 taken in by the signals holding operation from the current generation circuits 201A, 202A, 203A, . . . formed in the write-in current generation circuits ILA1, ILA2, ILA3 . . . .

Here, in the signals holding operation, as shown in FIG. 18, based on the shift signals SR1, SR2, SR3, . . . which are output sequentially from the shift register circuit 131A, the operation takes in sequentially the display data d0-d3 which changes in response to each line of display pixels EM (Namely, each of the signal lines DL1, DL2, DL3, . . . ) from each of the above-mentioned signal latch circuits 101, 102, 103 . . . and performed continuously in one line periods. The display data d0-d3 are taken in sequentially from the signal latch circuits 101, 102, 103, . . . and after a fixed period (The period following shift signals SR1, SR2, SR3, . . . until output.), the holding signals d10-d13, d20-d23, d30-d33, . . . are output to the current generation circuits 201A, 202A, 203A, . . . .

Additionally, in the current generation supply operation, as shown in FIG. 18, based on the holding signals d10-d13, d20-d23, d30-d33, . . . the "ON/OFF" state of a plurality of switching transistors (transistors Tr26-Tr29 shown in FIG. 3) formed in each of the current generation circuits 201A, 202A, 203A, . . . is controlled. A composite current of the gradation current, that flows into the gradation current transistors (transistors Tr22-Tr25 shown in FIG. 3) connected to a switching transistor which performs an "ON" operation, is supplied sequentially via each of the signal lines DL1, DL2, DL3, . . . as the write-in current Ipix.

Here, the write-in current Ipix is controlled to all the signal lines DL1, DL2, DL3, . . . supplied simultaneously in parallel for at least a fixed period.

In addition, as mentioned above in this embodiment, a plurality of gradation currents are generated which have a current value of a predetermined ratio (For example, $2^n$; n=0, 1, 2, 3, . . . ) from the specified transistor size established in advance to the reference current Iref. Based on the above-mentioned holding signals, predetermined gradation currents are selected and integrated in response to the "ON/OFF" operation of the switching transistors. Negative polarity write-in current Ipix is generated in response to the light generation luminosity in each of the display pixels EM, and the write-in current Ipix flows so it may be drawn in the direction of the data driver 130A from the signal lines DL1, DL2, DL3, . . . side.

Also, in the data driver related to this embodiment, as shown in FIG. 17, has a configuration of a plurality of the write-in current generation circuits ILA1, ILA2, ILA3 . . . connected in parallel toward to a common reference current supply line Ls supplied by the reference current Iref which has a constant current value from the current generator IR. As shown in FIG. 18 in each of the current generation circuits ILA1, ILA2, ILA3 . . . , because the write-in current Ipix to each of the signal lines DL1, DL2, DL3, . . . is generated simultaneously and parallel based on the display data d0-d3, the current supplied to each of the current generation circuits ILA1, ILA2, ILA3 . . . via the reference current supply line Ls is not the reference current Iref itself from the current generator IR. Instead, corresponding to the number of write-in current generation circuits (equivalent to the number of signal lines arranged in the display panel 110A; for example, m lines) that operate simultaneously and parallel as mentioned above, current which has a current value (Iref/m) divided almost equally is supplied.

Furthermore, the drive control operation in the display panel 110A, as shown in FIG. 19, sets a one cycle scanning period Tsc (one scanning interval) as one cycle which displays the desired image information on one screen of the display panel 110A; selects the display pixel clusters connected to the specified scanning lines within this one cycle scanning period Tsc; a write-in operation period (selection period) Tsc writes in the write-in current Ipix in response to the display data supplied from the data driver 130A and is held as the signal level; supplies the organic EL devices OEL (optical elements) the light generation current in response to the above-mentioned display data based on the held signal level; establishes the light generation operation period Tnse (non-selection period of the display pixels EM) which performs a light generation operation by way of predetermined luminosity gradation (Tsc=Tse+Tnse); and performs drive control equivalent to the pixel driver circuits DCx mentioned above in each operation period. Here, the write-in operation period Tse is set for every line is set up so a time overlap does not occur with one another. Also, the write-in operation period Tse is at least set as a period comprising a fixed period which supplies in parallel the write-in current Ipix to each signal line in the current generation supply operation of the above-mentioned data driver 130A.

To be exact, the write-in operation period Tse to the display panel, as shown in FIG. 19, performs the operation to instantly hold the write-in current Ipix as the voltage component supplied in parallel to each of the signal lines DL by the data driver 130A by scanning on a predetermined signal levels of the scanning lines SL and the voltage lines VL to the display pixels EM of a specified line (the i-th line) from the scanning driver 120 and the voltage driver 140. In a subsequent light generation operation period Tnse, the light generation operation is continued by luminosity gradation according to the display data by continuously supplying the light generation drive current to the organic EL devices OEL (optical elements) based on the voltage component held during the above-mentioned write-in operation.

As shown in FIG. 19, by performing repeatedly in sequence such a series of drive control operations on each and every line of the display pixel clusters that constitute the display panel 110A, the display data of the display panel for one screen is written in, each of the display pixels EM emit light by predetermined luminosity gradation and the desired image information is displayed.

Consequently, in the data driver 130A and the display device 100A related to this embodiment, the write-in current Ipix is supplied to specified lines of the display pixel clusters via each of the signal lines DL in the data driver 130A and the display device 100A related to this embodiment. Since it is generated from each of the write-in current generation circuits ILA1, ILA2, ILA3 . . . based on the reference current Iref (In detail, the current which is the reference current Iref equally divided by the number of the write-in current generation circuits.) supplied in common via the reference current lines Ls from the current generator IR according to the display data d0-d3 (or the write-in current Ipix) supplied to each of the write-in current generation circuits ILA1, ILA2, ILA3 . . . , the current value does not fluctuate. The limitations of operation resulting from the electrical charge and discharge process of the reference current supply line Ls can be alleviated. Furthermore, significant enhancement in the operating speed of the data driver, the display response characteristics in the display device, as well as the display image quality can be achieved with distinctly improved performance.

Besides, the data driver (write-in current generation circuit), in contrast to the reference current transistors into which the above-mentioned reference current flows, the channel width of a plurality of gradation current transistors that have a circuit arrangement with a current mirror circuit are set so each consists of a predetermined ratio (For example, $2^n$ gradation) Since the write-in current flows to a plurality of gradation currents set to a $2^n$ current value, display data is generable by integrating these according to their status. With a relatively simple circuit arrangement, write-in current can be generated using analog current that has a suitable current value corresponding to the display data (a plurality of digital signal bits), as well as a light generation operation of the display pixels EM can be performed by the proper luminosity gradation.

<<The Second Embodiment of the Data Driver>>

Subsequently, the second embodiment of the data driver applied to the display device related to this invention will be explained.

Although the data driver in the first embodiment of the above-mentioned is configured with a circuit arrangement corresponding to the current sinking method whereby write-in current is drawn in the direction of the data driver from the display pixels, this invention is not limited to this and conversely may be configured with a circuit arrangement of the current application method whereby supplied write-in current flows (pours) in the direction of the display pixels from the data driver.

The data driver concerning this embodiment is configured with a circuit arrangement of the current application method.

Figure 20:
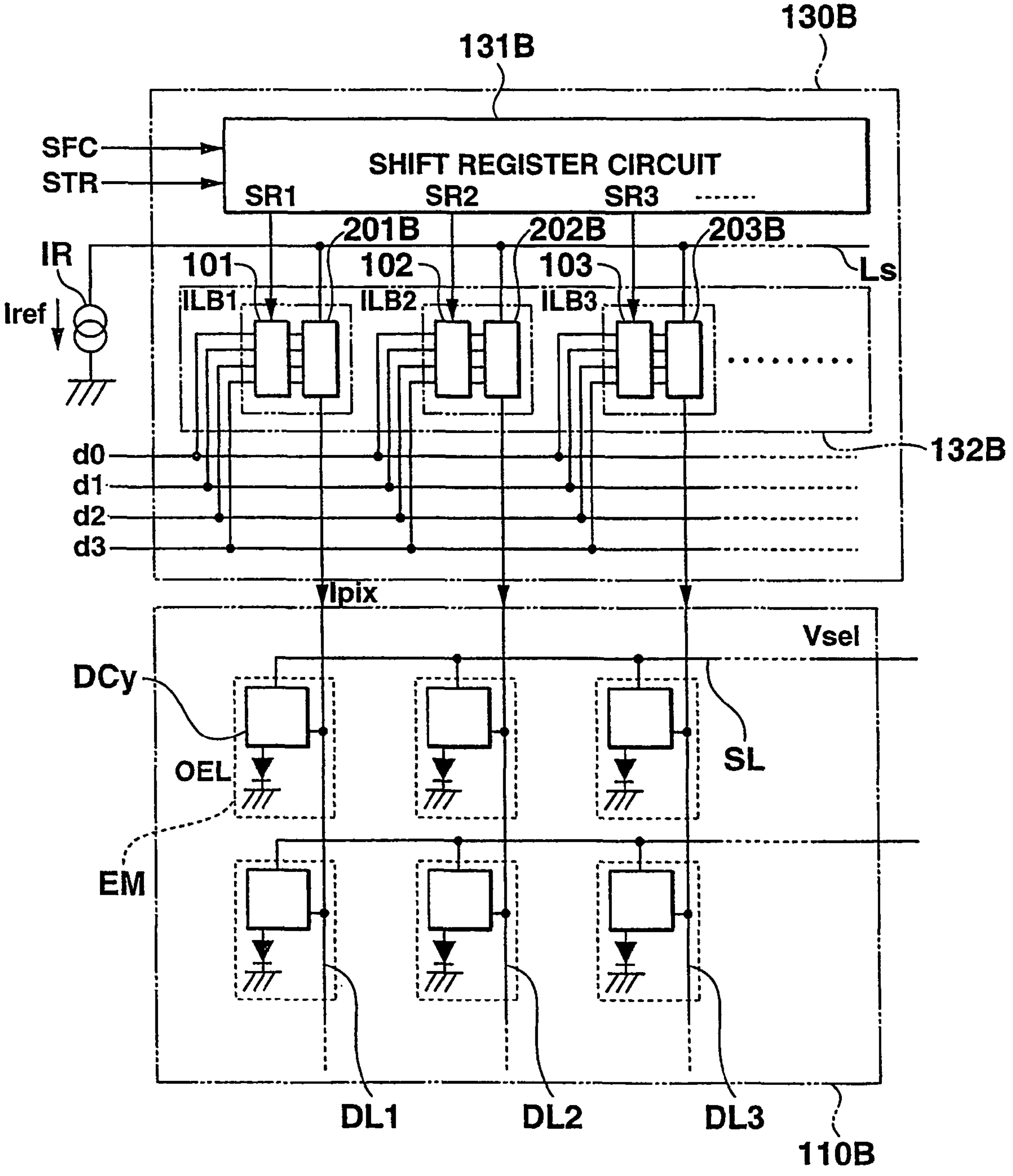
FIG. 20 is a circuit arrangement drawing showing the configuration of the second embodiment of the data driver in the display device related to this invention.

FIG. 20 is a circuit arrangement drawing showing the configuration of the second embodiment of the data driver in the display device related to this invention.

Here, an explanation will be provided matching the configuration of the current generation circuit mentioned above. Furthermore, with reference to any configuration equivalent in each embodiment mentioned above, the same or equivalent nomenclature is appended and hereinafter the explanation is simplified or omitted from the description.

A data driver 130B related to this embodiment, for example, as shown in FIG. 20, has a configuration formed a shift register circuit 131B which outputs sequentially the shift signals SR1, SR2, SR3, . . . based on the data control signals (a shift clock signal SFC and a sampling start signal STR) is supplied from the system controller 150; a write-in current generation circuit cluster 132B which takes in sequentially the display data d0-d3 for one line period supplied sequentially from the display signal generation circuit 160 based on the timing input of the appropriate shift signals SR1, SR2, SR3, . . . generates the write-in current Ipix according to the light generation luminosity in each of the display pixels EM, and supplies them via each of the signal lines DL1, DL2, DL3, . . . ; and a common reference current supply line Ls draws out regularly the reference current Iref that has a current value from the current generator IR (equivalent to the current generator IRB mentioned above) formed externally of data driver 130B. Here, each of the write-in current generation circuits ILB1, ILB2, ILB3, . . . form the write-in current generation circuit cluster 132B, which is applied to a configuration of the current generation circuit ILB of the second embodiment mentioned above. Also, this configuration comprises the signal latch circuits 101, 102, 103, . . . (equivalent to the signal latch section 10 mentioned above) and the current generation circuits 201B, 202B, 203B, . . . (equivalent to the current generation section 20B mentioned above).

The drive control operation of data driver 130B is the essentially the same as that of the first drive control method (Reference FIGS. 18-19) of the display device illustrated in the embodiment mentioned above, and set to a signal holding operation. Based on the shift signals SR1, SR2, SR3, . . . output sequentially from the shift register 131B to each of the above-mentioned latch circuits 101, 102, 103, . . . , the operation takes in sequentially the display data d0-d3 which changes in response to each line of the display pixels EM (each of the signal lines DL1, DL2, DL3, . . . ) from each of the above-mentioned signal latch circuits 101, 102, 103 . . . and performed continuously in one line periods. The holding signals d10*-d13*, d20*-d23*, d30*-d33* . . . are equivalent to an inverted signal of a fixed period and the display data d0-d3, and output to the current generation circuits 201B, 202B, 203B, . . . .

In addition, the current generation supply operation, based on the holding signals d10*-d13, d20*-d23*, d30*-d33* . . . , selects and integrates the predetermined gradation current from a plurality of gradation currents which have a current value of a predetermined ratio specified in advance to the reference current Iref drawn out from each of the current generation circuits 201B, 202B, 203B, . . . ; generates the write-in current Ipix of positive polarity, which is supplied sequentially so as to flow in the direction of the display pixels EM of each of the signal lines DL1, DL2, D3, . . . from the data driver 130B side.

<<Pixel Driver Circuit>>

Figure 21:
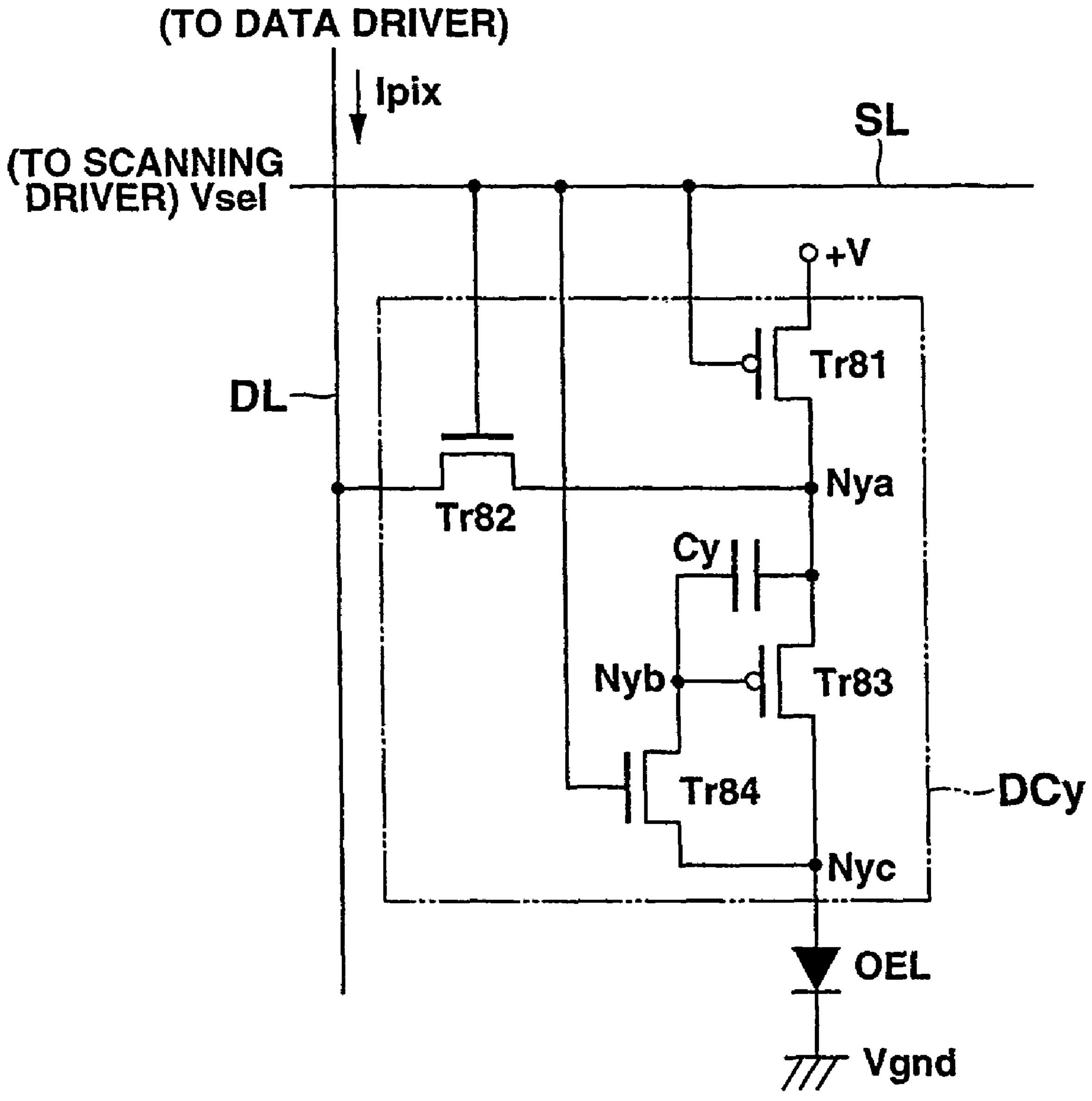
FIG. 21 is a circuit arrangement drawing showing an example of one configuration of the pixel driver circuit corresponding to the current application method applicable to the display device in this embodiment.

FIG. 21 is a circuit arrangement drawing showing an example of one configuration of the pixel driver circuit corresponding to the current application method applicable to the display device in this embodiment.

In addition, the shown pixel driver circuit is just one example applicable to the display device concerning this embodiment. Needless to say, there can be other circuit arrangements which have an equivalent operational function.

As shown in FIG. 21, the pixel driver circuit DCy related to this example configuration comprises a Pch transistor Tr81, an Nch transistor Tr82, a Pch transistor Tr83, an Nch transistor Tr84 and a capacitor Cy. The Pch transistor Tr81 drain terminal and source terminal are individually connected to the voltage contact +V and the contact Nya; the gate terminal is connected to the scanning lines SL and near the intersecting point of the scanning lines SL and the signal lines DL. The Nch transistor Tr82 gate terminal is connected to the scanning lines SL, along with the drain terminal and source terminal each other connected to the signal lines DL and contact Nya. The Pch transistor Tr83 gate terminal is connected to contact Nyb, along with the drain terminal and source terminal each other connected to contact Nya and Nyc. The Nch transistor Tr84 gate terminal is connected to the scanning lines SL, along with the drain terminal and source terminal each other connected to contact Nyb and contact Nyc. Also, the capacitor Cy is connected in between contact Nya and contact Nyb. Here, the voltage contact +V is connected to the voltage driver shown in the embodiment mentioned above, or a direct high supply voltage via a voltage line, and constant high supply voltage is applied.

In addition, this example configuration comprises the organic EL devices OEL with which light generation luminosity is controlled by the light generation drive current supplied from such a pixel driver circuit DCy. The anode terminal is each other connected to contact Nyc of the above-mentioned pixel driver circuit DCy, and the cathode terminal is connected separately to the low supply voltage Vgnd. It is here, the capacitor Cy may be parasitic capacitance formed in between the gate-source of the transistor Tr83, and a capacitative element (a capacitor) can be attached (added) separately in between the gate-source in addition to the parasitic capacitance.

The drive control operation of the organic EL devices OEL in the pixel driver circuit DCy which has such a configuration, first, in the write-in operation period, supplies the write-in current Ipix for performing a light generation operation of the organic EL devices OEL by predetermined luminosity gradation to the signal lines DL synchronizing with this timing while applying a high-level (selection level) scanning signal Vsel to the scanning lines SL. Here, the write-in current Ipix supplies positive polarity current set up so the relevant current flows in the direction of the pixel driver circuit DCy via the signal lines DL from the data driver 130B side.

Accordingly, at the same time the transistors Tr82 and Tr84 which form the pixel driver circuit DCy perform an "ON" operation, the transistor Tr81 performs an "OFF" operation, and positive current is supplied corresponding to the write-in current Ipix supplied to the signal lines DL which is applied to contact Nya. Furthermore, as between contact Nyb and contact Nyc connect, between the gate-source and between the source-drain of the transistor Tr83 controls this electric potential. By this, a voltage potential difference according to the write-in current occurs in capacitor Cy (between contact Nya and contact Nyb). The electric charge corresponding to this voltage potential difference is accumulated and held as the voltage component (charge).

Subsequently, in the light generation operation period, while applying a low-level (non-selection level) scanning signal Vsel to the scanning lines SL, it synchronizes with this timing to interrupt (turn off) the supply of the write-in current Ipix. Consequently, capacitor Cy holds the electric charge accumulated in the write-in operation mentioned above by intervening electrically between the transistors Tr82 and Tr84 performing an "OFF" operation, the signal lines DL and contact Nya, together with between contact Nyb and contact Nyc.

In this way, when capacitor Cy holds the charge voltage at the time of the write-in operation, the voltage potential difference between contact Nyb and contact Nyc (between the gate-source of transistor Tr83) will be held, and the transistor Tr83 performs and "ON" operation. As a result, by application of the above-mentioned scanning signal Vsel (low-level), since the transistor Tr81 performs an "ON" operation simultaneously, the light generation drive current responsive to the write-in current Ipix flows to the organic EL devices OEL via transistors Tr81 and Tr83 from the voltage contact +V (high supply voltage), and the organic EL devices OEL emit light by predetermined luminosity gradation. In this way, in the pixel driver circuit related to this embodiment, an Nch transistor Tr83 will have the function as the transistor for the light generation drive.

Accordingly, in the write-in operation period in the display panel 110A which has the pixel driver circuit (Reference FIG. 13) mentioned above for every line of display pixels EM, the above-mentioned write-in current Ipix is supplied via each of the signal lines DL1, DL2, DL3, . . . . The present write-in current Ipix is held as the voltage component and set during a light generation operation. The light generation drive current is supplied continuously to the organic EL devices OEL based on the held voltage component. The light generation operation is continued by the luminosity gradation corresponding to the display data d0-d3.

Therefore, as explained in this embodiment, the write-in current supplied to the display panel (display pixels EM) can in fact be generated based on the current value of the reference current supplied via a common current supply source line. The current value supplied to each of the write-in current generation circuits which form the data driver does not fluctuate. Thus, limitations in the operating speed originating in the charge and discharge of the current supply source line can be alleviated, as well as the operating speed of the data driver can be elevated.

<<The Third Embodiment of the Data Driver>>

Subsequently, the third embodiment of the data driver applied to the display device mentioned above will be explained.

Figure 22:
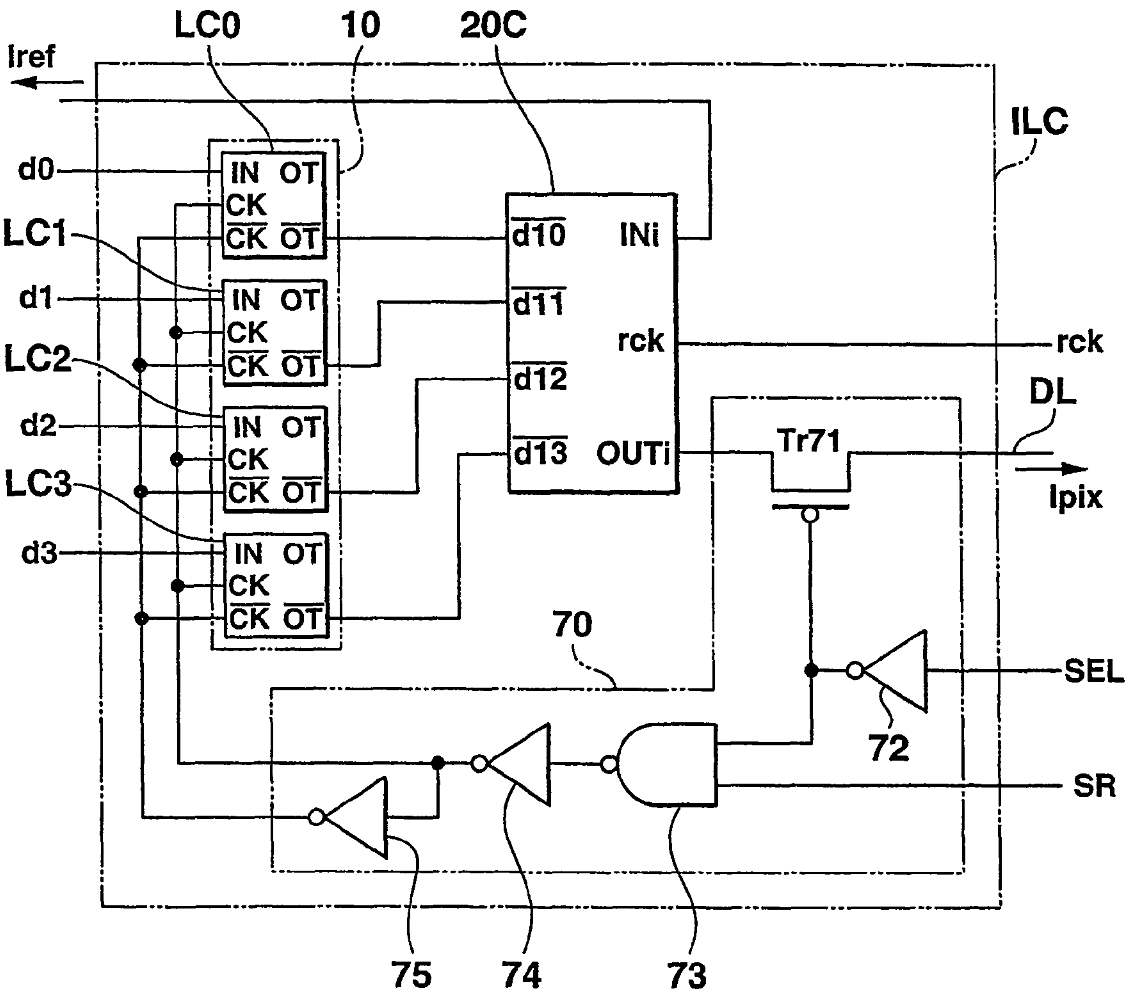
FIG. 22 is an outline block diagram showing an example of a current generation circuit applied to the third embodiment of the data driver in the display device concerning this invention.

FIG. 22 is an outline block diagram showing an example of a current generation circuit applied to the third embodiment of the data driver in the display device concerning this invention.

Figure 23:
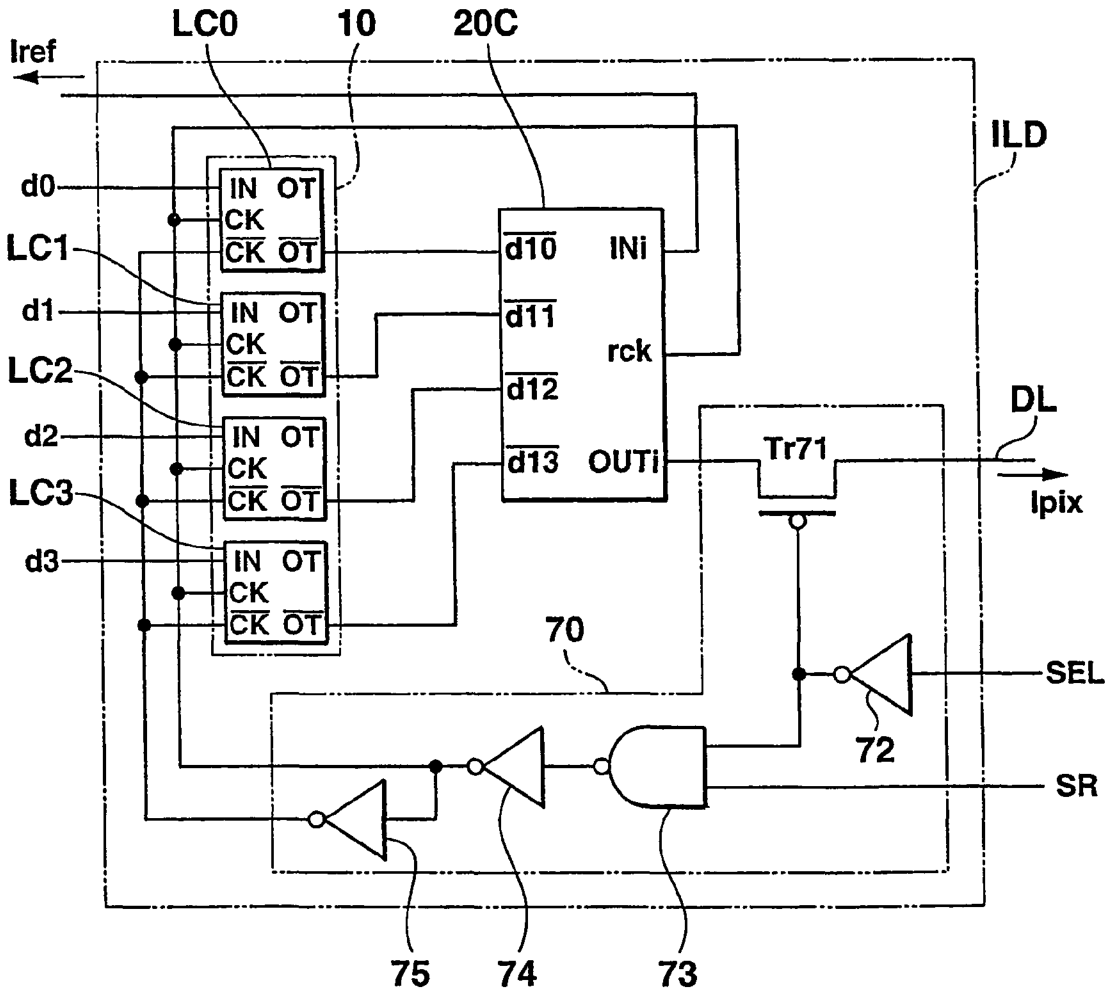
FIG. 23 is an outline block diagram showing another example of the current generation circuit applied to the data driver in this embodiment.

FIG. 23 is an outline block diagram showing another example of the current generation circuit applied to the data driver in this embodiment.

The data driver in this third embodiment applies the current generation section of the current generation circuit in the fifth embodiment shown in FIG. 11 to the current generation section of the current generation circuit which forms the data driver of each of the write-in current generation circuits while comprising a configuration equivalent to the data driver of the second embodiment shown in FIG. 20.

Here, concerning any configuration equivalent in the embodiments mentioned above, the same or equivalent nomenclature is appended and the explanation is simplified or omitted from the description.

A current generation circuit ILC configured with each of the write-in current generation circuits provided in the data driver related to this embodiment, for example, as shown in FIG. 22, includes the signal latch section 10 shown in FIG. 4 and the current generation section 20C shown in FIG. 11. Moreover, the current generation circuit ILC is configured with an operation setting circuit 70. The operation setting circuit 70 comprises an inverter 72 which performs reversal processing of the predetermined selection signal SEL supplied from the system controller 150 and the like; a Pch transistor Tr71 applies an inversion signal (reversed state) of the selection signal SEL output via the above-mentioned inverter 72 to a control terminal connected on the other end side of the signal lines DL current path and to which the current output OUTi is connected on one end side of the current path; a NAND circuit 73 which performs input of the inverted output of the inverter 72 and the shift signal SR from the shift register circuit 131; an inverter 74 which performs reversal processing of the fanout (NAND gate) of the NAND circuit 73; and lastly an inverter 75 which performs further reversal processing of the inverted output of the inverter 74.

In a current generation circuit ILC which has such a configuration, if the high-level selection signal SL is input, the transistor Tr71 formed in the operation setting circuit 70 performs an "ON" operation, the current output contact OUTi of current generation section 20C will be connected to the signal lines DL via the transistor Tr71, and the current generation circuit will be set to a selection state.

Concurrently at the same time, a low-level timing control signal is input to contact CK of each of the latch circuits LC0-LC3 that form the signal latch section 10, which is uninvolved with the output timing of the shift signal SR, from the inverter 72 and the NAND circuit 73, and the inverters 74 and 75; as well as a high-level timing control signal is input regularly to input contact CK*. The display data d0-d3 are taken in and held in each of the latch circuits LC0-LC3, as well as timing to which the high-level control signal rck mentioned above is applied. Subsequently, the reference current Iref is supplied to the current generation section 20C, gradation currents according to the display data d0-d3 are integrated, and the write-in current Ipix corresponding to the light generation luminosity in each of the display pixels EM is generated. Accordingly, the write-in current Ipix based on the display data d0-d3 generated to which timing is applied selectively by the control signal rck mentioned above in each of the current generations circuits ILC is supplied sequentially to each of the display pixels EM via the signal lines DL.

On the other side, if a low-level of the selection signal SL is input, the transistor Tr71 will perform an "OFF" operation, the current output contact OUTi of the current generation section 20C will be separated from the signal lines DL, and the current generation circuit ILC will be set as a non-selection state.

Instantaneously, the inverter 72 and NAND circuit 73 along with the inverters 74 and 75 respond to the output timing of the shift signal SR (high-level) to the input contact CK and input contact CK* of each of the latch circuits LC0-LC3. The timing control signal which has a signal level of opposite polarity takes in and holds the display data d0-d3. Timing by the control signal rck mentioned above is applied and the write-in current Ipix is generated according to the display data d0-d3. Accordingly, although the write-in current Ipix is generated based on the display data d0-d3, it will be in the state where the signal lines DL are not supplied.

The drive control operation in the data driver comprising such as the current generation circuit ILC is similar to the drive control method (Reference FIG. 18) of the display device shown in the embodiment mentioned above, and set to a signal holding operation with the latch section 10 formed in each of a plurality of current generation circuits ILC; set to a selection state based on the shift signals SR1, SR2, SR3 . . . which are output sequentially from the shift register circuit 131. The holding signals d10*-d13* are equivalent to an inversion signal of display data d0-d3 taken in sequentially for every line of display data d0-d3 and output to the current generation section 20C.

Furthermore, it is the timing by which the above-mentioned control signal rck is applied selectively (It does not become a high-level simultaneously.) to only the current generation circuit ILC in a plurality of current generation circuits ILC in the current generation supply operation. The reference current Iref is supplied to the current generation section 20C based on the holding signals d10*-d13*. Predetermined gradation currents are selected and integrated from a plurality of gradation currents which have a current value specified in advance based on this reference current Iref, generated write-in current Ipix of regular polarity via each of the signal lines DL1, DL2, DL3 . . . is supplied sequentially so it flows in the direction of the display pixels EM.

Therefore, according to the display device related to this embodiment, generation of the write-in current is addressed by supplying selectively the reference current Iref to each of the current generation circuits ILC formed corresponding to each of the signal lines DL1, DL2, DL3, . . . , by generating and integrating the gradation currents according to the display data d0-d3 based on the reference current Iref. Because the write-in current has an equal and suitable current value which can be supplied to each of the display pixels EM, without being influenced by variations in circuit characteristics between each of the current generation circuits and the component characteristics of the active device transistors and the like, a favorable gradation display operation can be realized and enhancement in the display image quality can be achieved.

In addition, when generating the write-in currents in this embodiment, the control signal rck performs switching control to set the switching circuits TS1-TS2 or TS3-TS4 supply state of the reference current Iref to each of the current generation circuits ILC (current generation section 20C). Although this case applied the signal generated and output to the system controller 150 was explained. This invention is not limited to this in order to reduce the processing load in the system controller and the like, and to simplify circuit arrangement. For example, using other control signals currently supplied for operational control in each current generation circuit ILC, you may constitute a configuration so the switching control of the above-mentioned switching circuits TS1-TS2 or TS3-TS4 may be performed.

For example, as shown in FIG. 23, the current generation circuit ILD and in the current generation circuit ILC in FIG. 22 mentioned above set in a configuration so it can supply the control signal rck for performing switching control of the switching circuits TS1-TS2 and TS3-TS4 in the current generation section 20C for inverted output (Namely, the timing control signal input to the input contact CK of each of the latch circuits LC0-LC3 configured to the signal latch section 10.) of the inverter 74 formed in the operation setting circuit 70 of the current generation circuit ILC.

Namely, the timing (The timing of the shift signals SR1 and SR2 output from the shift register circuit 131, and synchronizing the timing) based on the timing control signal to input contacts CK and CK* of each of the latch circuits LC0-LC3 as mentioned above, in each of the latch circuits LC0-LC3 a signal holding operation which takes in and holds the display data d0-d3 is performed and, a high-level control signal rck timing is applied on the other side. The current generation supply operation is performed which generates the write-in current Ipix according to the display data d0-d3 and the reference current Iref is supplied to the current generation section 20C. In applying the drive control method of repeating successively each of these operations simultaneously (in parallel), the timing control signal and the above-mentioned control signal rck supplied timing input to input contact CK of each of the latch circuits LC0-LC3 will be set in sync. Thus, each operation is controllable using a single timing control signal.

Therefore, the circuit arrangement can be simplified while the processing load in the system controller and the like can be reduced; since drive control can be performed simultaneously using the existing control signal supplied to each of the current generation circuits ILC, the signal holding operation in the signal latch section 10 and the current generation supply operation in the current generation section 20C according to such a configuration.

In addition, in the current generation circuits ILC and ILD shown in FIG. 22 and FIG. 23, the current generation circuit ILB shown in FIG. 4 and these circumstances, the write-in current generated by each of the current generation circuits ILC and ILD, although it has a circuit arrangement set up so it flows in the direction of the display pixels EM via each signal line, this invention is not limited to this. It may have a circuit arrangement set similar to the current generation circuit ILA shown in FIG. 1 mentioned above so the above-mentioned write-in current can be drawn into the current generation circuits ILC and ILD via the signal lines from each of the displays pixels sides.

<<The Fourth Embodiment of the Data Driver>>

Next, the fourth embodiment of the data driver applied to the display device mentioned above will be explained.

As for the data driver related to this embodiment, briefly, in this configuration two sets of write-in current generation circuits are formed in each of the signal lines. Each set of the write-in current generation circuits to predetermined operation timing perform taking in of the display data, holding, generation of the write-in current and the supply operation are performed complementarily and successively. Also, when each of the write-in current generation circuits comprises the same configuration as the current generation circuit in the third embodiment of the current generation circuit, each of the write-in current generation circuits supply specified voltage (black display voltage) to the signal lines, thereby each has a specified state setting section and the display data becomes a specified value accordingly. Here, in this embodiment, positive reference current which has a constant current value from a single current generator is supplied to the write-in current generation circuit cluster.

Figure 24:
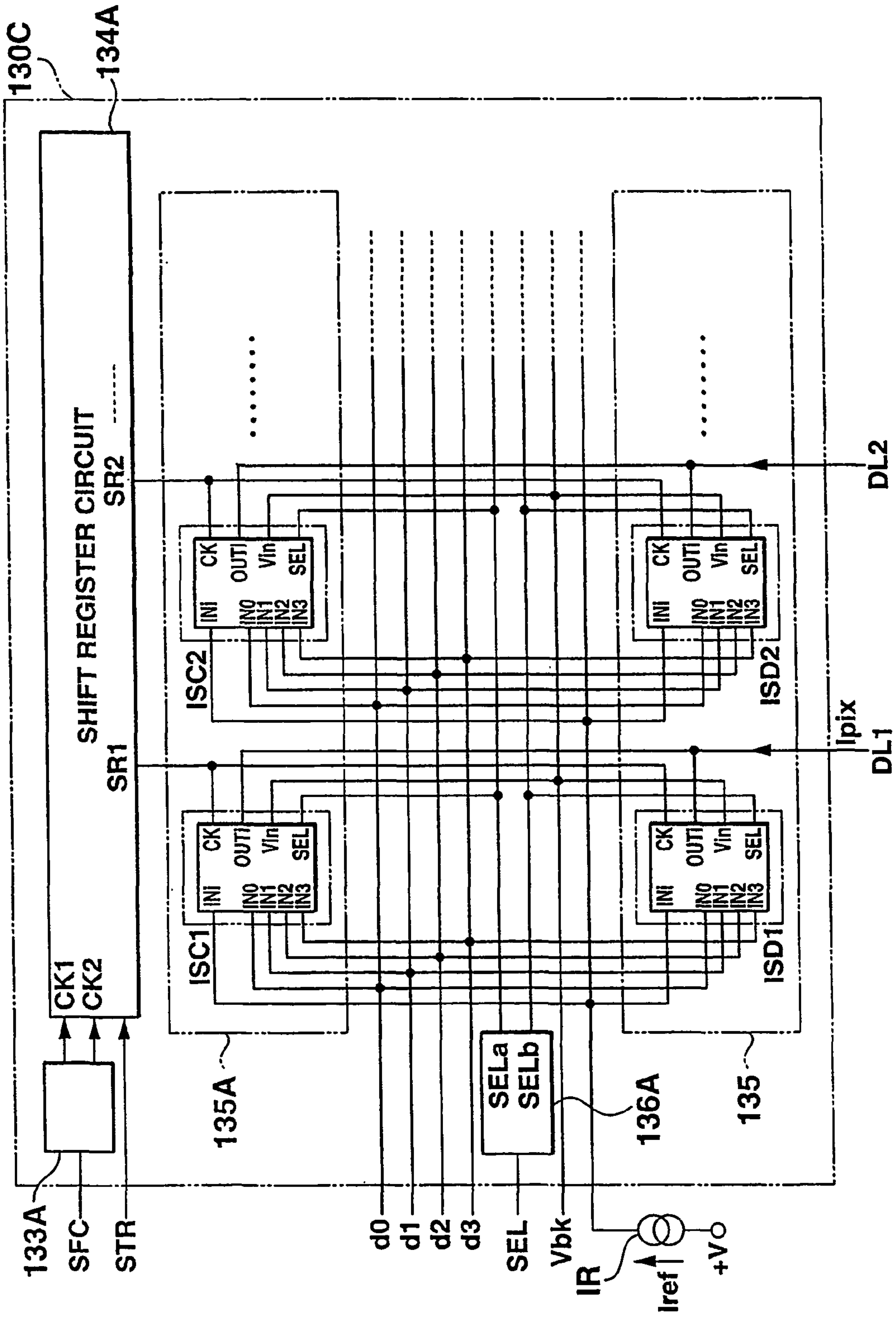
FIG. 24 is a circuit arrangement drawing showing the configuration of the fourth embodiment of the data driver in the display device related to this invention.

FIG. 24 is a circuit arrangement drawing showing the configuration of the fourth embodiment of the data driver in the display device related to this invention.

Figure 25:
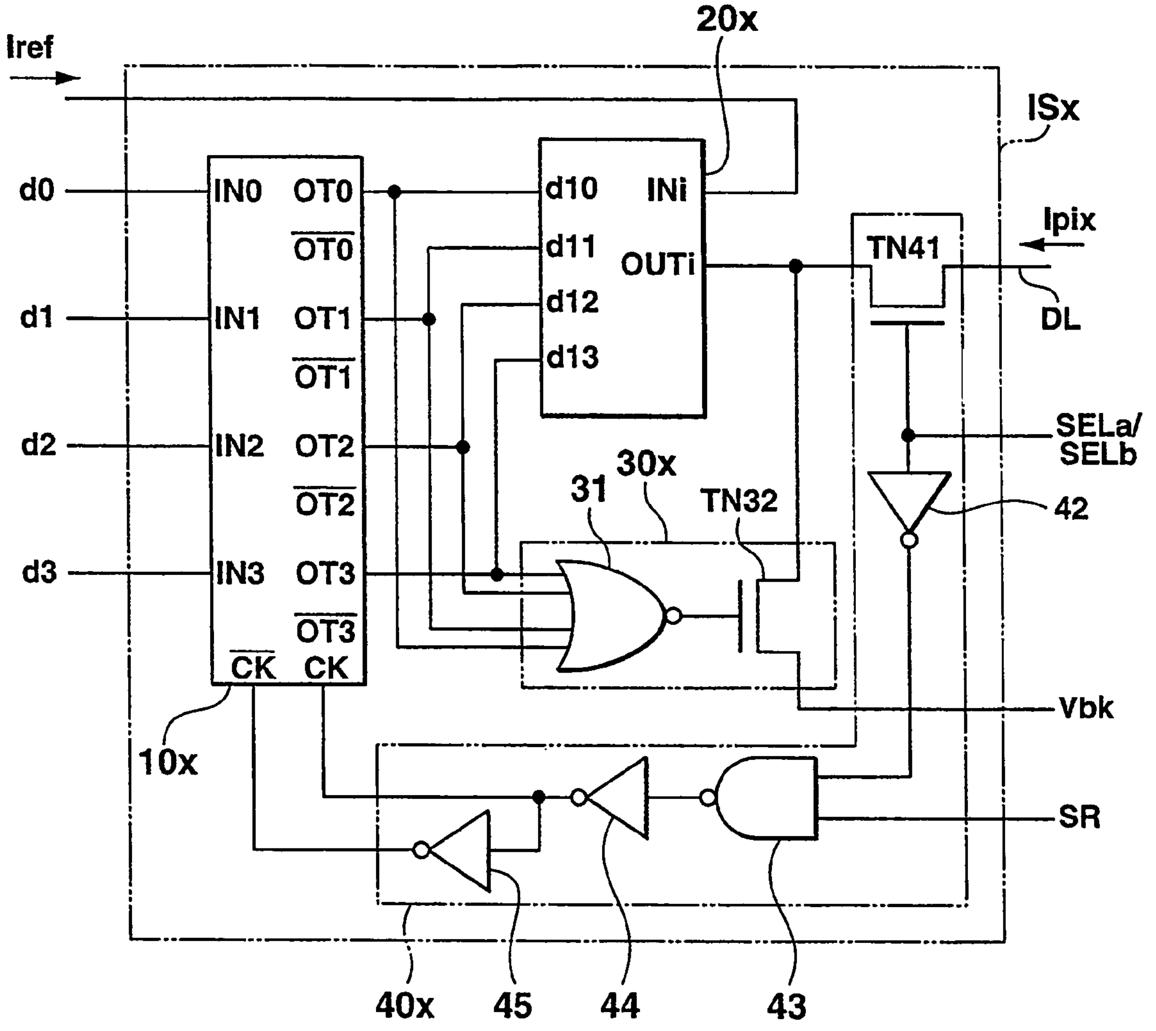
FIG. 25 is a circuit arrangement drawing showing one example of the write-in current generation circuit applied to the data driver in this embodiment.

FIG. 25 is a circuit arrangement drawing showing one example of the write-in current generation circuit applied to the data driver in this embodiment.

FIG. 26 is a circuit arrangement drawing showing one example of the inverted latch circuit applied to the data driver in this embodiment and the selection setting circuit.

Here, the explanation matches with the configuration of the current generation circuit mentioned above. Here, concerning any configuration equivalent in the embodiments mentioned above, the same or equivalent nomenclature is appended and the explanation is simplified or omitted from the description.

The data driver 130C related to this embodiment, for example as shown in FIG. 24, is configured with an inverted latch circuit 133A which generates a non-inverted clock signal CK1 and an inverted clock signal CK2 based on the shift clock signal SFC supplied as the data control signal from the system controller 150; a shift register 134A which outputs sequentially the shift signals SR1, SR2, SR3 . . . (equivalent to the timing control signal CLK mentioned above) to predetermined timing, while shifting sampling start signal STR based on the non-inverted clock signal CK1 and the inverted clock signal CK2; two sets of the write-in current generation circuit clusters 135A and 135B which supply (drawn) via each of the signal lines DL1, DL2, . . . take in sequentially the display data d0-dk (Here, these are equivalent to the digital signals d0-d3 which are set to k=3 for convenience and mentioned above.) in one line periods supplied sequentially from the display signal generation circuit 160, and generate the write-in Ipix corresponding to the light generation luminosity in each of the display pixels EM; a selection setting circuit 136A outputs the selection setpoint signal (The non-inverted signal SLa and the inversion signal SLb of the switching control signal SEL) for operating selectively either of the above-mentioned write-in current generation circuit clusters 135A and 135B, based on the switching control signal SEL supplied as the data control signal from the system controller 150.

Here, two sets of write-in current generation circuit clusters 135A and 135B are configured at least so the reference current Iref input in common has a constant current value regularly supplied from the current generator IR (equivalent to the current generator IRA mentioned above) and the display data d0-dk supplied from the display signal generation circuit 160.

Two sets of the write-in current generation circuit clusters 135A and 135B have a configuration each comprising a plurality of write-in current generation circuits ISC1, ISC2, . . . and ISD1, ISD2, . . . . Each of the write-in current generation circuits ISC1, ISC2, . . . and ISD1, ISD2, . . . shown in FIG. 25 corresponds to the current generation circuit ISA (Hereinafter referred to as the write-in current generation circuit ISx) in the third embodiment of the current generation circuit shown in FIG. 6, and is configured with a signal latch section 10$x$ which is equivalent to the configuration in the third embodiment of the current generation circuit, and in addition to a current generation section 20$x$; a specified state setting section 30$x$; and an operation setting circuit 40$x$ to set selectively an operating state of each write-in current generation circuits ISx based on the switching control signal SEL.

Here, since the signal latch section 10$x$, the current generation section 20$x$ and the specified state setting section 30$x$ are equivalent to the signal latch section 10 each shown in FIG. 6, the current generation section 20A and the specified state setting section 30A are omitted from this section of the detailed description.

The operation setting circuit 40$x$, for example, as shown in FIG. 25, has a configuration comprising an Nch transistor TN41 formed in the current path to the signal lines DL and the selection setpoint signal from (the non-inverted signal SLa or the inverted signal SLb) selection setting circuit 136A applied to the control terminal. An inverter 42 performs reversal processing of the selection setpoint signal. A NAND circuit 43 performs input of the shift signal SR (SR1, SR2, . . . ) from the shift register 134A and inverted output of the inverter 42. An inverter 44 performs reversal processing of the fanout of the NAND circuit 43, and an inverter 45 performs reversal processing further the inverted output of the inverter 44.

In the write-in current generation circuit ISx which has such a configuration, if a high-level selection setpoint signal (A control signal which sets the write-in current generation circuit into a selection state) is input from the selection setting circuit 136A, the Nch transistor TN41 formed in the operation setting circuit 40$x$ will perform an "ON" operation. The current output contact OUTi of the current generation section 20$x$ is connected to the signal lines DL via the Nch transistor TN41. Simultaneously at this time, a low-level timing control signal to signal latch section 10$x$ input contact CK not involved with the output timing of the shift signal SR from the inverter 42, the NAND circuit 43 and the inverters 44 and 45, and also a high-level timing control signal is input regularly to input contact CK*. The display data d0-d3 are taken in, and the write-in current Ipix according to the display data d0-d3 is generated by the current generation section 20$x$.

When display data d0-d3 are all set to zero (0), at the same time the write-in current Ipix in the current generation section 20$x$ is interrupted (shut down) and a light generation operation (for example, black display operation) in the specified state of the display pixels EM is performed. The specified voltage vbk (black display voltage) in response to a black display operation to output contact OUTi current of the current generation section 20$x$ by the specified state setting section 30$x$ is applied.

Accordingly, in an ordinary gradation display operation excluding a black display state, the write-in current Ipix generated, based on the display data d0-d3, is supplied to the display pixels EM via the signal lines DL. A predetermined specified voltage Vbk (black display voltage) is applied to the signal lines DL, while shutting down the supply of the above-mentioned write-in current Ipix at the time of a black display operation.

Conversely, if a low level selection setpoint signal (a control signal which sets the write-in current generation circuit as the non-selection state) is input from the selection setting circuit 136A, the Nch transistor TN41 will perform an "OFF" operation, and the current output contact OUTi of the current generation section 20$x$ will be isolated (separated) from the signal lines DL.

Simultaneously at this time, corresponding to the output timing of the shift signal SR, a timing control signal which has a complementary (matching) signal level is input to the input contact CK and input contact CK* of the signal latch section 10$x$ corresponding to the output timing of the shift signal SR from the inverter 42 and the NAND circuit 43, along to the inverters 44 and 45, taking in the display data d0-d3, held and the generation operation of the write-in current Ipix are performed. Accordingly, although the write-in current Ipix is generated based on display data d0-d3, it will be in the state where the signal lines DL are not supplied, and the write-in current generation circuit will be essentially set into a non-selection state. Thus, from the selection setting circuit 136A described later, by setting appropriately the signal level of the selection setpoint signal (The non-inverted signal SLa and the inversion signal SLb of the switching control signal SEL.) input to two sets of the write-in current generation circuit clusters 135A and 135B, the selection-state of either of the two sets of the write-in current generation circuit clusters 135A and 135B can be set into the selection state and the other can be set into the non-selection state.

Figure 26A:
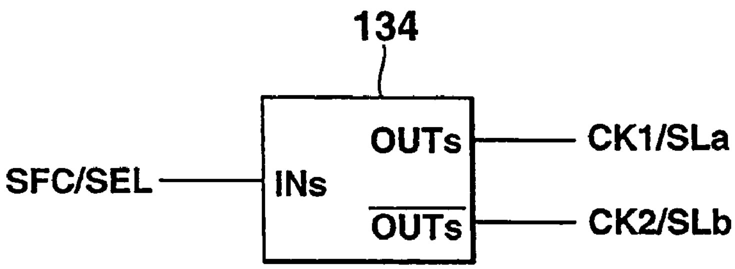
FIGS. 26A and 26B are circuit arrangement drawings showing examples of the inverted latch circuit applied to the data driver in this embodiment and the selection setting circuit.
Figure 26B:
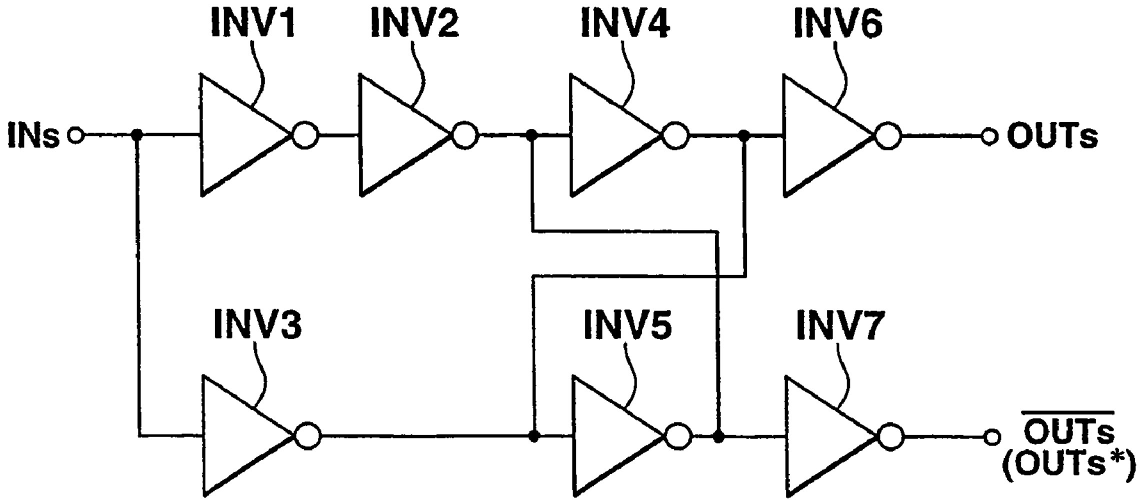

Moreover, the inverted latch circuit 133A and the selection setting circuit 136A, briefly, has a circuit arrangement equivalent, for example, as shown in FIGS. 26A and 26B, to apply a configuration comprising multiple well-known inverter circuits (For example, a complementary type transistor circuit as shown in FIG. 2).

Specifically, the inverted latch circuit 133A and the selection setting circuit 136A, the shift clock signal SFC or the switching control signal SEL is input into the input contact INs (the input terminal of the inverted latch circuit 133A or the selection setting circuit 136A) of an inverter INV1 and the output contact of the inverter INV1 is connected to the input contact of an inverter INV2. The output contact of the inverter INV2 is connected to the input contact of the inverter INV4. Also, the above-mentioned shift clock signal SFC or the switching control signal SEL is input into the input terminal of an inverter INV3 and the output contact is connected to the input contact of an inverter INV5. While the output contact of the inverter INV4 is connected to the input contact of the inverter INV5 and an inverter INV6, the output contact of the inverter INV5 is connected to the input contact of the inverter INV4 and an inverter INV7. Also, the output contact of then inverter INV6 is connected to a non-inverted output terminal OUTs of the inverted latch circuit 133A or the selection setting circuit 136A, and the output contact of the inverter INV7 is connected to inverted output terminal OUTS* of the inverted latch circuit 133A or selection setting circuit 136A.

In the inverted latch circuit 133A and the selection setting circuit 136A which have such a configuration, if the shift clock signal SFC or the switching control signal SEL is applied, the relevant signal level is held by the inverters INV4 and INV5. A non-inverted signal and an inverted signal of the present signal levels are each output from the non-inverted output terminal OUTs and the inverted terminal OUTs* to the shift register circuit 134A as the non-inverted clock signal CK1 and inverted clock signal CK2. Also, the non-inverted signal SLa and the inverted signal SLb are supplied to the write-in current generation circuit cluster 135A (Each of the write-in current generation circuits ILA1, ILA2, . . . ) and the write-in current generation circuit cluster 135B (Each of write-in current generation circuits ILB1, ILB2, . . . ).

<<Drive Control Method>>

Next, the drive control method of the display device which has the configuration mentioned above will be explained with reference to the drawings.

Figure 27:
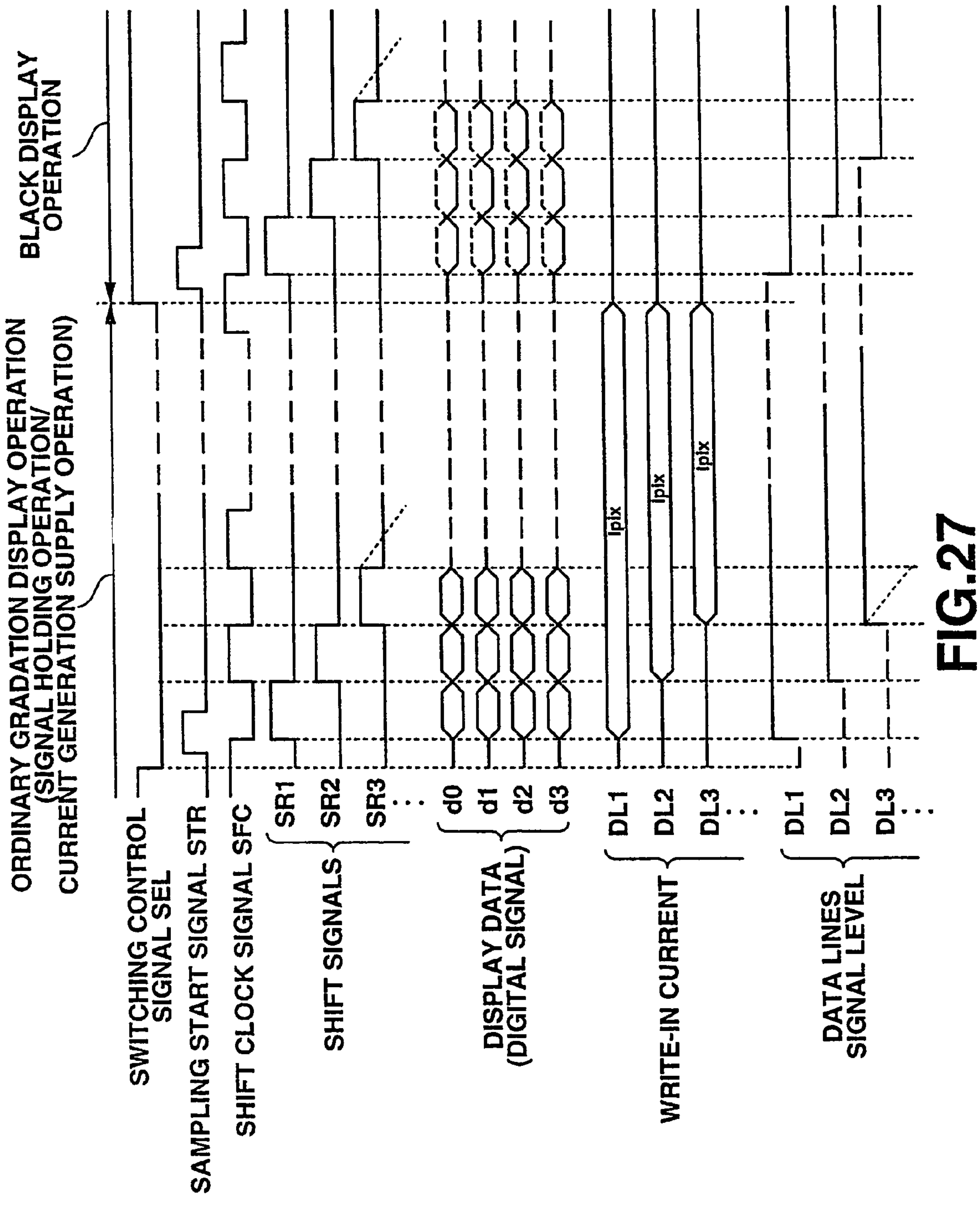
FIG. 27 is a timing chart which shows an example of the drive control operation in the data driver of this embodiment.

FIG. 27 is a timing chart which shows an example of the drive control operation in the data driver of this embodiment.

Explanations will also refer accordingly to the configuration of the third embodiment of the current generation circuit shown in FIG. 6, in addition to the fourth embodiment of the data driver shown in FIG. 24 and FIG. 25.

First, the drive control operation in the data driver 130C, the signal holding operation takes in the display data d0-d3 supplied from the display signal generation circuit 160 to each of the signal latch sections 10*x* formed in each current write-in current generation circuit formed by the write-in current generation circuit clusters mentioned above and is held during a fixed period. The current generation section 20*x* is formed in the write-in current generation circuit ISx, based on the holding signals d10-d13 of the display data d0-d3 taken in by the present signal holding operation. While performing sequential execution of the current generation supply operation, the write-in current Ipix is generated according to the above-mentioned display data d0-d3 and supplied to each of the display pixels EM via each of the signal lines DL1, DL2, . . . . At the same time as performing this series of operations in two sets of write-in current generation circuit clusters from the selection setting circuit 136A, while performing the above-mentioned current generation supply operation from one of the write-in current generation circuit cluster, it accomplishes, by performing repeatedly, an alternate operation to perform simultaneously (in parallel) the above-mentioned signal holding operation from the write-in current generation circuit cluster on other side.

Especially, in the data driver related to this embodiment, when and the like accomplishing a black display operation which performs a light generation operation simultaneously by the minimum luminosity gradation of the pre-display pixels that constitute the display panel, for example, in addition to the above-mentioned signal holding operation and the current generation supply operation, while shutting down the supply of the write-in current Ipix to all of the signal lines DL1, DL2, . . . , it is controlled to apply the specified voltage Vbk (black display voltage) to all of the signal lines DL1, DL2, . . . .

First, the signal holding operation, as shown in FIG. 27, after one write-in current generation circuit cluster is set into a selection state by the selection setting circuit 136A, the signal latch section 10*x* of this current generation circuit cluster formed in each of the write-in current generation circuits ISx based on the shift signals SR1, SR2, . . . outputs sequentially from the shift register circuit 134A. This operation takes in sequentially the display data d0-d3 which shifts according to each line of the display pixels EM (Namely, each of the signal lines DL1, DL2, . . . ) and performed continuously in one line periods. Sequentially from the signal latch section 10*x* of the write-in current generation circuit ISx where this display data d0-d3 was taken in, the holding signals d10-d13 from a constant period (A period until one write-in current generation circuit cluster is set into a non-selection state and also the write-in current generation circuit cluster of the other side is set into a selection state by the selection setting circuit 136A, based on the following switching control signal SEL.) are output from the signal latch section 10*x* to the current generation section 20*x*.

Also, as shown in FIG. 27 in the current generation supply operation, in the "ON/OFF" state a plurality of switch transistors formed in the current generation section 20*x* control the composite current of the gradation currents which flow to gradation current transistors connected to switching transistors that perform an "ON" operation based on the above-mentioned holding signals d10-d13 sequentially supplied via each of the signal lines DL1, DL2, . . . as the write-in current Ipix.

Here, the write-in current Ipix is set up so it is supplied simultaneously in parallel during a constant period, at least, to each of the signal lines DL1, DL2, . . . . Also, in this embodiment as mentioned above, a plurality of gradation currents are generated which have a current value of a predetermined ratio (For example, $2^n$; n=0, 1, 2, 3, . . . ) (see claims 12 and 15 formula) specified from the transistor size in advance to a single reference current Iref; selects and integrates the predetermined gradation currents by an "ON/OFF" operation of switch transistors based on the above-mentioned holding signal; generates the write-in current Ipix of negative polarity; and flows the write-in current Ipix so it is drawn in the direction of the data driver 130A from the signal lines DL1, DL2, . . . side.

In the black display operation, as show in FIG. 27, by setting the display data d0-d3 as a black display state (the holding signals d10-d13 all zeros (0)), any switch transistor (transistors Tr26-29 shown in FIG. 3) formed in the current generation section 20$x$ that performs an "OFF" operation, the gradation current is interrupted (shut down), and supply of the write-in current Ipix is suspended. Simultaneously at this time, the black display state (state where the holding signals d10-d13 are set to zero (0)) of the display data is judged from the NOR circuit 31 formed in the specified state setting section 30$x$, a specified voltage application transistor TN32 performs an "ON" operation and the specified voltage Vbk (black display voltage) corresponding to the black display (light generation operation by the minimum luminosity gradation) is applied sequentially to each of the signal lines DL1, DL2, . . . .

The write-in current generation circuit clusters formed in the data driver 130A are controlled so two cluster sets alternately set into a selection state. For example, the write-in current Ipix from one write-in current generation circuit cluster 135A supplies the display pixels EM of the oddth lines (odd numbered lines), and the write-in current Ipix from the write-in current generation circuit cluster 135B supplies the display pixel clusters of the eventh lines (even numbered lines) on the other side.

Consequently, in the data driver 130C and the display device 100A related to this embodiment, at the time of an ordinary gradation display operation with each of the write-in current generation circuits ISx formed corresponding to each of the signal lines DL1, DL2, . . . , gradation currents according to the display data d0-d3 are generated, integrated and each of the display pixels EM is supplied with the write-in current Ipix which has a suitable current value. While on the other side, at the time of a black display operation, write-in current Ipix from the current generation circuit ISx is interrupted (shutdown). Since the predetermined black display voltage in response to a light generation operation by the minimum luminosity gradation in the display pixels EM is applied to each of the signal lines DL1, DL2, . . . , it is possible to attain a favorable gradation display and the specified voltage can successfully stabilize the signal level of each of the signal lines DL1, DL2, . . . at the time of a black display operation. It can shift to a black display state rapidly and enhancement in the display response characteristics in the display device together with the display image quality can be achieved.

In the write-in current generation circuit ISx in the data driver 130C while applying a current mirror circuit arrangement, by setting the channel width of a plurality of gradation current transistors which constitute the current mirror circuit to the reference current transistor, so each one consists of a predetermined ratio (for example, $2^n$ gradation), a plurality of gradation currents that have a current value specified with the above-mentioned ratio can be flowed to a single reference current supplied from a single current generator with the display data d0-d3 (a digital signal which is two or more bits). Since the write-in current Ipix has $2^n$ gradation of current value, integrating these suitably is generable. Therefore, a relatively simple circuit arrangement can generate the write-in current composed of analog current which has a suitable current value corresponding to the display data, and a light generation operation of the display pixels EM can be performed by the proper luminosity gradation.

Also, although the case where the data driver comprising two sets of the write-in current generation circuits were applied to each of the signal lines arranged to the display panel in this embodiment was explained, this invention is not limited to this and may apply a data driver which, for example, performs the current supply operation and generation of the write-in current by taking in and holding the display data serially comprising a single write-in current generation circuit to each of the signal lines.

<<The Fifth Embodiment of the Data Driver>>

Next, the fifth embodiment of the data driver applied to the display device mentioned above will be explained.

Although it has the current sinking method circuit arrangement which draws the current in the data driver side from the display pixels EM in the fourth embodiment of the above-mentioned data driver, the circuit arrangement of the current application method can be applied which flows in (pours in) the write-in current in the direction of the display pixels EM from the data driver. The fifth embodiment of the data driver comprises a circuit arrangement of the current application method.

Furthermore, the data driver of the write-in current generation circuits concerning this embodiment resembles the fourth embodiment of the data driver mentioned above. While two sets are formed in each of the signal lines, the write-in current generation circuit of each set with predetermined operation timing encompasses taking in and holding the display data complementary and continuously, as well as generating write-in current and a configuration that performs a supply operation. When the display data becomes a specified value, it has a configuration which supplies specified voltage (black display voltage) to the signal lines. Here, in this embodiment, supplied negative reference current has a constant current value from a single current generator to the write-in current generation circuit cluster.

Figure 28:
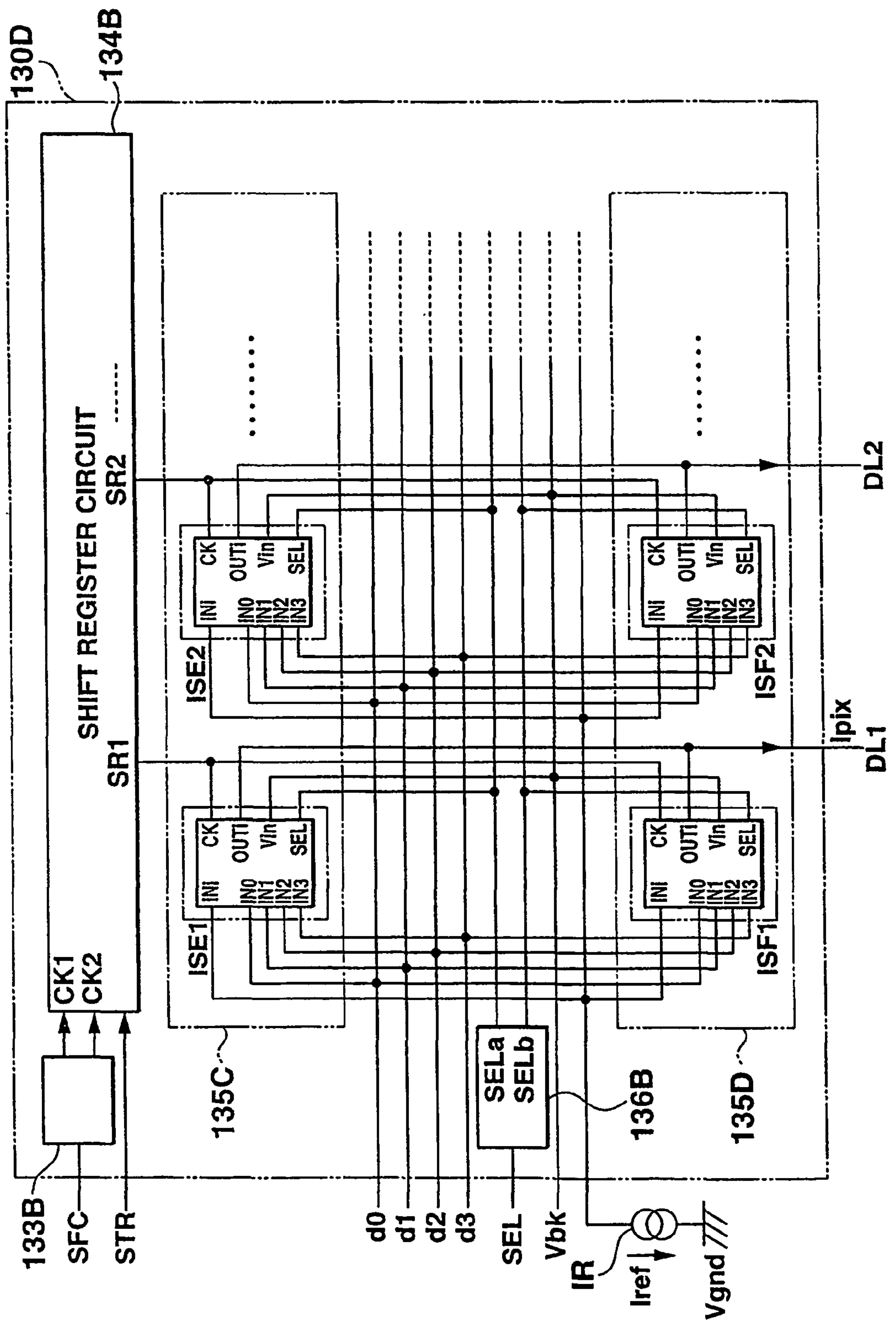
FIG. 28 is a circuit arrangement drawing showing the configuration of the fifth embodiment of the data driver in the display device related to this invention.

FIG. 28 is a circuit arrangement drawing showing the configuration of the fifth embodiment of the data driver in the display device related to this invention.

Figure 29:
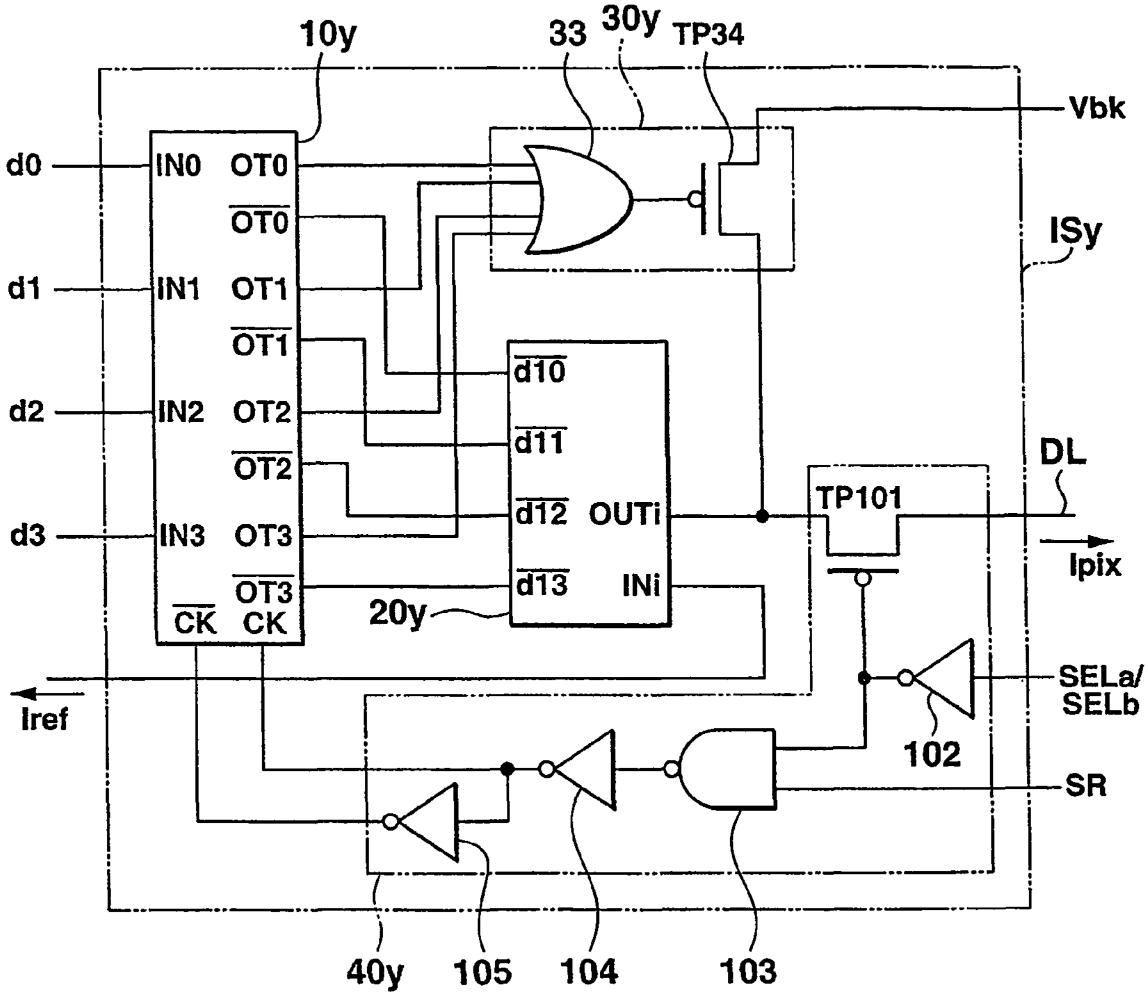
FIG. 29 is a circuit arrangement drawing showing one example of the write-in current generation circuit applied to the data driver in this embodiment.

FIG. 29 is a circuit arrangement drawing showing one example of the write-in current generation circuit applied to the data driver in this embodiment.

Here, an explanation will be provided matching the configuration of the current generation circuit mentioned above. Furthermore, with reference to any configuration equivalent in each embodiment mentioned above, the same or equivalent nomenclature is appended and hereinafter the explanation is simplified or omitted from the description.

A data driver 130D related to this embodiment, for example, as shown in FIG. 28, is formed with an inverted latch circuit 133B which has a configuration equivalent to the fourth embodiment mentioned above and a shift register circuit 134B, whereby the display data d0-d3 in one line periods are taken in sequentially to generate the write-in current Ipix according to the light generation luminosity in each of the display pixels EM based on the input timing of the shift signals SR1, SR2, . . . from the shift register circuit 134B; the write-in current generation circuit clusters 135C and 135D supplied (applicable to poured in/flowed in) via each of the signal lines DL1, DL2, . . . ; and a selection setting circuit 136B which operates selectively either of the above-mentioned write-in current generation circuit clusters 135C and 135D based on the switching control signal SEL.

Here, two sets of the write-in current generation circuit clusters 135C and 135D are formed so, at least, while the display data d0-d3 are input in common, the reference current Iref which has a constant current value regulated by the current generator IR may be drawn out in common.

Two sets of the write-in current generation circuit clusters 135C and 135D each comprise a plurality of the write-in current generation circuits ISE1, ISE2, . . . and ISF1, ISF2, . . . . Each of the write-in current generation circuits ISE1, ISE2, . . . and ISF1, ISF2, . . . is the equivalent to the current generation circuit ISB (Hereinafter generically named as a write-in current generation circuit ISy) shown in FIG. 8 and is shown in FIG. 29. A signal latch section 10*y* is equivalent to the configuration of the fourth embodiment of the current generation circuit. In addition to a current generation section 20*y* and a specified state setting section 30*y*, an operation setting circuit 40*y* sets selectively the operating state of each of the write-in current generation circuits ISy based on the switching control signal SEL.

Here, since the signal latch section 10*y*, the current generation section 20*y* and specified state setting section 30*y* are equivalent to the signal latch section 10 each shown in FIG. 8, the current generation section 20B and specified state setting section 30B are omitted from this section of the detailed description.

The operation setting 40*y*, for example as shown in FIG. 29, has a configuration comprising an Pch transistor TP101 which applies an inverted signal of the selection setpoint signal (The non-inverted signal SLa or the inverted signal SLb) from the selection setting circuit 136B to the control terminal formed in the current path to the signal lines DL. An inverter 102 performs a reversal process of the above-mentioned selection setpoint signal. A NAND circuit 103 performs input of the shift signal SR from the inverted output of the inverter 102 and the shift register circuit 134B as an input. An inverter 104 performs the reversal process of the fanout of the NAND circuit 103, and an inverter 105 performs the reversal process further of the inverted output from the inverter 104.

In the write-in current generation circuit ILy which has such a configuration, if a high-level selection setpoint signal is input from the selection setting circuit 134B, a Pch transistor TP101 formed in the operation setting circuit 40*y* will perform an "ON" operation, and the current output contact OUTi of the current generation section 20*y* will be connected to the signal lines DL via the Pch transistor TP101. Concurrently at the same time, a low-level timing control signal is input to contact CK of the signal latch section 10*y*, which is uninvolved with the output of the timing of the shift signal SR, from the inverter 102, the NAND circuit 103 and the inverters 104 and 105, as well as a high-level timing control signal is input regularly to contact CK*. The display data d0-d3 are taken in and the write-in current Ipix according to the display data d0-d3 is generated by the current generation section 20*y*.

When the display data d0-d3 are all set to zero (0), while the output of the write-in current Ipix in the current generation section 20*y* is interrupted (shut down), a specified voltage Vbk (black display voltage) in response to a black display operation is applied to the current output contact OUTi of the current generation section 20*y* by the specified state setting section 30*y* so a light generation operation (for example, black display operation) of the display pixel may be performed in the specified state.

Accordingly, in an ordinary gradation display operation, except a black display state, a predetermined black specified voltage Vbk (black display voltage) is applied to the signal lines DL, the write-in current Ipix generated based on the display data d0-d3 is supplied to the display pixels EM via the signal lines DL, thereby interrupting the supply of the above-mentioned write-in current Ipix in a black display operation (The selection state of a write-in current generation circuit).

On the other side, if a low-level selection setpoint signal is input from the selection setting circuit 134B, the Pch transistor TP101 will perform an "OFF" operation, and the current output contact OUTi of the current generation section 20*y* will be separated from the signal lines DL. Also, at this time, a timing control signal which has a complementary signal level is input to the input contact CK and input contact CK* of the signal latch section 10*y* in response to the output timing of the shift signal SR by the inverter 102 and NAND circuit 103, and inverters 104 and 105. A generation operation of the write-in current Ipix is performed by taking in and holding the display data d0-d3.

Accordingly, comparable to the fourth embodiment mentioned above, although the write-in current Ipix is generated based on the display data d0-d3, it will be in the state where signal lines DL are not supplied, and the write-in current generation circuit will be essentially set into a non-selection state.

The drive control operation such as the data driver 130D is same as that of the fourth embodiment mentioned above, and set in signal holding operation. With the signal latch circuits 10*y* formed in each write-in current generation circuits ISy of the write-in current generation circuit clusters set as a selection state, based on the shift signals SR1, SR2, . . . output sequentially from the shift register circuit 134B, the display data d0-d3 of each line are taken in sequentially and holding signals d10-d13 equivalent to the inversion signal of the display data d0-d3 are output to the current generation section 20*y*.

Additionally, the current generation supply operation selects and integrates predetermined gradation currents from a plurality of gradation currents which have a current value specified in advance based on the holding signals d10*-d13*. Here, the write-in current Ipix of positive polarity is generated so the relevant current is supplied (applicable to poured in/flowed in) sequentially in the direction of the display pixels EM via each of the signal lines DL1, DL2, . . . from the data driver 130B side.

In a black display operation, by setting the display data d0-d3, . . . as a black display state (the holding signals d10-d13 are all set to zero (0)), while generation of gradation currents in the current generation section 20*y* and the write-in current Ipix supply are suspended. A black display state is judged in the specified state setting section 30*y* and the specified voltage Vbk (black display voltage) corresponding to the black display (light generation operation by the minimum luminosity gradation) is applied sequentially to each of the signal lines DL1, DL2, . . . .

Therefore, also set to the display device which applied the data driver 130D related to this embodiment, by generating and integrating the gradation currents according to the display data d0-d3 from each of the write-in current generation circuits ISy formed corresponding to each of the signal lines DL1, DL2, . . . , each of the display pixels EM can be supplied as the write-in current Ipix which has a suitable current value, and a favorable gradation display operation can be achieved. On the other side, at the same time of a black display operation, while shutting down the write-in current Ipix from each of the current generation circuits ISy, by applying predetermined black display voltage to each of the signal lines DL1, DL2, . . . , it can shift to a black display state rapidly and enhancement in the display response characteristics in the display device, together with the display image quality can be achieved.

<<The Sixth Embodiment of the Data Driver>>

Next, the sixth embodiment of the data driver applied to the display device mentioned above will be explained.

While the write-in generation circuits are formed for every signal line; take in, hold and generate the write-in current; and a configuration that performs a supply operation to predetermined timing, each of the write-in current generation circuits are a system comprising the same configuration and write-in current generation circuits as the data driver of the fifth embodiment. Particularly, it has a specified state setting section and has a configuration which can accordingly supply specified voltage (reset voltage) to the signal lines as a specified value for the display data. Here, in this embodiment, a negative reference current which supplies a constant value from a single current generator to the write-in current generation circuit clusters.

Figure 30:
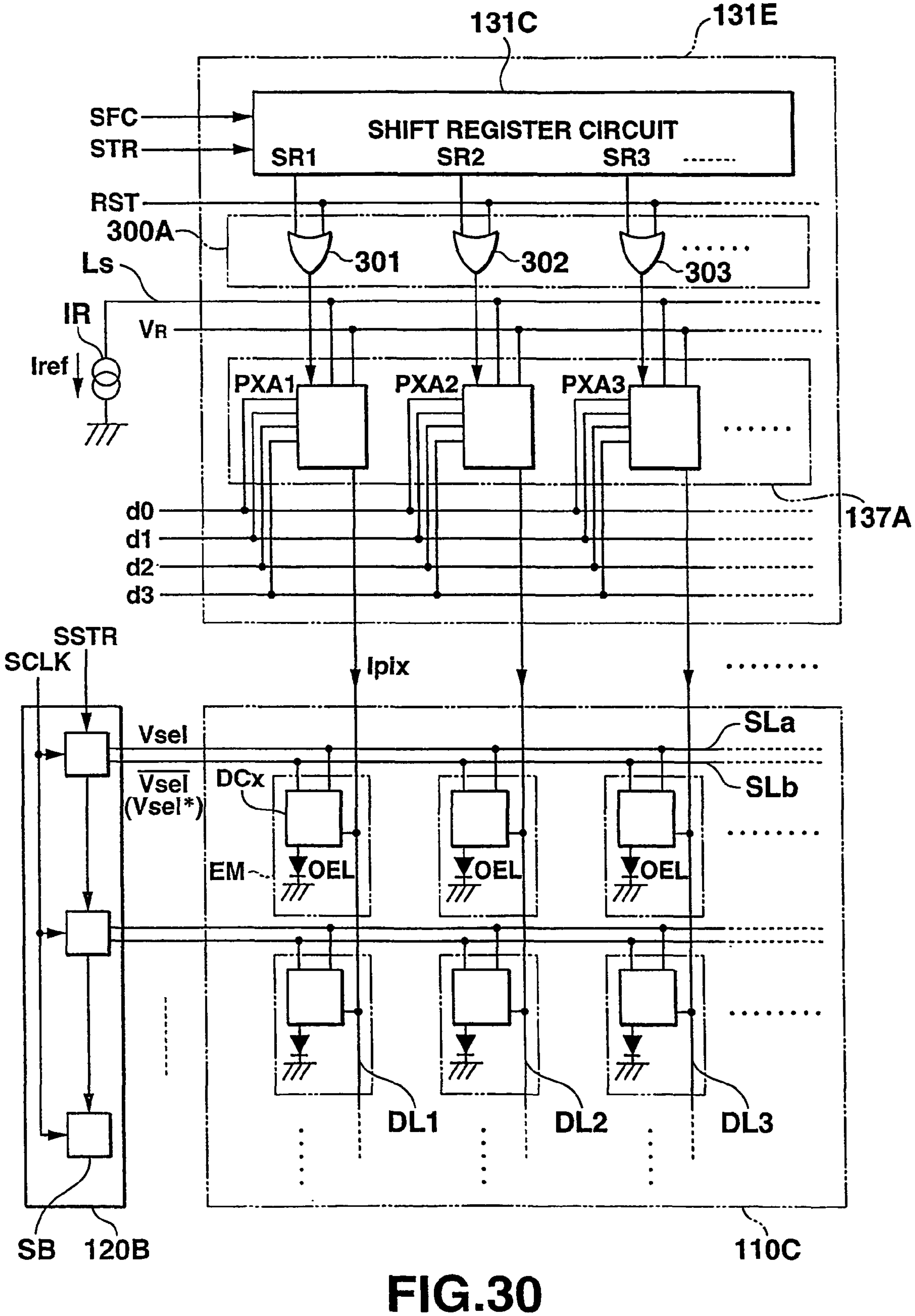
FIG. 30 is a circuit arrangement drawing showing the configuration of the sixth embodiment of the data driver in the display device related to this invention.

FIG. 30 is a circuit arrangement drawing showing the configuration of the sixth embodiment of the data driver in the display device related to this invention.

Here, concerning any configuration equivalent in the embodiments mentioned above, the same or equivalent nomenclature is appended and the explanation is simplified or omitted from the description.

The data driver 130E in this embodiment, for example as shown in FIG. 30 has a configuration comprising a shift register circuit 131C, an OR circuit group 300A, the write-in current generation circuit cluster 137A and the constant current generator IR. The shift register circuit 131C outputs shift signals SR1, SR2, SR3 . . . at predetermined timing while shifting the shift start signal STR based on the shift clock signal SFC supplied as the data control signal from the system controller 150. The OR circuit group 300A consists of the OR circuits 301, 302, 303, . . . which output the timing control signal CLK to the write-in current generation clusters 137A mentioned later as the OR operation result that sets the input signal as the reset control signal RST supplied as the data control signal from each of the shift signals SR1, SR2, SR3, . . . (Equivalent to the timing control signal CLK mentioned above.) and the system controller 150 from the shift register 131C. The write-in current generation circuit clusters 137A consist of a plurality of the write-in current generation circuits PXA1, PXA2, PXA3, . . . (Equivalent to the current drive circuit ISA in the third embodiment of the current generation circuit. Hereinafter, described as the write-in current generation circuit PXA for convenience.) which take in sequentially the display data d0-dk (Here, equivalent to the digital signals d0-d3 mentioned above which are set to k=3 for convenience of explanation.) in one line periods supplied sequentially from the system controller 150 based on the timing control signal CLK output from each of the OR circuits 301, 302, 303, . . . , generate the write-in current Ipix according to the luminescent brightness in each of the display pixels EM in the display panel 110B, and supply to each of the signal lines DL1, DL2, DL3, . . . . The constant current generator IR regularly supplies the reference current Iref which has a constant current value via the common reference current supply line Ls to each of the write-in current generation circuits PXA1, PXA2, PXA3, . . . formed externally of the data driver 130E.

Here, the write-in current generation circuits PXA1, PXA2, and PXA3, . . . are comprised of a configuration equivalent to the write-in current generation circuit ISy in the fifth embodiment of the data driver as shown in FIG. 29, which has the signal latch section, the current generation section and the specified state setting section.

<<Pixel Driver Circuit>>

Subsequently, the pixel driver circuit applied to each of the display pixels EM of the display panel 110B in the display device concerning this embodiment is explained briefly.

Figure 31:
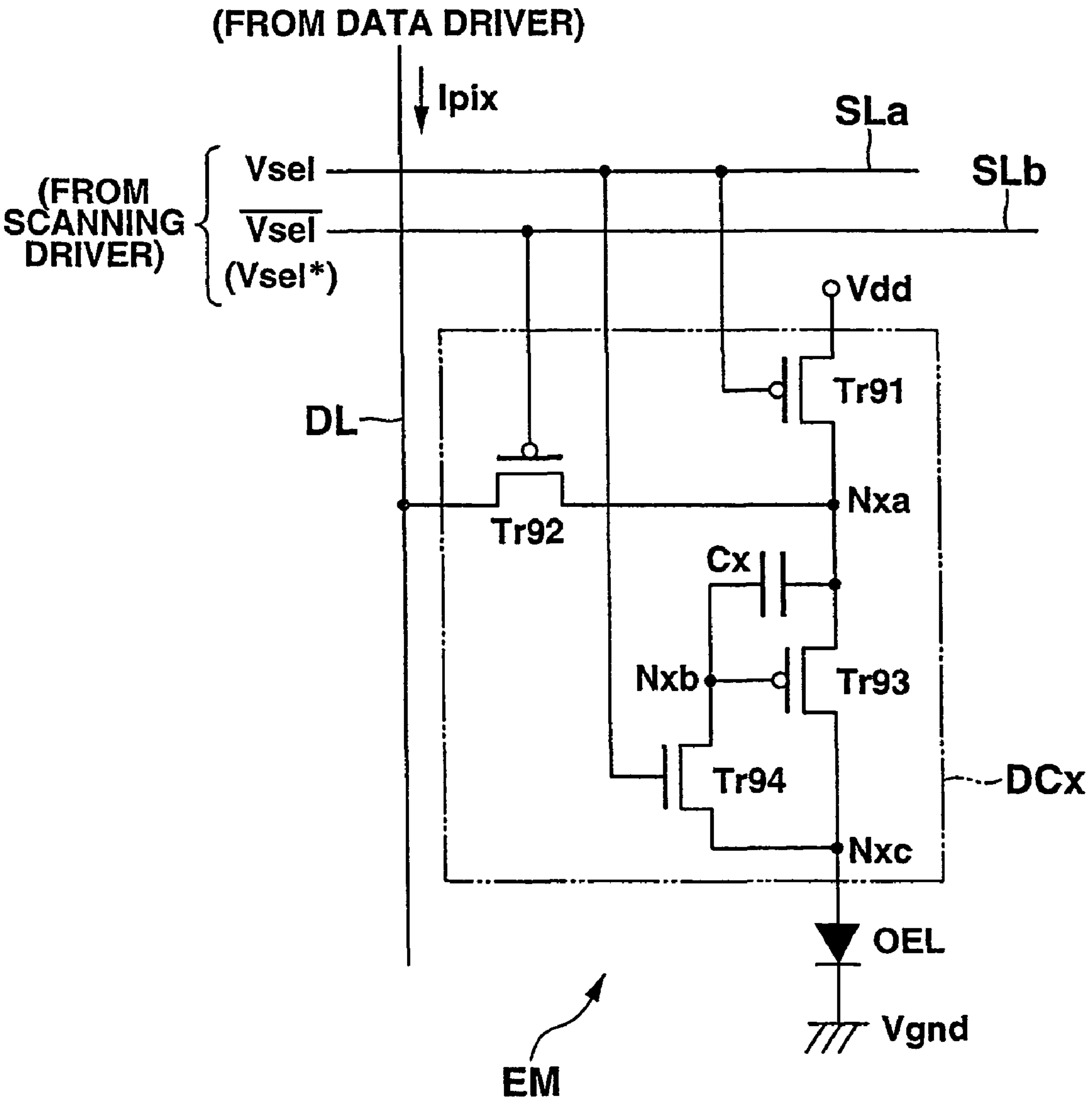
FIG. 31 is a circuit arrangement drawing applicable to the display device in this embodiment showing another example of the configuration of the pixel driver circuit corresponding to the current application method.

FIG. 31 is a circuit arrangement drawing applicable to the display device in this embodiment showing another example of the configuration of the pixel driver circuit corresponding to the current application method.

In addition, the pixel driver circuit shown here is only one example applicable to the display device related to this embodiment. Needless to say, there can be other circuit arrangements which have an equivalent function.

As shown in FIG. 31, the pixel driver circuits DCx as applied to this example configuration comprises a Pch transistor Tr91, a Pch transistor Tr92, a Pch transistor Tr93, an Nch transistor Tr94, and a capacitor Cx. The Pch transistor Tr91 is respectively connected with the drain terminal to the supply Vdd contact, the source terminal to contact Nxa, and the gate terminal to the scanning lines SLa near the intersecting point of the scanning lines SLa-SLb and the signal lines DL. The Pch transistor Tr92 is respectively connected with the drain terminal to the signal lines DL and the source terminal to contact Nxa, and the gate terminal to the scanning lines Slb. The Pch transistor Tr93 is respectively connected with the drain terminal to contact Nxa and the source terminal to contact Nxc, and the gate terminal to contact Nxb. The Nch transistor Tr94 is respectively connected with the drain terminal to contact Nxb and the source to Nxa, and the gate terminal to the scanning line SLa. The capacitor Cx (retention volume; charge storage means) is connected in between the contact Nxa and contact Nxb. Here, the supply contact Vdd is connected to a high voltage potential supply via the supply line, which is omitted from the diagram, and constant high potential voltage is applied to predetermined timing.

Furthermore, each of the organic EL devices OEL with which luminescent brightness is controlled by the luminescent drive current from the pixel driver circuits DCx, are connected respectively with the anode terminal connected to the contact Nxc of the above-mentioned pixel driver circuits DCx and the cathode terminal connected to the low supply voltage Vgnd (for example, voltage to ground). Here, the capacitor Cx may be parasitic capacitance formed in between the gate-source of the Nch transistor Tr93, and a capacitative element (a capacitor) can be attached (added) separately in between the gate-source in addition to the parasitic capacitance.

The drive control operation of the organic EL devices OEL in the pixel driver circuits DCx which has such a configuration, first, in a write-in operation period applies a low-level scanning signal Vsel* to the scanning lines SLb as it applies a high-level (selection level) scanning signal Vsel to the scanning lines SLa. Subsequently, synchronizing with this timing, the pixel driver circuits DCx supplies the write-in current Ipix to the signal lines DL for performing luminescent operation of the organic EL devices OEL by predetermined brightness gradation. Here, the write-in current Ipix current of positive polarity is supplied and set up so the proper current flows in (pours in) the direction of the display pixels EM (pixel driver circuits DCx) via the signal lines DL from the data driver 130E side.

Accordingly, as the transistors Tr92 and Tr94, which constitute the pixel driver circuits DCx perform an "ON" operation, the transistor Tr91 performs an "OFF" operation and positive potential corresponding to the write-in current Ipix supplied to the signal lines DL is applied to contact Nxa. Furthermore, as contact Nxb and contact Nxc instantly connect with each other, the voltage potential between the gate-source of the transistor Tr93 is controlled to the equivalent voltage potential. Therefore, as transistor Tr93 performs an "OFF" operation, between the ends of capacitor Cx (between contact Nxa and contact Nxb), the voltage potential difference according to the amount of increase in the write-in current Ipix occurs, and the corresponding electric charge in relation to the voltage potential difference is accumulated and held as the voltage component.

Subsequently, in the luminescent operation period, as the low-level (non-selection level) scanning signal Vsel is applied to the scanning lines SLa together with a high-level scanning signal Vsel* also applied to the scanning lines SLb, in synchronizing with this timing, the supply of the write-in current Ipix is interrupted (shut down). Accordingly, capacitor Cx holds the charge stored up in the write-in operation mentioned above by transistors Tr92 and Tr94 which performed an "OFF" operation and electrically interrupt between the signal lines DL and contact Nxa, as well as between contact Nxb and contact Nxc.

Thus, when capacitor Cx retains (stores) the charge voltage at the time of the write-in operation, the voltage potential difference between contact Nxa and contact Nxb (between the gate-source of Tr93 of a transistor) will be held, and the transistor Tr93 performs an "ON" operation.

Additionally, by application of the above-mentioned scanning signal Vsel (low-level), transistor Tr91 performs an "ON" operation simultaneously. The luminescent drive current according to the write-in current Ipix (the charge retained in capacitor Cx) flows into the organic EL devices OEL via transistors Tr91 and Tr93 from the supply contact Vdd (high supply voltage), and the organic EL devices OEL emit light by predetermined brightness gradation. Thus, in the pixel driver circuits DCx as applied to this embodiment, the transistor Tr93 has the function as the transistor for the luminescent drive.

<<Drive Control Method>>

Next, the operation of the display device which has the configuration mentioned above is explained with reference to the drawings.

Figure 32:
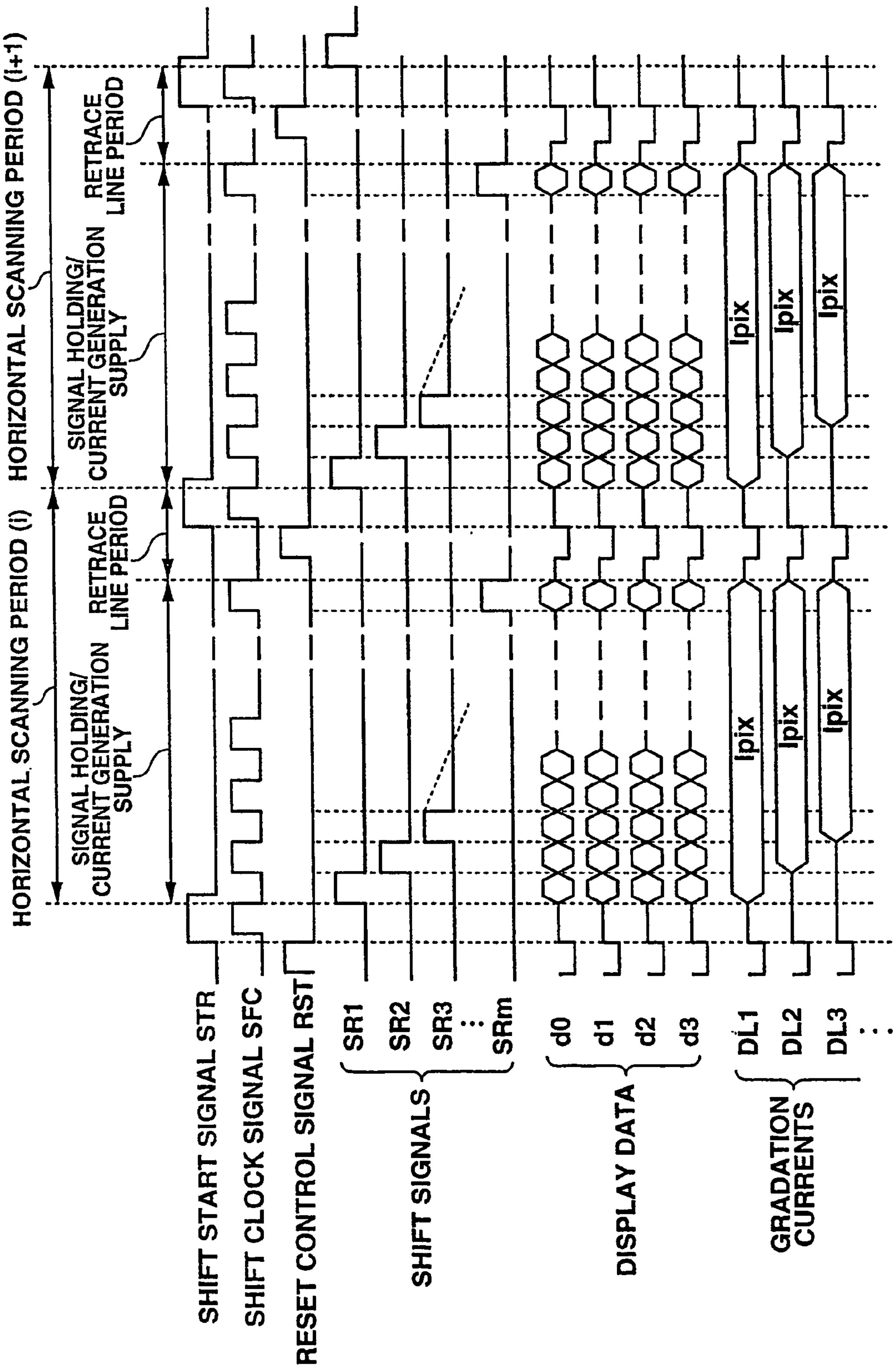
FIG. 32 is a timing chart which shows an example of the drive control operation in the data driver of this embodiment.

FIG. 32 is a timing chart which shows an example of the drive control operation in the data driver of this embodiment.

Figure 33:
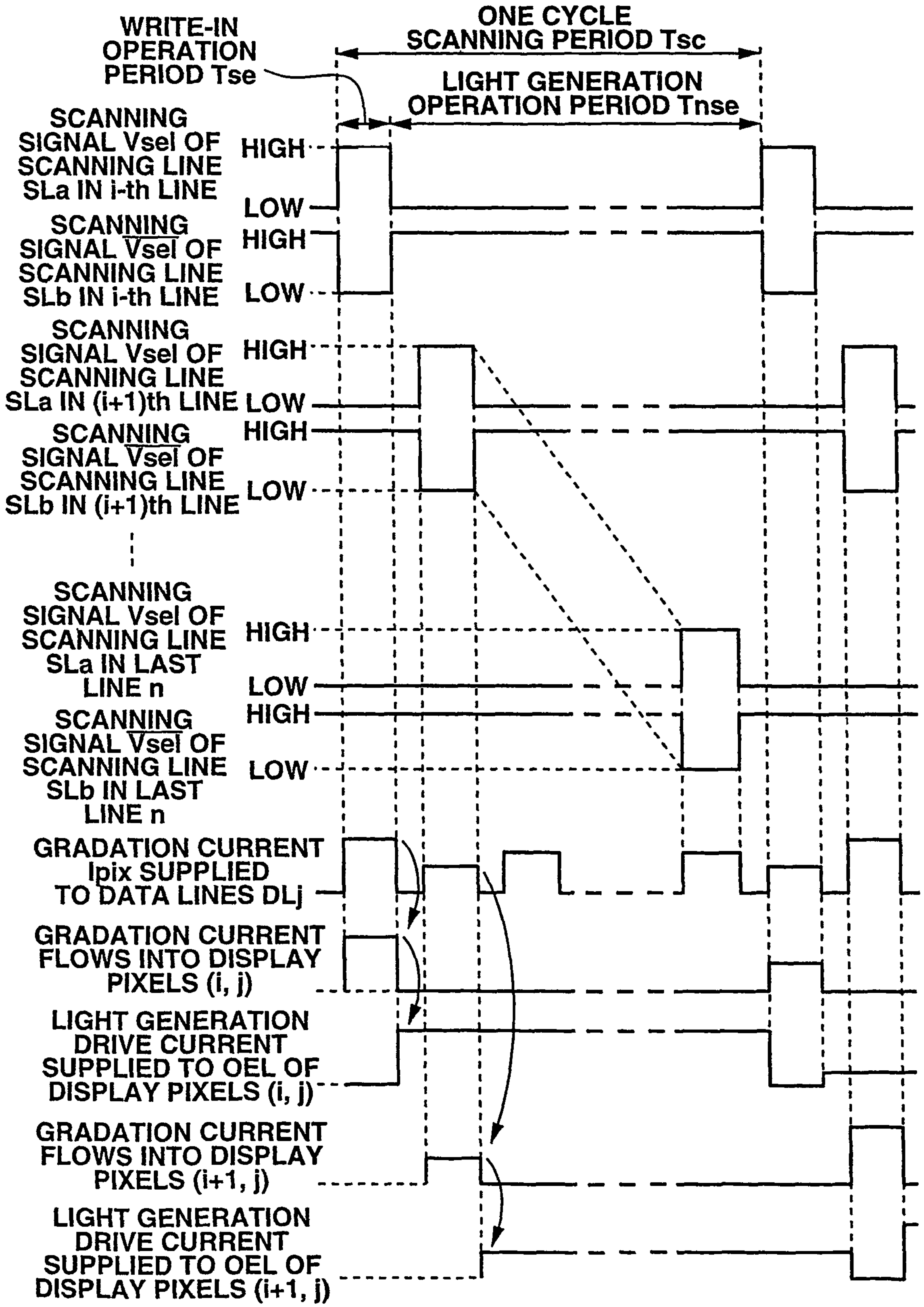
FIG. 33 is a timing chart which shows an example of the drive control operation of the display panel in this embodiment.

FIG. 33 is a timing chart which shows an example of the drive control operation of the display panel in this embodiment.

Here, in addition to the configuration shown in FIG. 30, explanation will accordingly refer to the configuration of the current generation circuit shown in FIG. 4 and FIG. 5.

The drive control operation in the data driver 130E, performs by setting up sequentially a reset operation, a signal holding operation and a current generation supply operation. Initially, the reset operation applies the specified voltage Vr (reset voltage) to each of the signal lines DL1, DL2, DL3, . . . via the specified state setting section formed in each of the gradation current generation circuits PXA1, PXA2, and PXA3, . . . mentioned above in advance of the signal holding operation described later. The signal holding operation outputs during a fixed period an inverted signal based on the display data d0-d3 while taking in and holding the display data d0-d3 supplied from the display signal generation circuit 160 to the data latch sections formed in each of the gradation current generation circuits PXA1, PXA2, and PXA3, . . . . The current generation supply operation supplies individually each of the display pixels EM via each of the signal lines DL1, DL2, DL3, . . . by generating the write-in current Ipix according to the above-mentioned display data d0-d3 from the current generation section formed in each of the gradation current generation circuits PXA1, PXA2, and PXA3, . . . based on the output signal from the data latch sections.

Also, the above-mentioned reset operations are performed simultaneously to each of the gradation current generation circuits PXA1, PXA2, and PXA3, . . . during periods other than a period that performs the signal holding operation within one horizontal select period and the current generation supply operation, for example, within retrace line periods. Conversely, the signal holding operation and the current generation supply operation are performed sequentially in each of the gradation current generation circuits PXA1, PXA2, and PXA3, . . . in a period except retrace line periods of one horizontal select period.

Here, as shown in FIG. 32, in a reset operation by supplying a high-level reset control signal RST from the system controller 150 during the retrace line period before a signal holding operation, a high-level timing control signal CLK is output to the data latch section provided in each of the gradation current generation circuits PXA1, PXA2, PXA3, . . . from each of the OR circuits 301, 302, 303, . . . . Further synchronizing with this timing, by supplying display data d0-d3 corresponding to a luminescent operation (Equivalent to a black display operation) by the lowest brightness gradation from the display signal generation circuit 160 as reset data, the taking in and holding of the proper display data d0-d3 (Namely, all zeros (0)) is performed simultaneously in each of data latch section.

Subsequently, in furnishing a low-level reset control signal RST by outputting a low level timing control signal CLK to the data latch section of each of the gradation current generation circuits PXA1, PXA2, PXA3, . . . from each of the OR circuits 301, 302, 303, . . . , a non-inverted output signal of the display-data d0-d3 which were stored as mentioned above is output to the specified state setting section, and the specified voltage Vr (reset voltage) is applied to each of the signal lines DL1, DL2, DL3, . . . . Accordingly, the wiring capacity among other things of each of the signal lines DL1, DL2, DL3, . . . , the electrical charge stored up in the capacity component, such as the retention volume (capacitor Cx) and the like provided in the display pixels EM connected to each of the signal lines DL1, DL2, DL3, . . . discharges and each potential is set as a predetermined low potential state.

Furthermore, in a signal holding operation, as shown in FIG. 32, by supplying the low-level reset control signal RST from the system controller 150, the timing control signal CLK responsive to the signal level of the shift signals SR1, SR2, SR3, . . . that output sequentially from the shift register circuit 131C are output to the data latch section of each of the gradation current generation circuits PXA1, PXA2, PXA3, . . . . The operation which takes in sequentially the display data d0-d3 which changes corresponding to each line of the display pixels EM (Namely, each of the signal lines DL1, DL2, DL3, . . . ) from each of the data latch sections with timing from the timing control signal CLK becomes a high-level and is continuously performed in one line periods. Also the state, where the inverted output signal of the display data d0-d3 taken in by the data latch section and outputted to each of the current generation sections, is held during a fixed period (For example, the period until the following high-level signals SR1, SR2, SR3, . . . are outputted.).

Additionally, in the current generation supply operation, the "ON/OFF" state of a plurality of switch transistors (switch transistors Tr26-Tr29 shown in FIG. 3) provided in each of the current generation sections are controlled based on the inverted output signal outputted from the above-mentioned data latch sections. The composite current of the gradation currents which flow into the gradation current transistors (transistors Tr22-Tr25 shown in FIG. 3) connected to the switch transistors which perform an "ON" operation are sequentially supplied via each of the signal lines DL1, DL2, DL3, . . . as write-in current Ipix.

Here, the write-in current Ipix, for example, according to all of the signal lines DL1, DL2, DL3, . . . is set up so it can be supplied in parallel at least during a fixed period. Additionally, in this embodiment as mentioned above, a plurality of gradation currents, which have a current value of a predetermined ratio (For example, $2^n$; n=0, 1, 2, 3, . . . ) specified by transistor size relative in advance to the reference current Iref, are generated. When a switch transistor performs an "ON/OFF" operation based on the above-mentioned inverted output signal, predetermined gradation currents are selected and integrated; the write-in current Ipix of positive polarity is generated; and the present write-in current Ipix is supplied so it will flow (pour) in the direction of the signal lines DL1, DL2, DL3, . . . from the data driver 130E side.

In this embodiment as applied to the data driver 130E, as shown in FIG. 30, in contrast the common reference current supply Ls by which reference current Iref is supplied has a fixed value from the current generator IR and a plurality of gradation current generation circuits PXA1, PXA2, PXA3, . . . have a configuration connected in parallel. Since the write-in current Ipix is supplied to each of the signal lines DL1, DL2, DL3, . . . (display pixels EM) simultaneously in parallel based on the display data d0-d3 in each of the gradation current generation circuits PXA1, PXA2, PXA3, . . . , the current supplied to each of the gradation current circuits PXA1, PXA2, PXA3, . . . via the reference current supply line Ls is not the reference current Iref itself supplied by the current generator IR, but corresponding to the current of a number of gradation current generation circuits (Namely, equivalent to the number of signal lines arranged in the display panel 110B, for example, m lines). Thus, the current which has a current value (Iref/m) equally divided will be supplied.

Therefore, the circuit configuration can be set up by m times the ratio, which takes into consideration the above-mentioned current value (Iref/m) supplied to each of the gradation current generation circuits PXA1, PXA2, PXA3, . . . . This current value ratio (Ratio of the channel width of the gradation current transistor to the reference current transistor) of each of the gradation currents to reference current is set up in the current mirror circuit section which forms the current generation section of each of the gradation current generation circuits PXA1, PXA2, PXA3, . . . .

Additionally, as in the other configurations set in each gradation current generation section, a switching means is provided which performs an "ON" operation selectively based on the shift signals SR1, SR2, SR3, . . . output from the shift register circuit 131C, for example, each of the gradation current generation circuits PXA1, PXA2, PXA3, . . . . As the write-in current Ipix is generated only in the period of the current generation supply operation based on the display data d0-d3, the reference current Iref from the above-mentioned current generator IR remains unchanged and supplies selectively each gradation current generation circuit PXA1, PXA2, PXA3, . . . .

The drive control operation in the display panel 110B is illustrated in FIG. 33, a one cycle scanning period Tsc displays the desired image information on one screen of the display panel 110B representing one cycle. Within the one cycle scanning period Tsc, the display pixels EM connected to the specified scanning lines are selected. A write-in operation period Tse (selection period) writes the write-in current Ipix corresponding to the display data d0-d3 supplied from the data driver 130A and is stored as the signal voltage. Based on the stored signal voltage, the luminescent drive current is supplied to the organic EL devices OEL according to the above-mentioned display data. A light generation operation period Tnse (non-selection period of the display pixels EM) which performs luminescent operation by predetermined brightness gradation (Tsc=Tse+Tnse) is set up, and drive control equivalent to the pixel drive circuit DCx mentioned above is performed in each period of operation. Here, the write-in operation period Tse is set for every line so a time overlap does not occur with one another. Also, the write-in operation period Tse is at least set as a period comprising a fixed period which supplies in parallel the write-in current Ipix to each signal line in the current generation supply operation of the above-mentioned data driver 130A.

Specifically, in the write-in operation period Tse to the display pixels EM, as shown in FIG. 33, by scanning lines SLa and SLb to a predetermined signal level from the scanning driver 120B to the display pixels EM of a specified line (i-th line), the operation which stores simultaneously the write-in current Ipix supplied in parallel to each of the signal lines DL from the data driver 130A as the voltage component is performed. In the subsequent light operation period Tnse, the operation to emit light by the brightness gradation corresponding to the display data is maintained by supplying continuously the luminescent drive current based on the voltage component stored during the above-mentioned write-in operation to the organic EL devices OEL.

As shown in FIG. 33, by performing repeatedly in sequence such as series of drive control operations on each and every line of the display pixel clusters that constitute the display panel 110B, the display data for one screen is written in, each of the display pixels EM emit light by predetermined brightness gradation and the desired image information is displayed.

Therefore, according to the data driver and display device related to this embodiment, the write-in current Ipix is supplied to the display pixels EM cluster of a specified line via each of the signal lines DL from each of the gradation current generation circuits PXA1, PXA2, PXA3, . . . . In particular, the write-in current Ipix generated consists of the constant reference current Iref which is supplied with a signal level that does not fluctuate and based on the display data d0-d3 of a plurality of digital signal bits from the current generator IR (via the common reference current supply line Ls). During the supply time (selection time) of the write-in current Ipix to the display pixels EM, even in the case where the light generation operation is set up briefly using relatively low luminosity gradation (When the current value of the write-in current Ipix is negligible.) with the high definition display panel and the like, the influence of transfer lag (transmission delay) in the signals supplied to the data driver (Each of the gradation current generation circuits PXA1, PXA2, PXA3, . . . ) to generate the write-in current Ipix can be eliminated, reduction of the operating speed of the data driver can be controlled and enhancement in the display response characteristics in the display device together with display image quality can be achieved.

Also, specifically in the case of the supply operation of the write-in current Ipix to each of the display pixels EM, in advance of the signal holding operation and the current generation supply operation in the data driver 130E, a reset voltage consisting of a constant low voltage is applied to each of the signal lines DL. Because the data driver can discharge sufficiently the electric charge accumulated in the capacitative wiring (parasitic capacitance) attached to the signal lines and the capacitative element retention volume (capacitor Cx of the pixel driver circuits) and the like of the display pixels EM, the display device can be initialized (reset). When a selection period of the display pixels EM is set up briefly as the gradation currents are written in based on fresh display data, especially when performing a light generation with low luminosity gradation immediately after performing a light generation operation with especially high luminosity gradation, the influence by the electric charge which remains in the above-mentioned capacitative element can be eliminated, and the time required to stabilize the signal level can be shortened. Therefore, because the level according to the display data can be stabilized quickly, the signal level applied to the signal lines or the display pixels and the writing speed to the display pixels can be raised. Also, the display response characteristics and display image quality of the display device can be enhanced.

<<The Seventh Embodiment of the Data Driver>>

Next, the seventh embodiment of the data driver applied to the display device mentioned above will be explained.

Although the above-mentioned data driver in the sixth embodiment comprises a circuit arrangement corresponding to the current sinking method drawing current write-in current in the direction of the data driver from the display pixels, this invention is not limited to this. It may be equipped with a circuit arrangement of the current application method supplied so the write-in current will flow (pour) in the direction of the display pixels from the data driver.

The data driver concerning this embodiment is configured with a circuit arrangement of the current application method.

Figure 34:
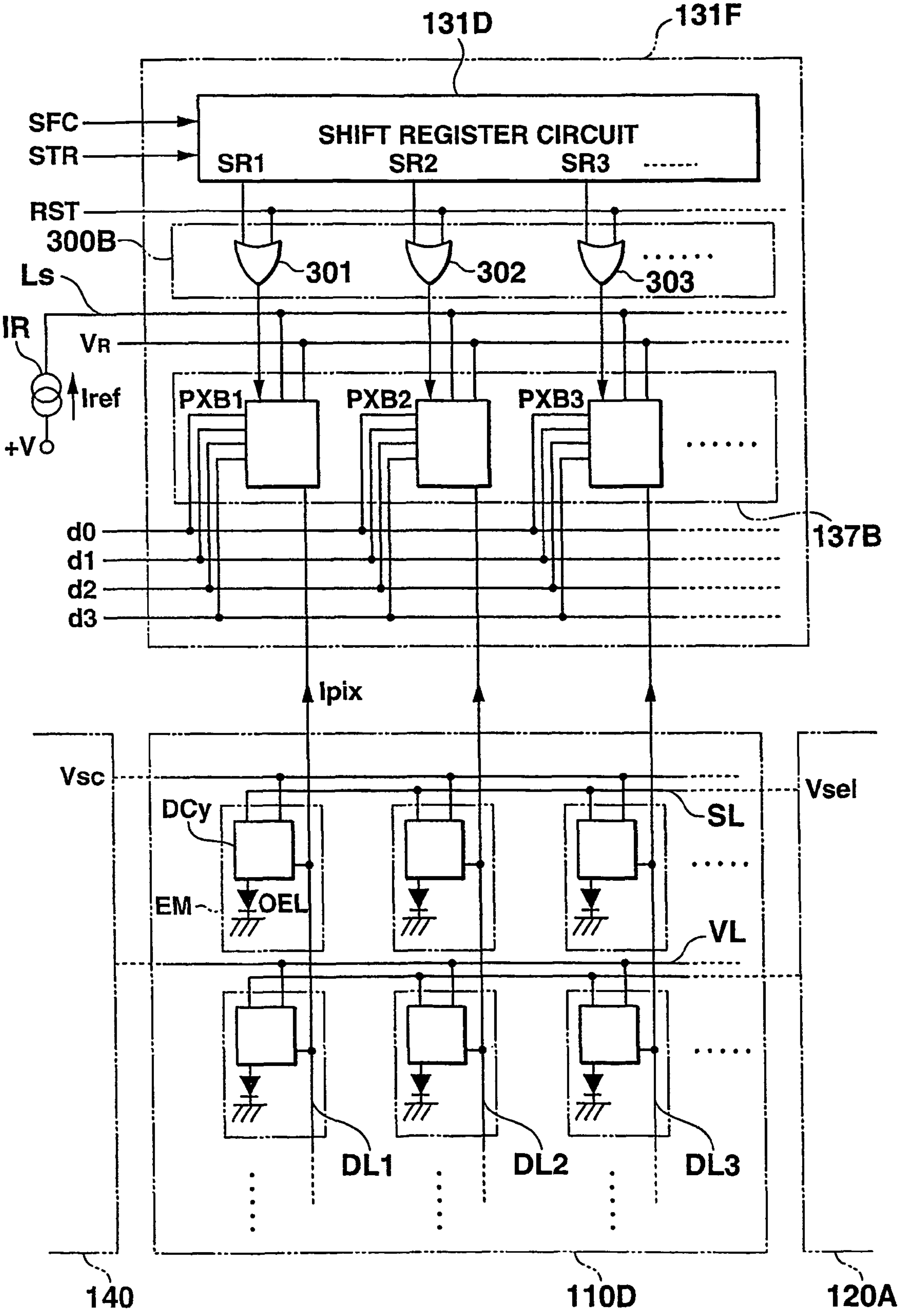
FIG. 34 is a circuit arrangement drawing showing a configuration of the seventh embodiment of the data driver in the display device related to this invention.

FIG. 34 is a circuit arrangement drawing showing a configuration of the seventh embodiment of the data driver in the display device related to this invention.

Here, concerning any configuration equivalent in the embodiments mentioned above, the same or equivalent nomenclature is appended and the explanation is simplified or omitted from the description.

As shown in FIG. 34, the data driver 130G related to this embodiment, briefly, has a configuration comprising a shift register circuit 131D, an OR circuit group 300B, the write-in current generation circuit cluster 137B and the current generator IR. The shift register circuit 131D which has a configuration equivalent to the data driver 130E shown in FIG. 30; the OR circuit 300B consists of a current supply line Ls connected to the current generator IR, the OR circuits 301, 302, 303, . . . and a voltage line by which the specified voltage Vr (reset voltage) is applied; and a write-in current generation circuit cluster 137B consisting of the write-in current generation circuits PXB1, PXB2, PXB3, . . . (Hereinafter referred to as the write-in current generation circuit PXB for convenience.) to generate the write-in current Ipix current polarity set up so it will flow (pour) in the direction of the data driver 130B via each of the signal lines DL from the display panel 110D side.

Here, each of the write-in current generation circuits PXB1, PXB2, PXB3, . . . have a configuration comprises a configuration equivalent to the write-in current generation circuit ISx in the fourth embodiment of the data driver shown in FIG. 25 comprising a signal latch section, a current generation section, and a specified state setting section.

<<Pixel Driver Circuits>>

Subsequently, the configuration of the pixel driver circuits applied to each of the display pixels of the display panel 110D related to this embodiment will be explained.

Figure 35:
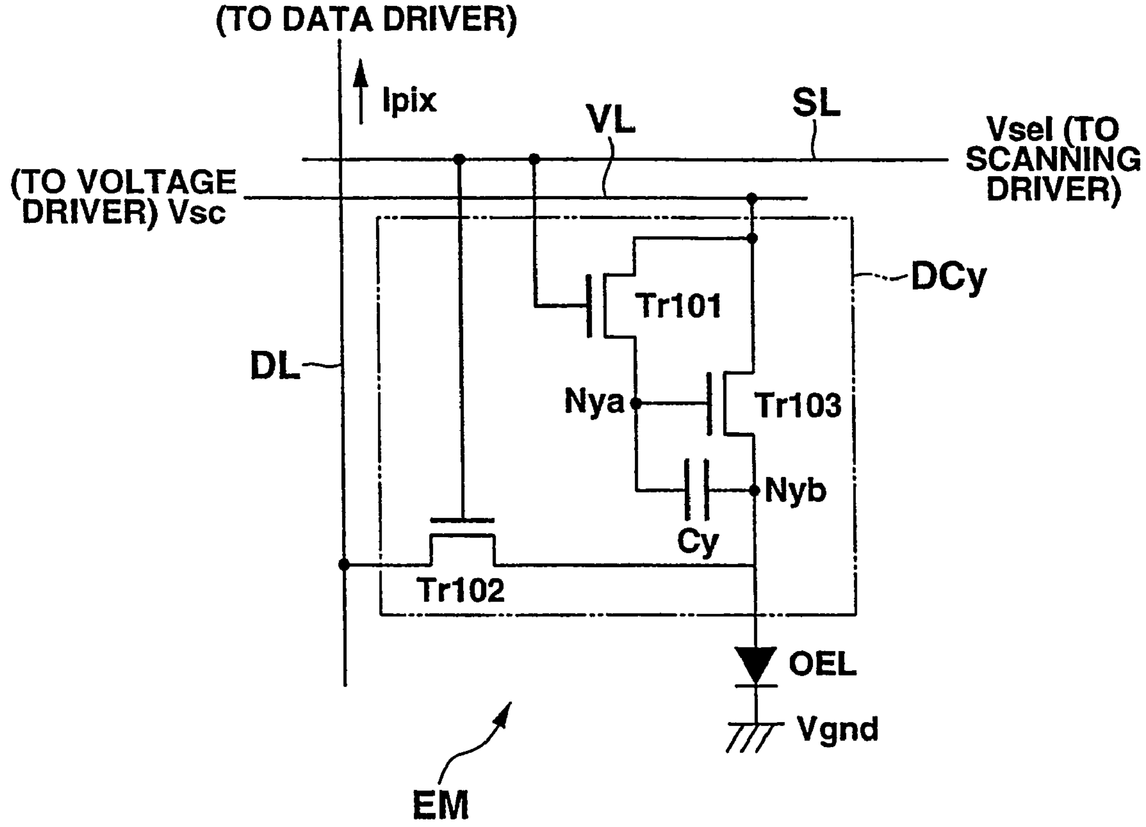
FIG. 35 is a circuit arrangement drawing applicable to the display device in this embodiment showing another example of the configuration of the pixel driver circuit corresponding to the current sinking method.

FIG. 35 is a circuit arrangement drawing applicable to the display device in this embodiment showing another example of the configuration of the pixel driver circuit corresponding to the current sinking method.

The pixel driver circuits shown here only represents an example applicable to the display device related to this invention. Needless to say, there can be other circuit arrangements having an equivalent operational function.

As shown in FIG. 35, the pixel driver circuits DCy related to this embodiment, for example, comprises an Nch transistor Tr101, an Nch transistor Tr102, an Nch transistor Tr103 and a capacitor Cy. The Nch transistor Tr101 is individually connected by means of the drain terminal connected to contact Nya, the source terminal connected to the voltage lines VL arranged in parallel with the scanning lines SL and the gate terminal connected to the scanning lines SL near the intersecting point of the scanning lines SL and the signal lines DL. The Nch transistor Tr102 by means of the source terminal and the drain terminal individually connected to the signal lines DL and contact Nyb, and the gate terminal connected to the scanning lines SL. The Nch transistor Tr103 by means of the source terminal and drain terminal individually connected to the voltage lines VL and contact Nyb, and the gate terminal connected to contact Nya. The capacitor Cy is connected in between contact Nya and contact Nyb.

Additionally, the organic EL devices OEL for light generation luminosity are controlled by the light generation drive current supplied from the pixel driver circuits DCy. The organic EL device OEL anode terminal is connected to contact Nyb of the above-mentioned pixel driver circuits DCy, and the cathode terminal is individually connected to the low supply voltage Vgnd (voltage to ground). Here, the capacitor Cx may be parasitic capacitance formed in between the gate-source of the Nch transistor Tr103, and a capacitative element (a capacitor) can be attached separately in between the gate-source in addition to the parasitic capacitance.

Here, as shown in FIG. 34, the voltage lines VL are arranged in parallel to the scanning lines SL and connect in common corresponding to the display pixels EM of each line with one end connected to the voltage driver 140.

<<Drive Control Method>>

In the drive control operation in the data driver 130B which has such a configuration is the same as that of the drive control method (Reference FIG. 32) in the sixth embodiment of the data driver mentioned above. Initially, in the reset operation prior to the signal holding operation and the current generation supply operation, by applying a reset control signal the specified voltage Vr (reset voltage) is applied simultaneously to each of the signal lines DL1, DL2, DL3, . . . by the specified state setting section formed in each of the write-in current generation circuits PXB1, PXB2, PXB3, . . . setting a predetermined low potential voltage state.

Subsequently, in the signal holding operation, a non-inverted output signal of the display data d0-d3 taken in sequentially by each line (display pixels EM) from the data latch section of each of the write-in current generation circuits PXB1, PXB2, PXB3, . . . is output to each of the current generation sections based on the shift signals SR1, SR2, SR3, . . . output sequentially from the shift register circuit 131D.

Also, in the current generation supply operation, based on the above-mentioned non-inverted output signal from the current generation sections, a plurality of gradation currents are selectively integrated to generate the write-in current Ipix of negative polarity via each of the signal lines DL1, DL2, DL3, . . . from each of the display pixels EM side and supplied sequentially so the write-in current Ipix may be drawn in the data driver 130F direction.

In the write-in operation period, the drive control operation of the organic EL devices OEL in the pixel driver circuits DCy which has such a configuration, initially applies the power supply voltage Vsc of a low-level to the voltage lines VL while applying the scanning signals Vsel of a selection level (high-level) to the scanning lines SL. Also, synchronizing with this timing, the write-in current Ipix is supplied to the signal lines DL from the data driver 130F. Here, as a write-in current Ipix supplying current of negative polarity is set up so the proper current will be drawn in the direction of the data driver 130B via the signal lines DL from the display pixels EM (pixel driver circuits DCy) side. Accordingly, while the Nch transistors Tr101 and Tr102 which constitute the pixel driver circuits DCy perform an "ON" operation and a low-level of the power supply voltage Vsc is applied to contact Nya, a low supply voltage level is applied to contact Nyb rather than the low-level of the power supply voltage Vsc via the Nch transistor Tr102 by a drawing in operation of the write-in current Ipix.

In this way, when a voltage potential difference occurs between contacts Nya and Nyb (between the gate-source of the Nch transistor Tr103), the Nch transistor Tr103 performs an "ON" operation and current corresponding to the write-in current Ipix flows in the direction of the signal lines DL via the Nch transistor Tr103, contact Nyb and the Nch transistor Tr102 from the voltage lines VL.

At this time, the capacitor Cy electric charge corresponding to the potential difference produced in between contacts Nya and Nyb is accumulated and held as the voltage component (the capacitor charges). Also, at this point, since the supply applied to the anode terminal (contact Nxb) of the organic EL devices OEL becomes lower than the supply (voltage to ground) of the cathode terminal and reverse-bias voltage is applied to the organic EL devices OEL, the light generation drive current does not flow into the organic EL devices OEL and a light generation operation is not performed.

Subsequently, in the light generation operation period, while applying a non-selection level (low-level) of the scanning signal Vsel to the scanning lines SL, a high-level of the power supply voltage Vsc is applied to the voltage lines VL. Synchronizing with this timing, the drawing in operation of the write-in current Ipix is suspended.

Since application of a voltage level resulting from drawing in operation of a write-in current Ipix to contact Nyb is interrupted (shut down) while the Nch transistors Tr101 and Tr102 perform an "OFF" operation, application of the power supply voltage Vsc to contact Nya is accordingly interrupted. The capacitor Cy then holds the electric charge stored in write-in operation mentioned above.

In this way, when the capacitor Cx holds the charge voltage at the time of the write-in operation, the voltage potential difference between contacts Nya and Nyb (between gate-source of the Nch transistor Tr103) will be held, and Nch transistor Tr103 maintains an "ON" state. Also, because the power supply voltage which has a voltage level higher than the voltage to ground is applied to the voltage lines VL, the light generation drive current flows into the organic EL devices OEL in the forward-bias direction via Nch transistor Tr103 and contact Nyb from the voltage lines VL.

Here, because the potential difference (charge voltage) held in the capacitor Cy is equivalent to the potential difference when the current flows corresponding to the write-in current Ipix to the Nch transistor Tr103 at the time of the above-mentioned write-in operation, the light generation drive current which flows into the organic EL devices OEL will have a current value equal to the above-mentioned current. The organic EL devices OEL continue operation to emit light by the desired luminosity gradation in the light generation operation period, based on the voltage component corresponding to the gradation currents written in the write-in operation period.

Further, like the series of drive control operations, shown in FIG. 33 using the scanning driver 120A, voltage driver 140 and the data driver 130F, by performing them repeatedly in sequence on each and every line of the display pixel clusters that constitute the display panel 110B, the display data for one screen is written in, each of the display pixels EM emit light by predetermined brightness gradation and the desired image information is displayed.

Therefore, also established in the display device as applied to the data driver 130F related to this embodiment, by the reset operation the electric charge accumulated in the capacitative element attached to the signal lines DL or the display pixels EM is fully discharged. Afterwards it initializes in a predetermined low supply state and each of the gradation currents supplied to the display panel (display pixels) can be generated and supplied based on the display data consisting of the reference current of a constant current value and the digital signals. At the same time, it can control any reduction in the data driver operating speed resulting from the charge and discharge operation of the capacitative element attached to the signal lines, the reference current supply line or the like, as well as enhance the display response characteristics. The gradation currents which have a suitable current value according to the display data from the gradation current supply circuits individually formed corresponding to each of the signal lines can be generated, each of the display pixels can be supplied, and a favorable gradation display can be achieved.

<<The Eighth Embodiment of the Data Driver>>

Subsequently, the eighth embodiment of the data driver applied to the display device concerning this embodiment will be explained.

The data driver related to this embodiment is the same as the fifth embodiment of the data driver mentioned above is comprised with two sets of the write-in current generation circuits formed in each of the signal lines. Each set of the write-in current generation circuits perform take in and holding of the display data, generate write-in current, as well as a supply operation complementarily and successively according to predetermined operation timing. Each of the write-in current generation circuits comprises the same configuration as the write-in current generation circuit in the sixth embodiment of the data driver. Specified voltage (reset voltage) can be supplied for the display data to the signal lines as a specified value. Here, in this embodiment, the data driver is constituted so that negative reference current which has a constant value from a single current generator can be supplied to each of the write-in current generation circuit clusters formed in the two sets.

Figure 36:
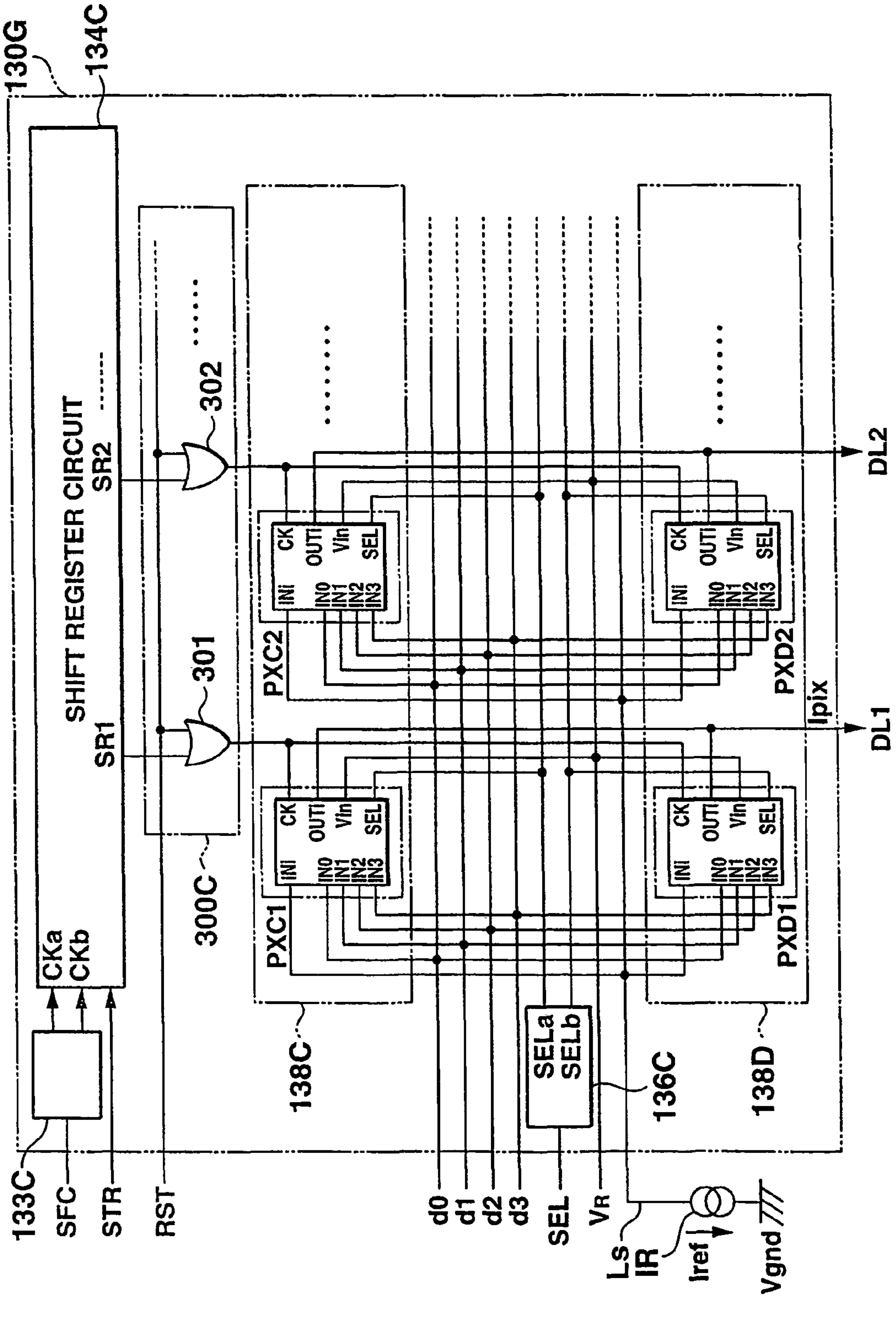
FIG. 36 is a circuit arrangement drawing showing the configuration of the eighth embodiment of the data driver in the display device related to this invention.

FIG. 36 is a circuit arrangement drawing showing the configuration of the eighth embodiment of the data driver in the display device related to this invention.

Here, concerning any configuration equivalent in the embodiments mentioned above, the same or equivalent nomenclature is appended and the explanation is simplified or omitted from the description.

As shown in FIG. 36, the data driver 130G related to this embodiment has a configuration comprising the same configuration as the fifth embodiment of the data driver mentioned above. Specifically, the data driver 130G comprises an inverted latch circuit 133C, a shift register circuit 134C, the OR circuit group 300C, a selection setting circuit 136C and the current generator IR. The inverted latch circuit 133C generates the non-inverted clock signal CKa and the inverted clock signal CKb based on the shift clock signal SFC supplied from the system controller 150; a shift register circuit 134C outputs sequentially the shift signals SR1, SR2, SR3, . . . to predetermined timing, while shifting the shift start signal STR based on the non-inverted clock signal CKa and the inverted clock signal CKb; the OR circuit group 300C consists of the OR circuits 301, 302, 303, . . . which output in common the OR operation result of the reset control signal RST supplied from each of the shift signals SR1, SR2, SR3, . . . (Hereinafter described as the shift signals SR for convenience hereafter) and the system controller 150 as the timing control signal CLK to the write-in current generation circuit clusters 138C and 138D described later. Two sets of the write-in current generation circuit clusters 138C and 138D take in sequentially the display data d0-d3 in one line periods which are supplied sequentially from the display signal generation circuit 160 based on the timing control signal CLK output from each of the OR circuits 301, 302, 303, . . . , generate the write-in current Ipix corresponding to the light generation luminosity in each of the display pixels EM and then supplied (applied) via each of the signal lines DL1, DL2, DL3, . . . ; a selection setting circuit 136C generates the selection setpoint signal (The non-inverted signal SLa and the inverted signal SLb of the switching control signal SEL) for operating selectively either of the above-mentioned write-in current generation circuit clusters 138C and 138D based on the switching control signal SEL supplied as the data control signal from the system controller 150; and the current generator IR (current of negative polarity is supplied and drawn out) supplies constant reference current Iref via each of the write-in current generation circuits PXC1, PXC2, PXC3, . . . and PXD1, PXD2, PXD3, . . . (Hereinafter referred to as the write-in current generation circuits PXC and PXD for convenience.) which constitute the write-in current generation circuit clusters 138C and 138D, and a common reference current supply line Ls.

Here, the inverted latch circuit 133C, the shift register circuit 134C and the selection setting circuit 136C are each equipped with a configuration equal to the inverted latch circuit 133B in the fifth embodiment of the data driver, the shift register circuit 134B and the selection setting circuit 136B.

In addition, each of the write-in current supply circuits PXC and PXD have a configuration which comprises a configuration equal to the write-in current generation circuits ISy in the fifth embodiment of the data driver shown in FIG. 29 and equipped with the signal latch section 10*y*, the current generation section 20*y* and the specified state setting section 40*y*.

In the write-in current generation circuits PXC and PXD which have such a configuration, when the selection setpoint signal of a selection level is input from the selection setting circuit 136C, based on inverted output signals d10*-d13* output from the data latch sections 10*y*, the write-in current Ipix according to the display data d0-d3 is generated in the current generation section 20*y*. Concurrently, the display pixels EM are supplied via the signal lines DL and the write-in current generation circuits PXC or PXD are set into a selection state.

Conversely, when a non-selection level of the selection setpoint signal is input from the selection setting circuit 136C, although the display data d0-d3 are taken in and held in the data latch sections 10*y* the write-in current Ipix is not generated, but the signal lines DL will be supplied and the write-in current generation circuits PXC or PXD will be set into a non-selection state.

Specifically, the selection setting circuit 136C, by setting appropriately the selection setpoint signal (The non-inverted signal SLa or the inverted signal SLb of the switching control signal SEL) input to the two sets of write-in current generation circuit clusters 138C and 138D, either of the two sets of write-in current generation circuit clusters 138C and 138D can be set into a selection state and the other side can be set into a non-selection state.

<<Drive Control Method>>

Next, the operation of the display device which has the configuration mentioned above will be explained with reference to the drawings.

Figure 37:
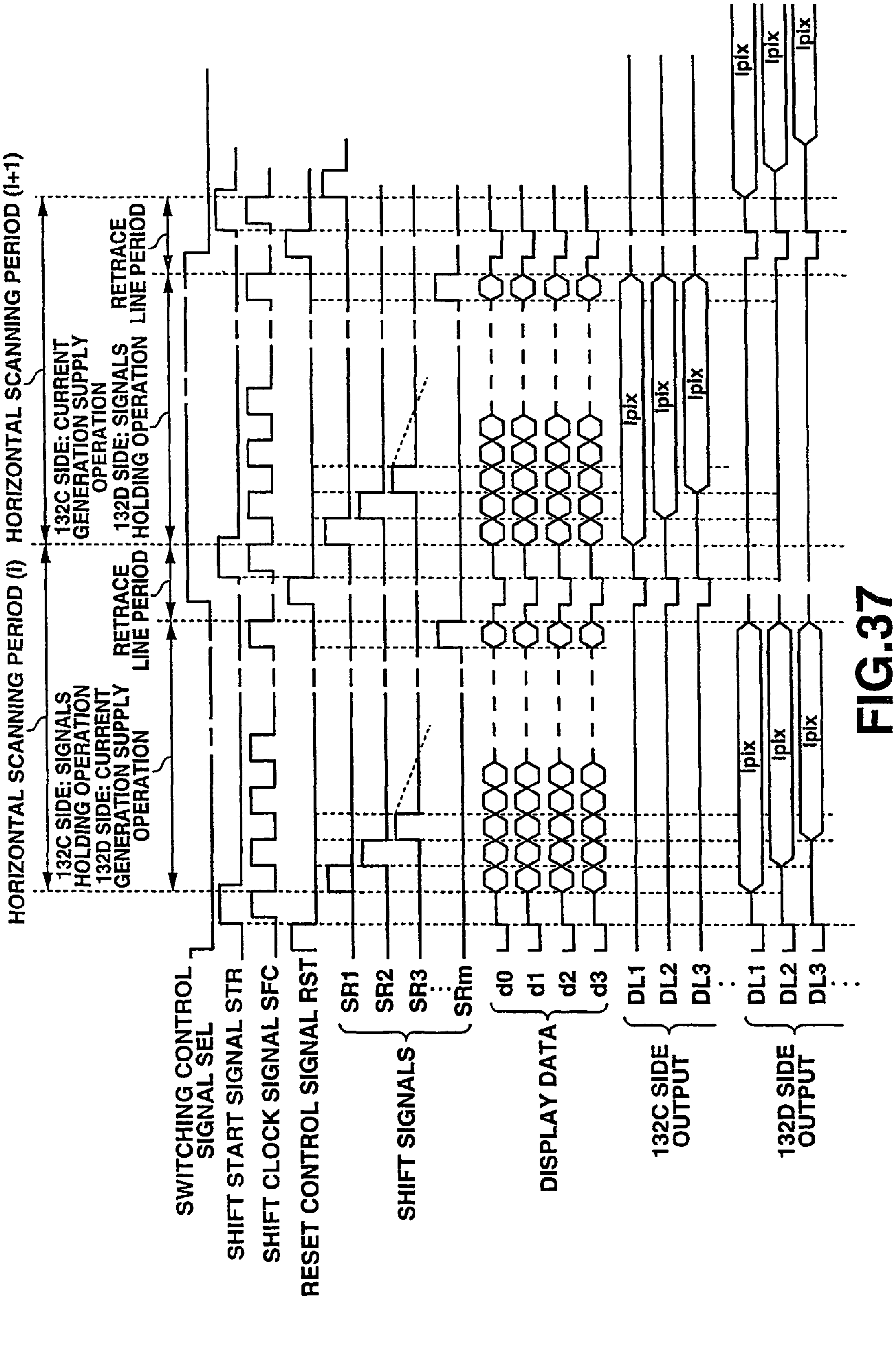
FIG. 37 is a timing chart which shows an example of the drive control operation of the data driver in this embodiment.

FIG. 37 is a timing chart which shows an example of the drive control operation of the data driver in this embodiment.

In the drive control operation in the data driver 130G, first, in two sets of the write-in current generation circuit clusters with one side set as a non-selection state, the signal holding operation sequentially takes in and holds the display data d0-d3 corresponding to each of the display pixels EM in each of the write-in current generation circuits (data latch sections) formed in these write-in current generation circuit clusters. The reset operation sets the specified state of each of the write-in current generation circuit clusters via each of the write-in current generation circuits (specified state setting section) and applies simultaneously the specified voltage Vr (reset voltage) to each of the signal lines DL and discharges the stored charge. A current supply operation generates the write-in current Ipix corresponding to the display data d0-d3 held in the above-mentioned signal holding operation by each of the write-in current generation circuits (current generation sections) which is supplied sequentially to each of the display pixels EM via each of the signal lines DL to perform the setting. Further, such a series of setting operations is performed successively and alternately in the two sets of write-in current generation circuit clusters.

The drive control operation in the data driver 130G, as shown in FIG. 37, first the switching control signal SEL is supplied from the system controller 150. In the signal holding operation, after one of the write-in current generation circuit clusters (For example, write-in current generation circuit cluster 138C) is set in a non-selection state by the selection setting circuit 136C, based on the shift signals SR1, SR2, SR3, . . . output sequentially from the shift register circuit 134C, the display data d0-d3 is taken in sequentially which shifts corresponding to each line of the display pixels EM (Namely, each of the signal lines DL1, DL2, DL3, . . . ) into each of the write-in current generation circuits PXC1, PXC2, PXC3, . . . that constitute the write-in current generation circuit cluster 138C, and the holding operation is carried out successively in one line periods.

Subsequently, in a reset operation after the selection setting circuit 136C sets the selection state by supplying the switching control signal SEL from the system controller 150, the display data d0-d3 corresponding to the specified state (Equivalent to a black display state) are taken in simultaneously through supplying the reset control signal RST in each of the write-in current generation circuits PXC1, PXC2, PXC3, . . . of the write-in current generation circuit cluster 138C. Accordingly, the specified voltage Vr (reset voltage) is applied simultaneously to each of the signal lines DL from each of the write-in current generation circuits PXC1, PXC2, PXC3, . . . , and the electric charge accumulated in the capacitative element attached to each of the signal lines DL1, DL2, DL3, . . . and the display pixels EM discharges.

Subsequently, in the current generation supply operation based on the display data d0-d3 held in the above-mentioned signal holding operation in each of write-in current generation circuits PXC1, PXC2, PXC3, . . . (data latch sections), by integrating selectively a plurality of the gradation currents which are set so each one has a different current value ratio, the write-in current Ipix which specifies the luminosity gradation in each of the display pixels EM is generated and supplied sequentially via each of the signal lines DL1, DL2, DL3, . . . .

Furthermore, as shown in FIG. 37, such a series of operations is alternately performed repeatedly between the two sets of the write-in current generation circuit clusters 138C and 138D. Namely, one of the write-in current generation circuit cluster 138C is set as a non-selection period while performing the signal holding operation which takes in the display data and the other write-in current generation circuit 138D is set as a selection period. After carrying out a reset operation, the gradation currents are generated and supplied based on the display data taken in with the previous timing and performs a parallel gradation current supply operation. Subsequently, while performing the next reset operation, the write-in current generation circuit cluster 138C is set as a selection period and the current generation supply operation in the other write-in current generation circuit 138D is set as a non-selection period, while performing the signal holding operation which takes in the display data. This shifting back and forth between the write-in current generation circuits is carried out repeatedly in an alternating sequence.

Therefore, also set to the display device as applied to the data driver 130G related to this embodiment, the electric charge accumulated in the capacitative element attached to the signal lines DL or the display pixels EM from a reset operation is fully discharged. For that reason it initializes in the predetermined low supply state and each of the gradation currents supplied to the display panel (display pixels EM) can be generated and supplied afterwards based on the display data constituted by the reference current of a constant current value and the digital signals. At the same time, it can control any reduction in the data driver operating speed resulting from the charge and discharge operation of the capacitative element attached to the signal lines, the reference current supply line or the like, as well as enhance the display response characteristics. The gradation currents which have a suitable current value according to the display data from the gradation current supply circuits individually formed corresponding to each of the signal lines can be generated, each of the display pixels EM can be supplied, and a favorable gradation display can be achieved.

Additionally, by having two sets of write-in current generation circuits (clusters), repeating alternately the operation state of each of the write-in current generation circuits and performing this operation to each of the signal lines, and in view of the fact that the gradation currents have a current value corresponding appropriately to the display data and can be supplied continuously to each of the display pixels from the data driver, the light generation operation of the display pixels by predetermined luminosity gradation can be performed rapidly, as well as the display response speed and the display image quality can be further enhanced.

Moreover, in each embodiment of the data driver mentioned above, although the data driver has such a configuration which supplies in common the reference current from a single current generator with regard to supplying the reference current in a plurality of write-in current generation circuits formed in the data driver, this invention is not limited to this. It may have a constant current source for every data driver. Besides, it may have a constant current source for every gradation current generation circuit of a predetermined number of a plurality of gradation current generation circuits formed within a single data driver.

Next, as in the sixth through eighth embodiments mentioned above, the capacitative wiring attached to the signal lines and the like in prior to the operation which writes the gradation currents to the display pixels (parasitic capacitance) based on the display data or by the discharging (reset operation) the electric charge which remains in the capacitative element retention volume of the display pixels and the like to predetermined low supply voltage, the circuit arrangement of the data driver was made to realize a composition which shortens the time required to stabilize the appropriate signal levels according to the display data in the write-in operation of the gradation currents to the display pixels.

However, this invention is not limited to these configurations and can be made to achieve the technical concept that performs a reset operation according to the configuration of the pixel driver circuits which forms each of the display pixels. Hereinafter, explained in detail.

<<Other Examples of the Configuration of the Pixel Driver Circuits>>

Figure 38:
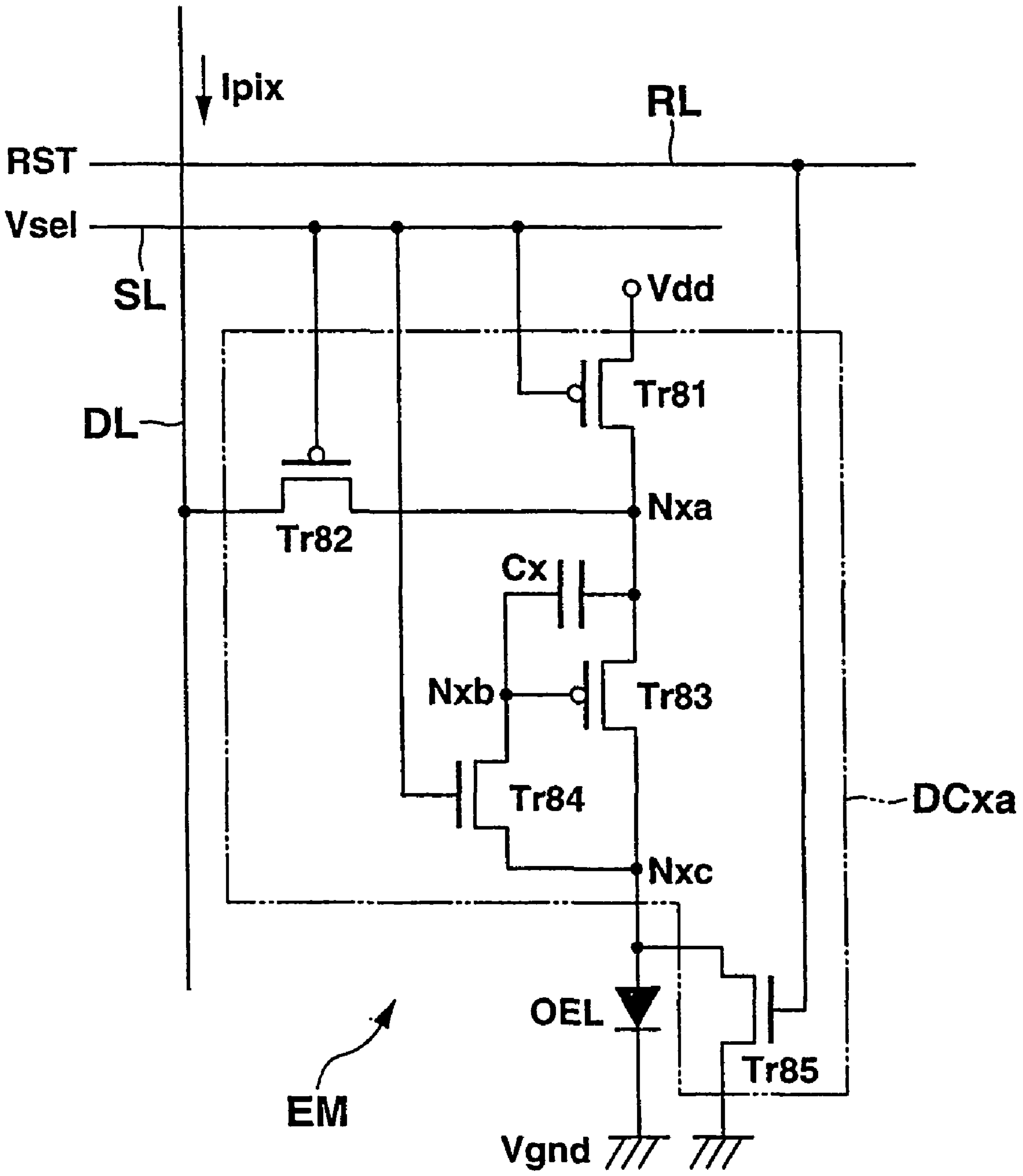
FIG. 38 is a circuit arrangement drawing showing another example of the configuration which is the display pixels applicable to the display device concerning this invention.

FIG. 38 is a circuit arrangement drawing showing another example of the configuration which is the display pixels applicable to the display device concerning this invention.

Figure 39:
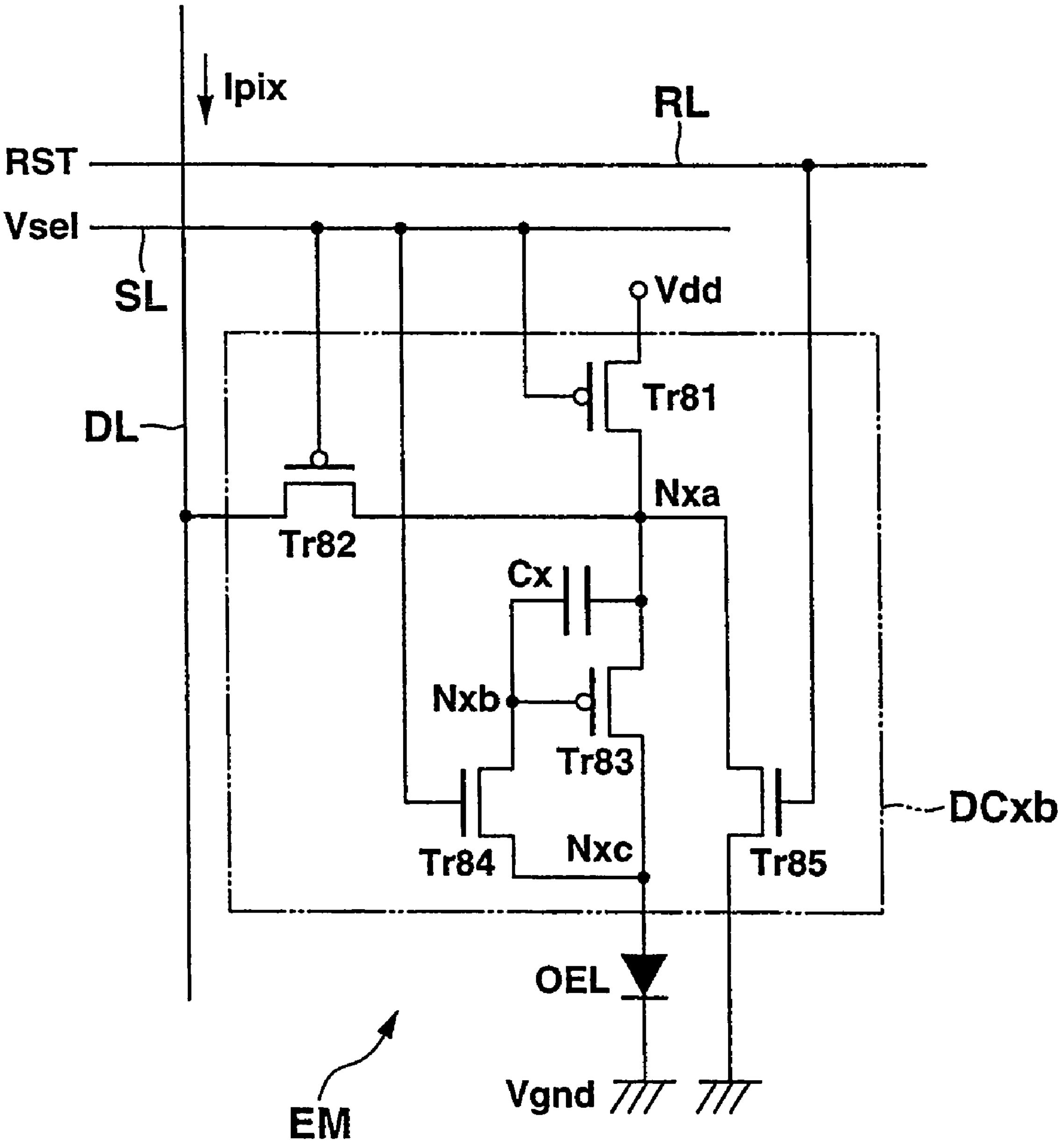
FIG. 39 is a circuit arrangement drawing showing another example of the configuration of the display pixels applicable to the display device related to this invention.

FIG. 39 is a circuit arrangement drawing showing another example of the configuration of the display pixels applicable to the display device related to this invention.

Although applied suitably for the display device concerning this invention, the configuration of the display pixels in this embodiment employs the data driver of the first and fifth embodiments mentioned above, the data driver side is not limited only to these configurations and may be equipped with other supplementary configurations.

Additionally, the configuration in FIGS. 38-39 is shown in FIG. 21. Although the reset mechanism is attached based on the above-mentioned technical concept by considering the fundamental construction of the pixel driver circuit configuration corresponding to the current application method, the fundamental configuration of the pixel driver circuits is not limited to this. As long as the circuit has a series of operational steps including the write-in operation and the light generation operation mentioned above and comprises light emitting devices for the light generation operation, other circuit arrangements can be applied, for example, the pixel driver circuit shown in FIG. 16.

As shown in FIG. 38, the transistor cluster of the pixel driver circuits DCxa for the display pixels EM related to this example configuration has the same circuit arrangement as the pixel driver circuits DCy shown in FIG. 21, which comprises as mentioned above the Pch transistors Tr81 and Tr83 and the Nch transistors Tr82 and Tr84, along with the capacitor CY. This example of the pixel driver circuits DCxa further comprises an Nch transistor Tr85. In addition to the retention volume (capacitor Cx in this example) and the organic EL device OEL (optical element), the Nch transistor Tr85 (discharge circuit) is connected by means of the control terminal (gate terminal) to the reset line RL arranged in parallel with the scanning lines SL and connected in the current path (source-drain terminals) in between contact Nxc and the low supply voltage Vgnd.

Furthermore, as shown in FIG. 38, although the configuration shown connects the Nch transistor Tr85 that has a reset function in between contact Nxc and the low supply voltage Vgnd, this invention is not limited to this. As shown in FIG. 39, the pixel driver circuits DCxb may be configured with the Nch transistor Tr85 connected in between contact Nxa and the low supply voltage Vgnd.

Also, in the pixel driver circuits DCxa and DCxb shown in FIGS. 38-39, respectively, though Tr82 consists of an Nch transistor and has a circuit arrangement with the control terminal connected to the scanning lines SL, the operational function in the pixel driver circuits is equal to the operational function of the pixel driver circuit shown in FIG. 21.

In such a configuration, by applying a high-level reset control signal RST to the reset line RL from the system controller 150, the Nch transistor Tr85 performs an "ON" operation by means of connecting electrically between the ground potential of the pixel driver circuits DCxa contact Nxc or the pixel driver circuits DCxb contact Nxa. An electric charge is accumulated (held) in the retention volume (capacitor Cx) of each of the pixel driver circuits DCxa and DCxb, which discharges to ground potential via the Nch transistor Tr85, and a reset operation of the display pixels EM is performed.

<<Drive Control Method>>

Figure 40:
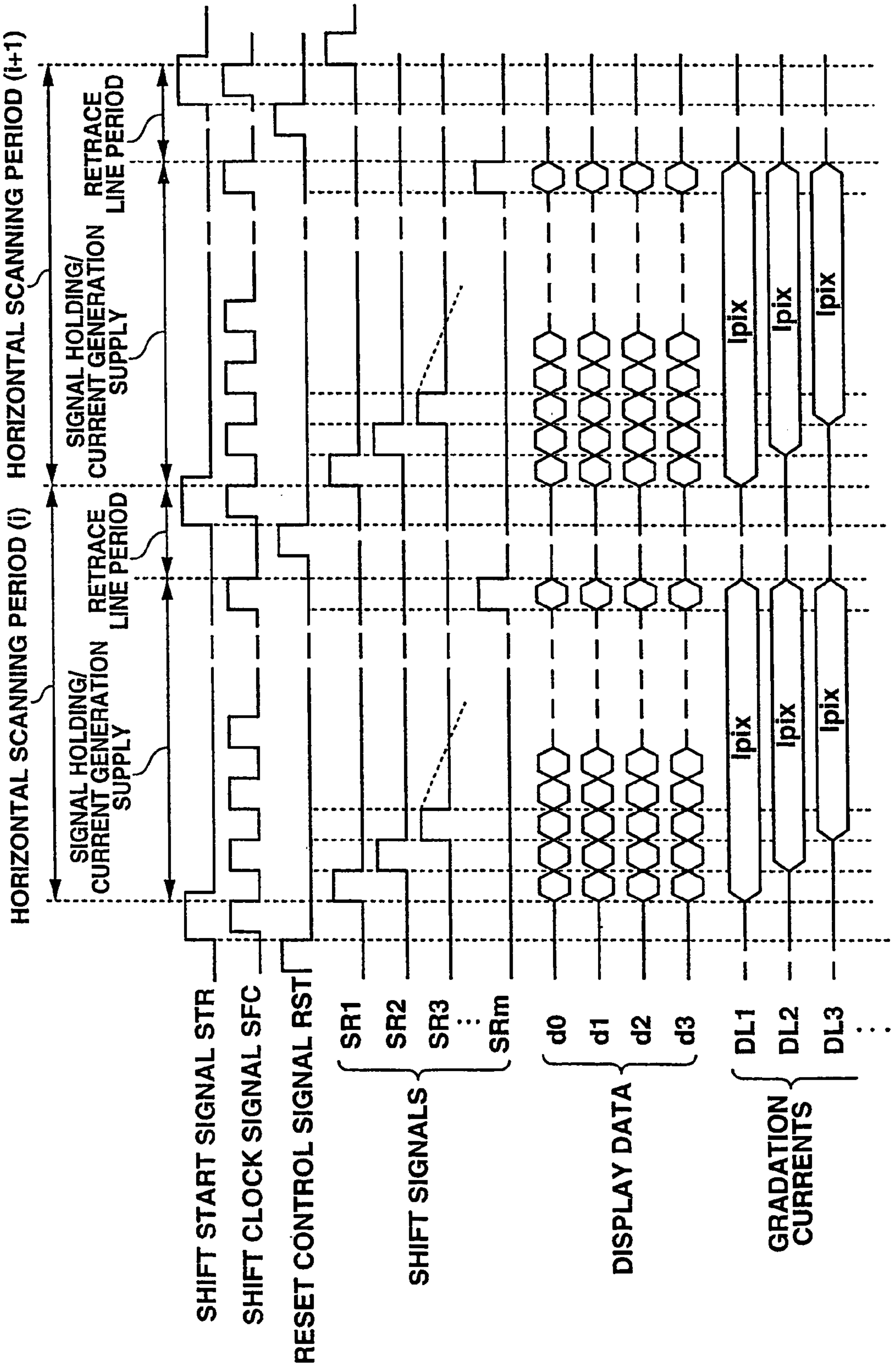
FIG. 40 is a timing chart which shows an example of the drive control operation in the display device related to this embodiment.

FIG. 40 is a timing chart which shows an example of the drive control operation in the display device related to this embodiment.

Here, the data driver which has the configuration of the first embodiment shown in FIG. 17 will be explained.

The drive control operation in the display device related to this embodiment performs by setting up sequentially, first, a reset operation which discharges the electric charge accumulated in the capacitative element attached to each of the display pixels EM prior to the supply operation of the write-in current from the data driver 130A; a signal holding operation which takes in and holds the display data supplied from the display signal generation circuit 160 to each of the write-in current generation circuits ILA1, ILA2, ILA3, . . . of the data driver; and a current generation supply operation which generates the write-in current Ipix based on the held display data and is supplied to each of the signal lines DL.

The drive control operation in the display device related to this embodiment, as shown in FIG. 40, initially preceded by the reset operation, this function generates the write-in current according to the display data from the data driver 130A which is supplied via the signal lines DL. A high-level reset control signal RST is provided via the reset line RL from the system controller 150 to the display pixel clusters lines set to a selection state in order for the write-in of the above-mentioned gradation currents. Simultaneously, Nch transistor Tr85 formed in each of the display pixels EM performs an "ON" operation and connects the specified contacts Nxc and Nxa of the pixel driver circuits DCxa and DCxb to ground potential. Accordingly, the electric charge is accumulated as the retention volume in the capacitative element (capacitor Cx) and the like formed in the pixel driver circuits DCxa and DCxb then discharges to ground potential. The potential of each of the above-mentioned contacts Nxc and Nxa is initialized in a predetermined low-level potential state (reset).

Subsequently, in the signal holding operation, the same as each of the embodiments mentioned above, the operation takes in sequentially and holds the display data performed successively in one line periods and places the display data in the current generation supply operation. By selectively integrating a plurality of gradation currents, which are each set to a current value of a different ratio based on the display data held mentioned above, generates the write-in current Ipix which is supplied sequentially to the display pixels EM via each of the signal lines DL.

In the succeeding light generation operation, each of the display pixels EM emits light by the luminosity gradation corresponding to the display data by supplying continuously the light generation drive current to the organic EL devices OEL based on the held voltage component. The write-in current Ipix is written in simultaneously and supplied in parallel to each of the signal lines DL from the data driver 130A and held as the voltage component in capacitor Cx. By applying the scanning signal of a selection level to the scanning lines SL from the scanning driver 120A to the display pixel clusters discharges the electric charge accumulated in the capacitative element from the above-mentioned reset operation.

Accordingly, as the display device applied to the display panel (display pixels EM) related to this embodiment can be initialized in the predetermined low potential state, the electric charge accumulated in the capacitative element attached to the display pixels EM from a reset operation can be discharged favorably. Furthermore, it is also possible to set the appropriate amount of electrical charge to be accumulated according to the gradation currents generated based on the display data, as well as set the light generation drive current supplied to the organic EL devices OEL as a suitable current value. Consequently, at the same time degradation of the writing speed to the display panel resulting from the charge and discharge operation of the capacitative element attached to the display pixels EM can be controlled while enhancing the display response characteristics. Also, the light generation operation of each of the display pixels EM (organic EL devices) can be performed by the proper luminosity gradation according to the display data, and a favorable gradation display is achievable.

As mentioned above in this embodiment, since this configuration comprises a reset mechanism (the Nch transistor Tr85 and the reset line RL) for discharging the stored charge in advance of the write-in operation of the gradation currents to the display pixels EM (pixel driver circuits), the reset mechanism (For example, the specified state setting section formed in each of the write-in current generation circuits shown in FIG. 30 and the OR-circuit group) in the data driver can be omitted, the circuit arrangement can be simplified and miniaturization of the display device can be achieved.

In addition, the display device related to each embodiment mentioned above illustrated only when setting the current polarity so the light generation drive current flows in the direction of the light emitting elements (organic EL devices) from the pixel driver circuits that forms the display pixels, but this invention is not limited to this. This invention may be constituted so the light generation drive current flows in the direction of the pixel driver circuits from the light emitting elements by inversely connecting the input/output terminals of the light emitting devices while connecting the high potential voltage to the other side of the light emitting devices.

<<The Second Embodiment of the Display Device>>

Next, in the current generation circuit related to this invention, an embodiment with regard to applying the pixel driver circuits formed in each of the display pixels which constitutes the display panel in the display device will be explained with reference to the drawings.

Figure 41:
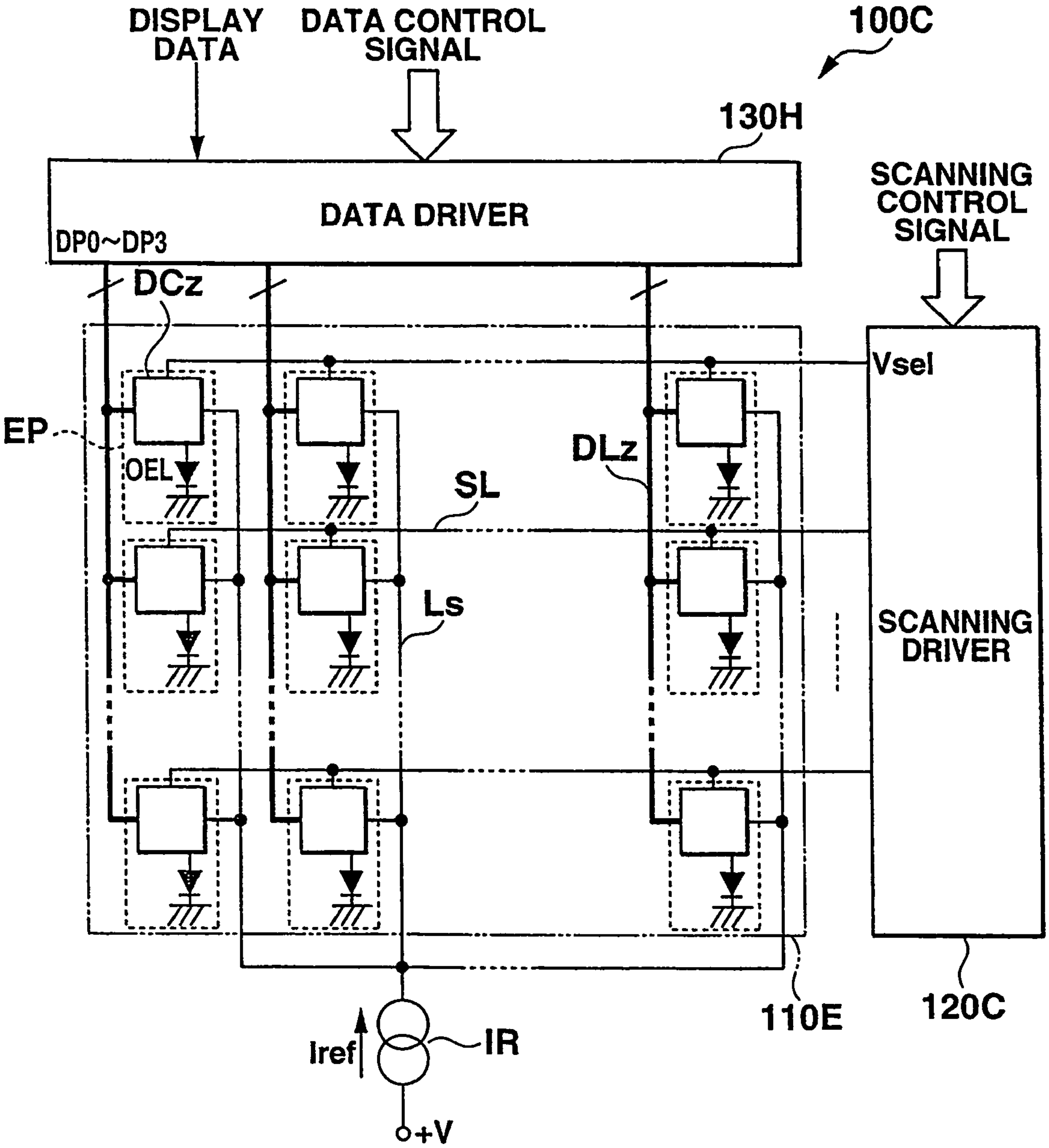
FIG. 41 is an outline block diagram showing an example of one configuration of the second embodiment of the display device related to this invention.

FIG. 41 is an outline block diagram showing an example of one configuration of the second embodiment of the display device related to this invention.

Figure 42:
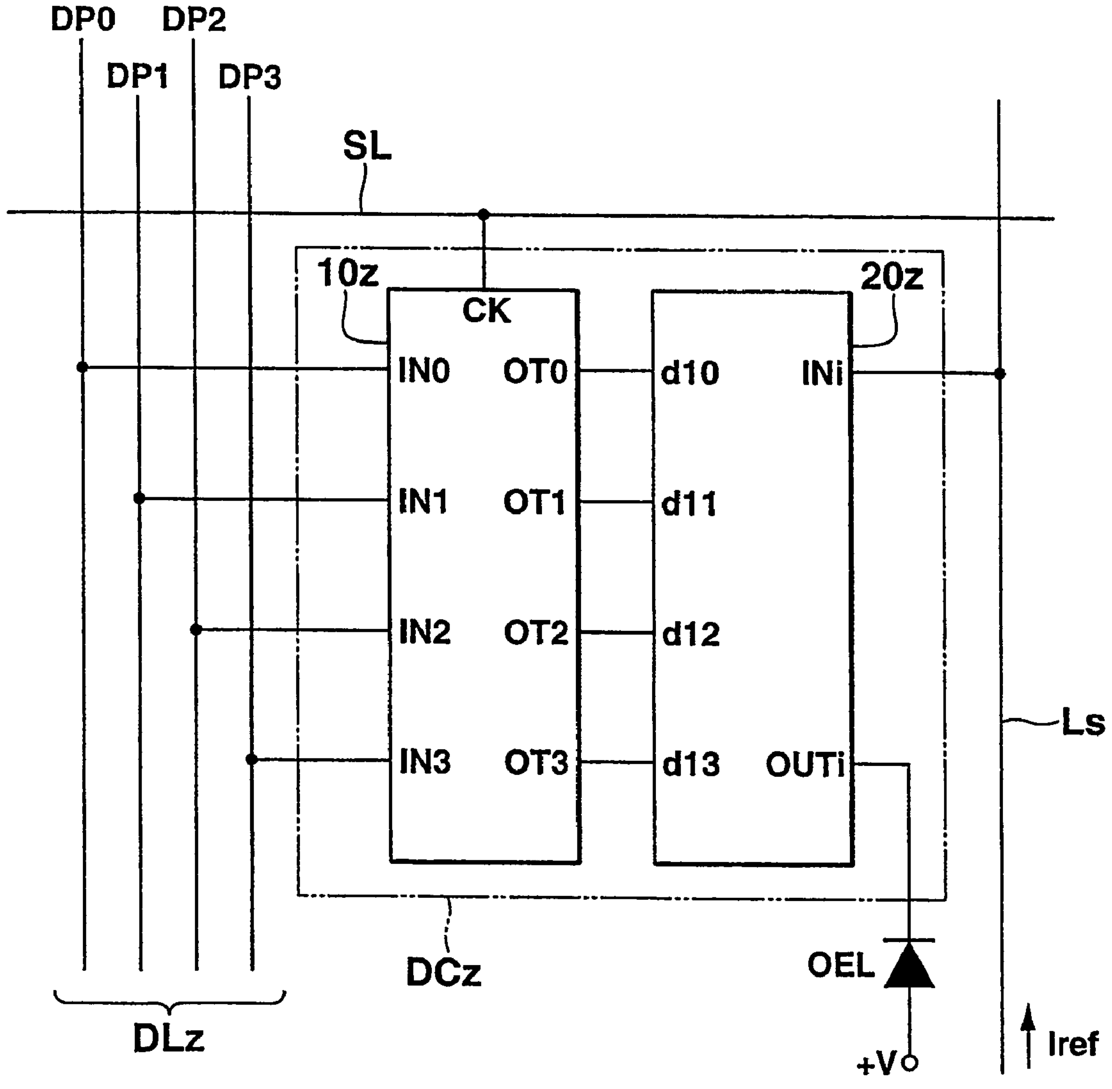
FIG. 42 is a circuit arrangement drawing showing one embodiment of the pixel driver circuit applied to the display device in this embodiment.

FIG. 42 is a circuit arrangement drawing showing one embodiment of the pixel driver circuit applied to the display device in this embodiment.

Figure 43:
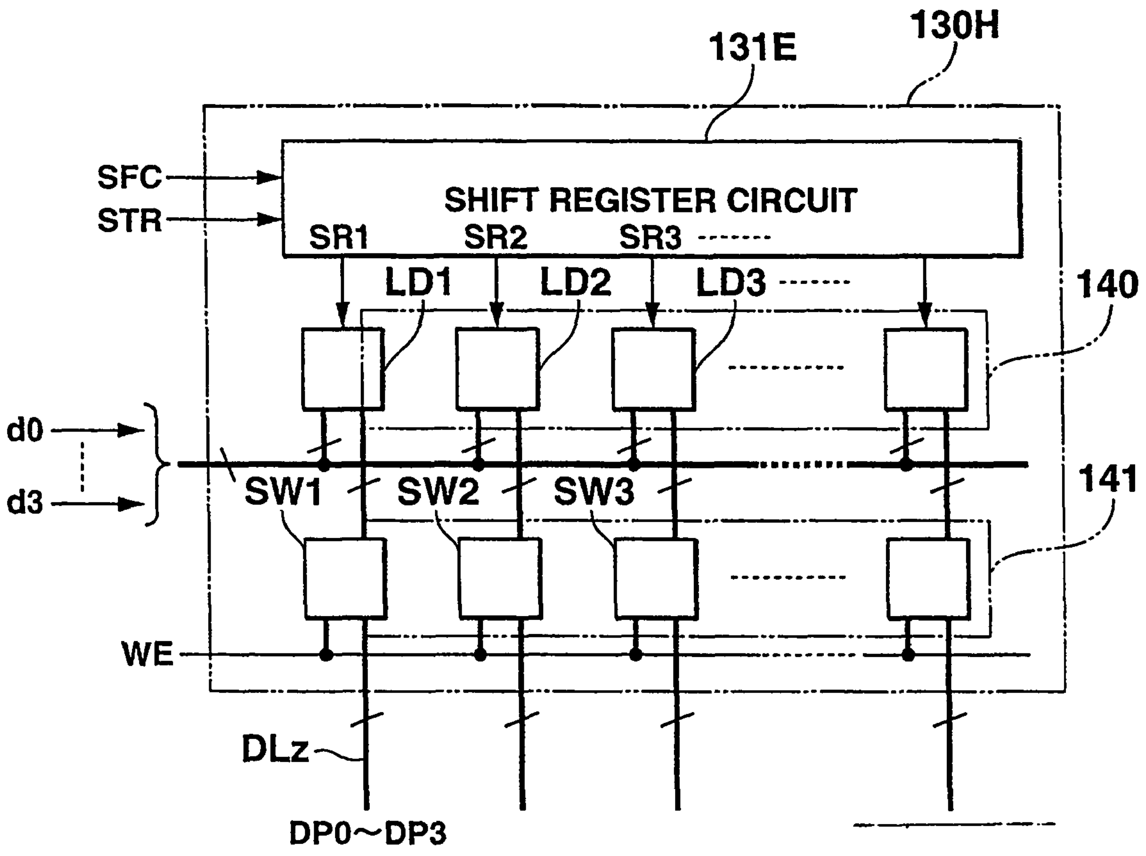
FIG. 43 is a circuit arrangement drawing showing one embodiment of the data driver applied to the display device in this embodiment.

FIG. 43 is a circuit arrangement drawing showing one embodiment of the data driver applied to the display device in this embodiment.

Here, concerning any configuration equivalent in the embodiments mentioned above, the same or equivalent nomenclature is appended and the explanation is simplified or omitted from the description.

As shown in FIG. 41, the display device 100C related to this embodiment, briefly, comprises the same configuration as the first embodiment of the display device shown in FIG. 13. Although this configuration comprises the display panel 110E, the scanning driver 120C, the data driver 130H, the system controller 150 (not shown) and the display signal generation circuit 160 (not shown), the pixel driver circuits DCz in each of the display pixels EP which forms the display panel 110E and the corresponding data driver 130H has a different configuration as shown below.

Specifically, the display panel 110E applied to this embodiment, as shown in FIG. 41, has a configuration comprised of a plurality of scanning lines SL, two or more sets of signal line groups DLz, a plurality of display pixels EP and a current generator IR. In particular, this configuration comprises a plurality of scanning lines SL arranged in parallel; two or more sets of the signal line groups DLz (four in this embodiment) arranged respectively as one set of a plurality to intersect at right angles with the scanning lines SL; a plurality of display pixels EP arranged near the intersecting point of the scanning lines SL and signal line groups DLz (In FIG. 41, the configuration consists of the pixel driver circuits DCz and the organic EL devices OEL (optical elements) which are described later); and a current generator IR regularly supplies the reference current which has a constant current value in the display pixels EP.

Here, as shown in FIG. 41, the pixel driver circuits DCz configurations comprise the light generation drive and the organic EL devices OEL (optical elements). The light generation drive generates light generation drive current based on the scanning signals Vsel applied to each of the display pixels EP via the scanning lines from the scanning driver 120C and the gradation data DP0-DPk (digital signals; referred to as k=3 in this embodiment) supplied via the signal line groups DLz from the data driver 130H; and the organic EL devices OEL (optical elements) perform light generation operation by predetermined luminosity gradation according to the current value of the light generation drive current supplied by the pixel driver circuits DCz.

<<Pixel Driver Circuits>>

The configuration formed in each embodiment of the current generation circuit mentioned above is applied to the pixel driver circuits DCz in this embodiment shown in FIG. 42 which comprises the signal latch section 10*z* (For example, equivalent to the signal latch section 10 in FIG. 1) and the current generation section 20*z* (For example, equivalent to the current generation section 20A in FIG. 1). The signal latch section 10*z* takes in individually and simultaneously the output signals corresponding to the proper gradation data DP0-DP3 containing the gradation data DP0-DP3 in one line periods supplied via each of the signal line groups DLz from the data driver 130H based on the applied timing of the scanning signal Vsel from the scanning driver 120C; and performs by holding the output of the holding signals d10-d13 for a predetermined period corresponding to the proper gradation data DP0-DP3. The current generation section 20*z* integrates the specified gradation currents selected from the above-mentioned holding signals d10-d13 among a plurality of gradation currents generated based on the reference current Iref supplied via the reference current supply line Ls to each of the display pixels EP; and generates the light generation drive current corresponding to the luminosity gradation in each of the display pixels EP which is supplied to the organic EL devices OEL (optical elements). Also, the configuration of this pixel driver circuits DCz is equal to the current generation circuit (Reference FIG. 1) related to this invention. Here, the current latch section 10*z* has a configuration comprising multiple (four sets) latch circuits corresponding to each of the gradation data DP0-DP3, as well as the configuration of the signal latch section 10 shown in FIG. 1. Furthermore, the cathode terminal of the organic EL device OEL is connected to the current output contact OUTi of the current generation section 20*z* while the anode terminal is connected to voltage contact +V connected to the predetermined high potential voltage.

Initially, the drive control operation of the organic EL device OEL in the pixel driver circuits DCz which has such a configuration, while applying a high-level (selection level) scanning signal Vsel to the scanning lines SL, the operation synchronizes with this timing. The gradation data DP0-DP3 consisting of a plurality of digital signal bits corresponding to the display data d0-d3 provided from the display signal generation circuit 160 by the data driver 130H (described later) is then supplied to the signal line clusters DLz.

Accordingly, the gradation data DP0-DP3 are taken in individually and simultaneously for holding at each of the signal input contacts IN0-IN3 of the signal latch section 10*z* which forms part of the pixel driver circuits DCz. The holding signals d10-d13 based on each of the gradation data DP0-DP3 are output to current generation section 20*z*.

The current generation section 20*z*, for example, which is the same as current generation section 20A in the first embodiment of the current generation circuit mentioned above, supplies the light generation drive which is acquired and integrated and then selects only the specified gradation currents from a plurality of gradation currents that have a current value of a predetermined ratio. The specified gradation currents are then generated based on reference current Iref according to a signal level of above-mentioned holding signals d10-d13 to the organic EL devices OEL via the current output contact OUTi (In this embodiment, the light generation drive current flows so it is drawn in the direction of the pixel driver circuits DCz from the organic EL devices OEL side).

Accordingly, the light generation drive current according to the display data d0-d3 (gradation data DP0-DP3) flows in the forward-bias direction into the organic EL devices OEL, and the organic EL devices OEL emit light by predetermined luminosity gradation.

<<Data Driver>>

The data driver 130H, for example, the shift register circuit 131E has a configuration equivalent to the embodiment mentioned above as shown in FIG. 43. Particularly, this configuration comprises the latch circuits 140, the output circuits 141, the system controller 150 (not shown) and the signal generation circuit 160 (not shown). The latch circuits 140 contain a plurality of the latch sections LD1, LD2, LD3, . . . which take in individually and sequentially a plurality of display data d0-d3 bits supplied from the display signal generation circuit 160 (not shown) and hold them based on the input timing of the shift signals SR1, SR2, SR3, . . . from the shift register circuit 131E; and the output circuits 141 contain a plurality of switches SW1, SW2, SW3 which perform the operation to supply collectively the display data d0-d3 in one line periods held in the latch circuits 140 as the gradation data DP0-DP3 via each of the signal line clusters DLz to each of the display pixels EP mentioned above based on an output enable signal WE output from a system controller 150 (not shown).

<<Drive Control Method>>

Next, the operation of the display device which has the configuration mentioned above will be explained with reference to the drawings.

Figure 44:
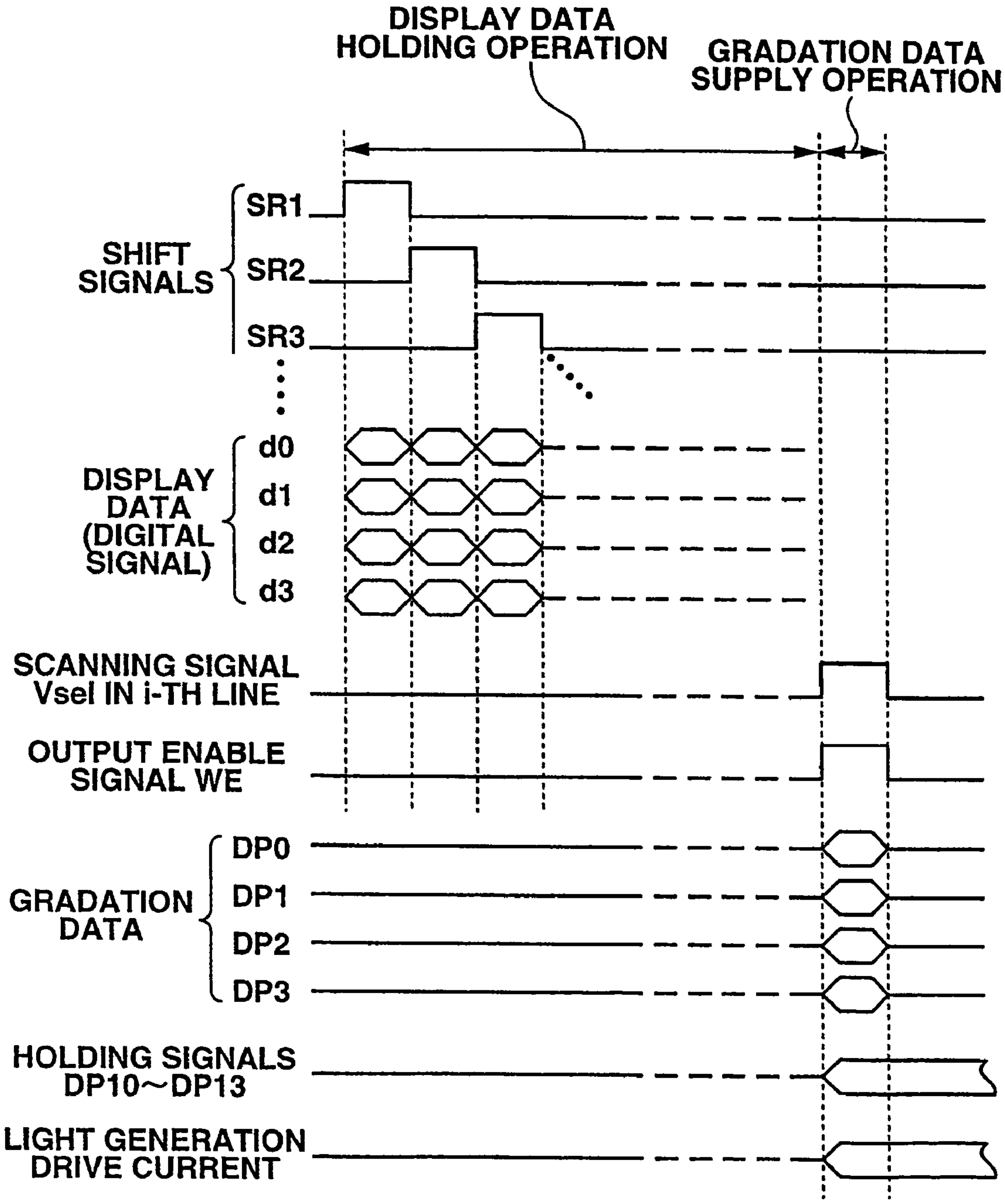
FIG. 44 is a timing chart which shows an example of the drive control operation in the display device in this embodiment.

FIG. 44 is a timing chart which shows an example of the drive control operation in the display device in this embodiment.

Figure 45:
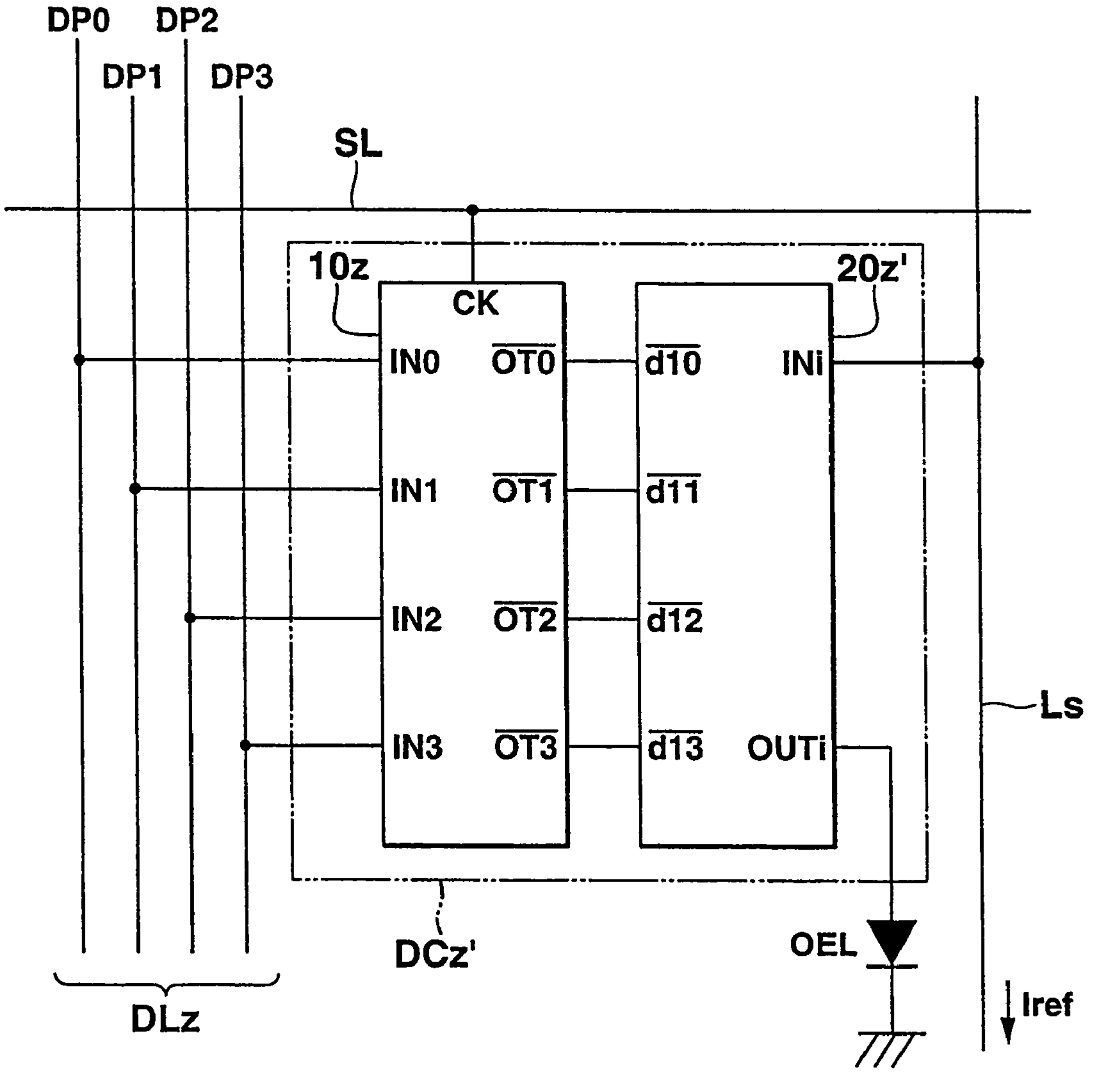
FIG. 45 is a circuit arrangement drawing showing another embodiment of the pixel driver circuit applied to the display device in this embodiment.

FIG. 45 is a circuit arrangement drawing showing another embodiment of the pixel driver circuit applied to the display device in this embodiment.

First, the drive control operation in the data driver 130H, as shown in FIG. 44, performs by setting up the display data holding operation which takes in sequentially the display data d0-d3 supplied to each of the latch sections LD1, LD2, LD3, . . . which form the latch circuit 140 mentioned above from the display signal generation circuit 160, and holds this display data; and a gradation data supply operation supplies collectively the display data d0-d3 taken in by the display holding operation to each of the signal line groups DLz as gradation data DP0-DP3 via each of the switches SW1, SW2, SW3, . . . of the output circuit 141.

Here, the display data holding operation takes in sequentially the display data d0-d3 which shifts in response to each line of the display pixels EP in each of the above-mentioned latch sections LD1, LD2, LD3, . . . based on the shift signals SR1, SR2, SR3, . . . output sequentially from the shift register circuit 131E and the holding operation is continuously performed in one line periods.

Furthermore, in the gradation data supply operation, the signal line groups DLz are supplied collectively via each of the switches SW1, SW2, SW3, . . . by using the display data d0-d3 as the gradation data DP0-DP3 held at each of the above-mentioned latch sections LD1, LD2, LD3, . . . based on the output enable signal WE output from the system controller 150. Here, the gradation data supply operation in the display panel 110E is set up to synchronize with the applied timing of the scanning signal Vsel which selects the display pixels EP of a specified line. Thus, in this embodiment, the gradation data DP0-DP3 (digital signals) based on the display data d0-d3 which consist of a plurality of digital signal bits is supplied to the direct presentation pixels (pixel driver circuits DCz) via each of the signal line clusters DLz arranged in the display panel 110E from the data driver 130H.

In the drive control operation in the display panel 110E (display pixels EP), as shown in FIG. 44, by applying the scanning signal Vsel to the scanning lines SL of a specified line (i-th line) from the scanning driver 120C, the gradation data DP0-DP3 supplied to each of the signal line clusters DLz by the above-mentioned gradation data supply operation from the data driver 130H are taken in and held in the signal latch sections 10*z* formed in each of the display pixels EP (pixel driver circuits DCz), and the holding signals DP10-DP13 based on the gradation data DP0-DP3 are output to the current generation section 20*z*.

Moreover, as mentioned above, based on the reference current Iref and the holding signals DP10-DP13, the current generation section 20*z* generates the light generation drive current according to the display data d0-d3 (gradation data DP0-DP3) and supplies the current to the organic EL devices OEL. Accordingly, the organic EL devices OEL emit light by predetermined luminosity gradation.

Also, the display panel 110E (pixel driver circuits DCz) related to this embodiment, as shown in FIG. 41, is set to the same circumstances shown in each embodiment that has a configuration whereby a plurality of display pixels EP (pixel driver circuits DCz) are connected to a common reference current supply line Ls supplied by reference current Iref from the current generator IR as shown in FIG. 44. Since the light generation drive current to each of the organic EL devices OEL is generated simultaneously based on the gradation data DP0-DP3 in each of the pixel driver circuits DCz synchronizing with timing applied by the scanning signal Vsel that selects the display pixels EP of a specified line, the current supplied to the display pixels EP (pixel driver circuits DCz) of each line via the reference current supply line Ls is not the reference current Iref itself supplied from the current generator IR. This current will have a current value (Iref/m) by which almost equal division was performed and supplied according to the number (For example, m lines) of the display pixels EP (pixel driver circuits DCz) of each line.

Sequential execution of a series of the above drive control operations is performed on each and every line that forms the display panel 110E. Furthermore, the light generation operation (supply operation of the light generation drive current) of the organic EL devices OEL of each line is continuously held by the pixel driver circuits DCz until the next scanning signal Vsel is applied.

Therefore, set to the display device 100C related to this embodiment, via each of the signal line groups DLz arranged in the display panel 110E from the data driver 130H, the gradation data DP0-DP3 consisting of a plurality of digital signal bits corresponding to the display data d0-d3 are directly supplied directly to the display pixels EP (pixel driver circuits), and set to the pixel driver circuits. Because the light generation drive current consists of an analog signal generated based on the reference current Iref supplied via a common reference current supply line Ls from a current generator IR (current composed of reference current Iref that is equally divided by the relevant number of write-in current generation circuits), as compared with a configuration which supplies write-in current that constitutes the display pixels EP from analog current and used abundantly in conventional technology, as well as the effects of signal level degradation, external noise and the like all can be markedly improved upon to offset these negative influences. As a direct result of this invention, the signal-to-noise (S/N) ratio can be improved, the light generation operation of the organic EL devices (light emitting elements) can also be accomplished by the appropriate luminosity gradation corresponding to the display data, and enhancement in the display image quality can be achieved as well.

In addition to the embodiment and circumstances which were mentioned above, regarding the signal lines relevant to the light generation operation in the display pixels, because it does not have a configuration which flows an analog signal that changes signal levels, this alleviates the limitation on the operating speed resulting from the charge and discharge operation of the signal lines, as well as enhancing the display response characteristics in the display device comprising the data driver to achieve remarkable display image quality.

In the embodiment mentioned above concerning the display pixels EP, despite the fact the configuration corresponding to the current sinking method flows the light generation drive current generated by the pixel driver circuits DCz in the direction drawn from the organic EL devices OEL side, this invention is not limited to this applies to the configuration shown in FIGS. 4-5 mentioned above and shown in FIG. 45. Thus, the configuration corresponding to a current application method which supplies the light generation current generated by the pixel driver circuits DCz so it flows (pours) in the direction of the organic EL devices OEL from the current generation section 20*z* is also applicable. Moreover, in the configuration (Reference FIG. 41) of the display device as illustrated in the embodiment mentioned above, the other end side (+V connection side) of the current generator is connected to the low potential voltage (voltage to ground), and it is set up so the reference current Iref may be drawn in this low potential voltage direction from the display panel (display pixels EP) side.

Subsequently, another example of the configuration in the display device concerning this embodiment will be explained.

In the above, where the configuration of the first or the second embodiment of the current generation circuit mentioned above were applied to the pixel driver circuits DCz or DCz' and explained. However, this invention is not restricted to this and can be applied to the configuration in the third or fourth embodiment of the current generation circuit stated above to the pixel driver circuits DCz or DCz' as other examples of the configuration. When the display data constitutes a specified value, the circuit can be equipped with the organic EL devices OEL (optical elements) which are configured to supply a specified voltage Vbk (black display voltage) or a specified voltage Vr (reset voltage) the same as the fourth through eighth embodiments of the data driver mentioned above. These example display device and pixel driver circuit configurations are shown in FIGS. 46-47.

Figure 46:
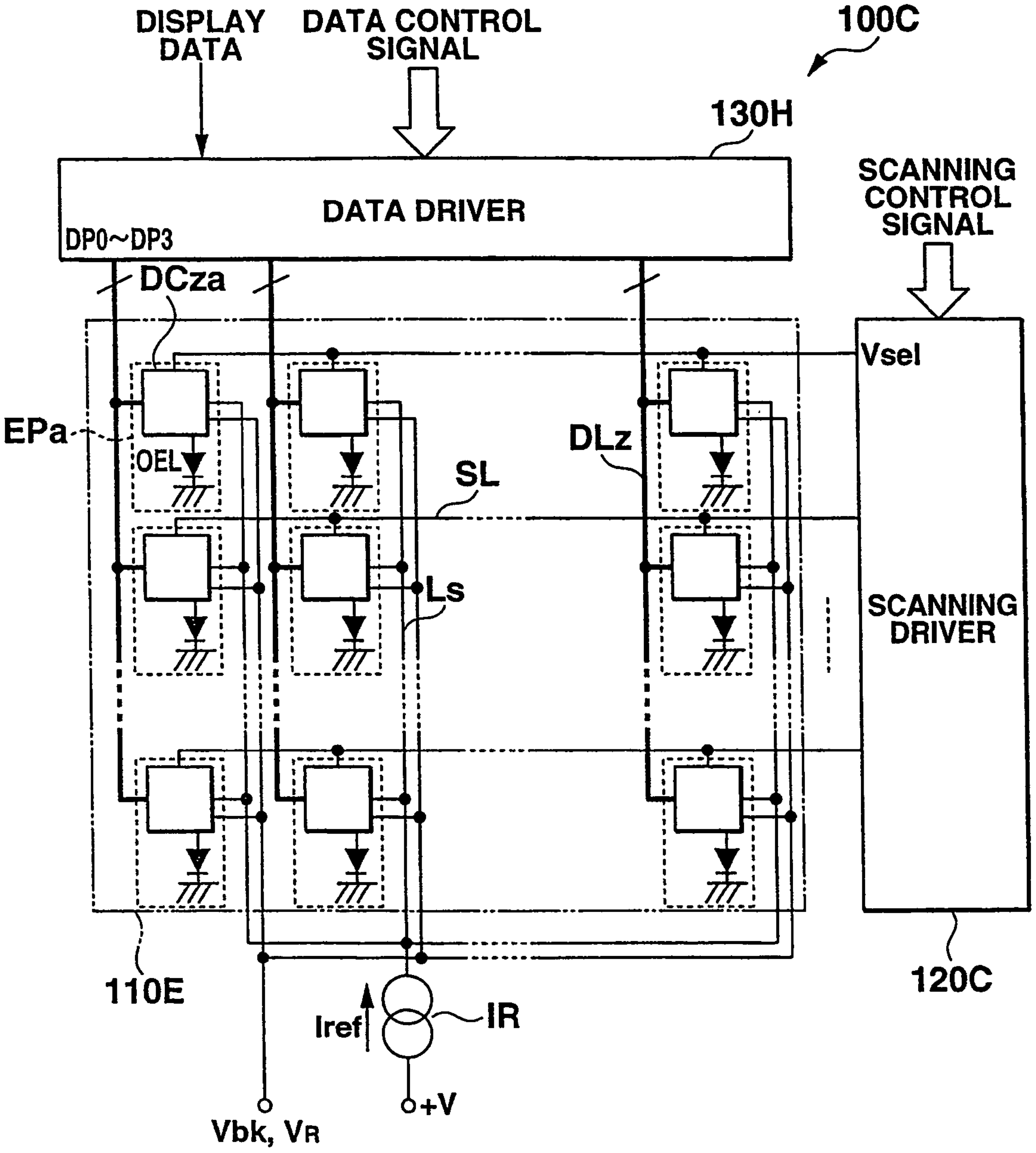
FIG. 46 is an outline block diagram showing another example of the configuration in the display device of this embodiment.

FIG. 46 is an outline block diagram showing another example of the configuration in the display device of this embodiment.

Figure 47:
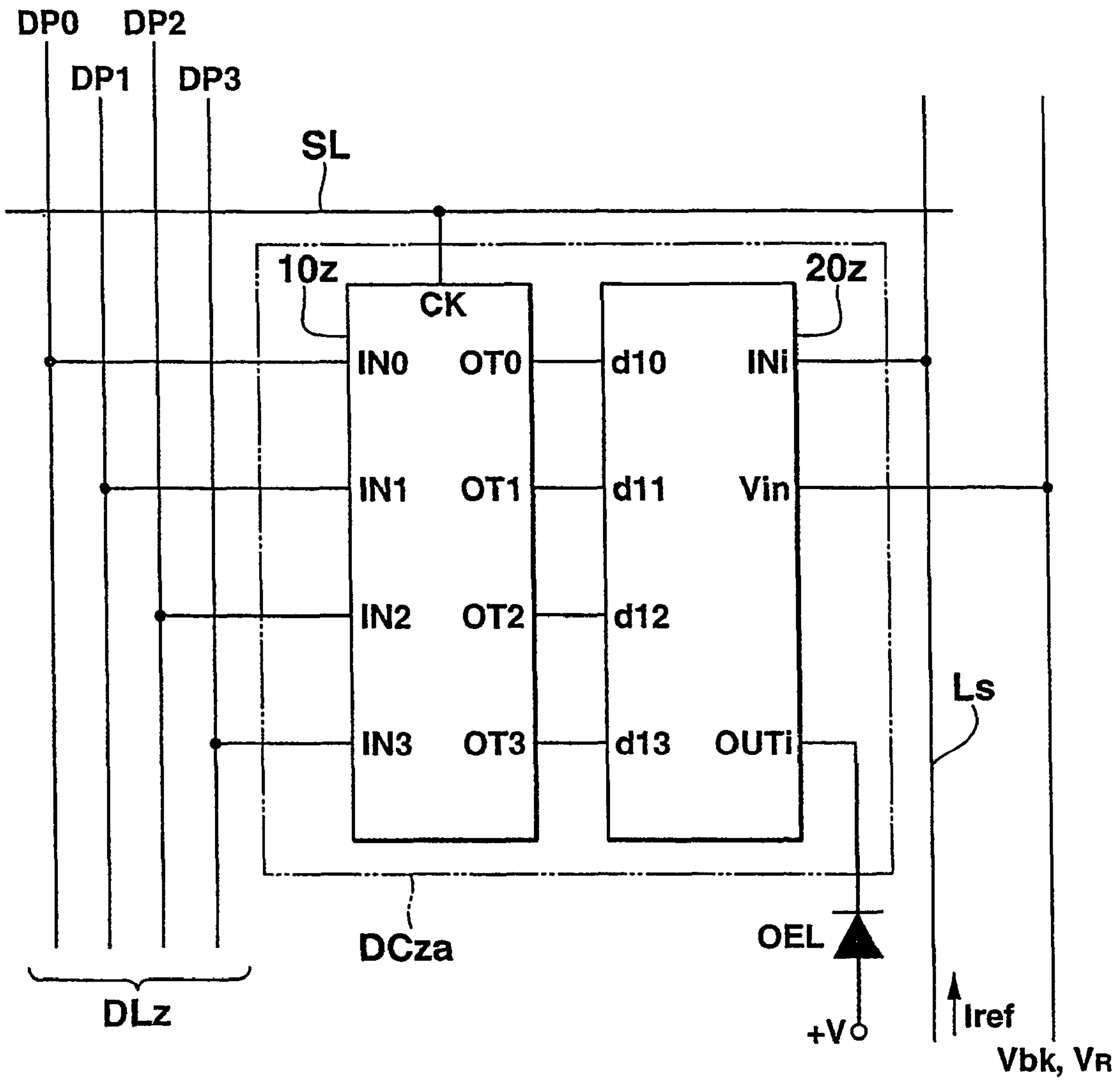
FIG. 47 is a circuit arrangement drawing showing another embodiment of the pixel driver circuit applied to the display device in this embodiment.

FIG. 47 is a circuit arrangement drawing showing another embodiment of the pixel driver circuit applied to the display device in this embodiment.

Specifically, the display panel 110E' as shown in FIG. 46 as opposed to the configuration of the display panel 110E in FIG. 41 mentioned above, the specified voltage (black display voltage Vbk or reset voltage Vr) is supplied externally and wired for applying the specified voltage to each of the display pixels EPa. Each of the display pixels EPa comprise a configuration equal to the third or fourth embodiments of the current generation circuit mentioned above and shown in FIG. 47, which have a circuit arrangement provided with pixel driver circuits DCza comprising an input terminal Vin for the specified voltage Vbk or Vr. In the case of these circumstances in the fourth through eighth embodiments of the data driver stated above, when the display data consists of a specified value, it is a specified voltage to the organic EL devices OEL (optical elements) supplied as the black display voltage Vbk or the reset voltage Vr.

In each embodiment mentioned above which applied a 4-bit digital signal for the display data, while the case example performed the display operation of $2^4$=16 gradations, needless to say this invention is not restricted to this and can be applied to an image display of many more gradations.

Furthermore, though in the case explained where the current generation circuit related to this invention was applied to the data driver or the pixel driver circuits of the display device in the embodiment mentioned above, the present invention is not limited to such an example of application. For example, such as a printer head arranged and formed with a lot of light emitting elements. By supplying current which has a predetermined current value, this invention also can be applied advantageously to a driver circuit of a device comprising multifunctional elements which operates in a state of predetermined drive according to that current value.

<<The Configuration of the Field-Effect Transistors>>

Next, the configuration of the Thin-Film Field-Effect Transistors applicable to the current generation circuit related to this invention, and the pixel driver circuit formed in the display panel of the display device will be explained.

Figure 48A:
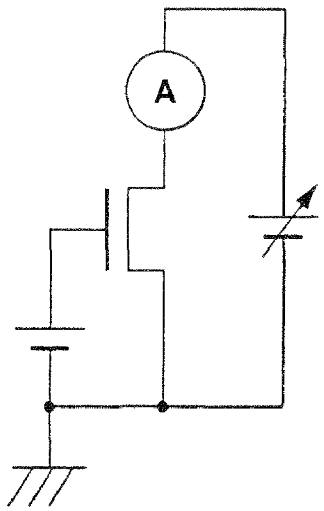
FIG.48A PRIOR ART
FIGS. 48A-48B are drawings showing the basic circuit and voltage-current characteristics of an Nch Thin-Film Field-Effect Transistor in a conventional configuration.
Figure 48B:
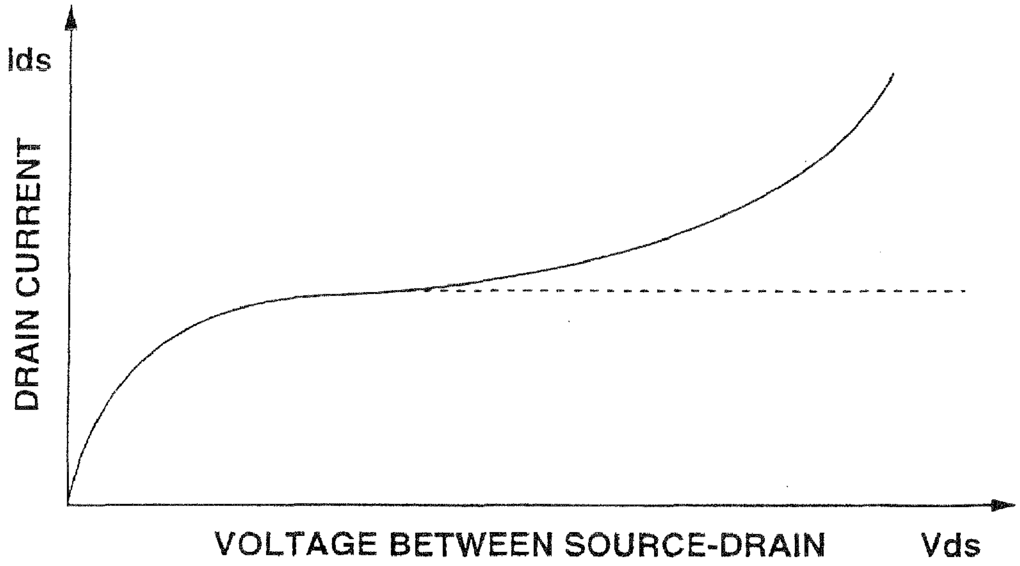
FIG.48B PRIOR ART

FIGS. 48A-48B are drawings showing the basic circuit and voltage-current characteristics of an Nch Thin-Film Field-Effect Transistor in a conventional configuration.

Figure 49A:
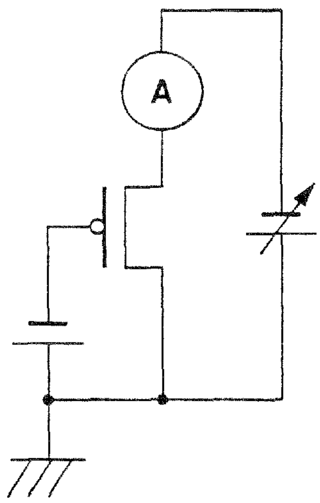
FIG.49A PRIOR ART
FIGS. 49A-49B are drawings showing the basic circuit and voltage-current characteristics of a Pch Thin-Film Field-Effect Transistor in a conventional configuration.
Figure 49B:
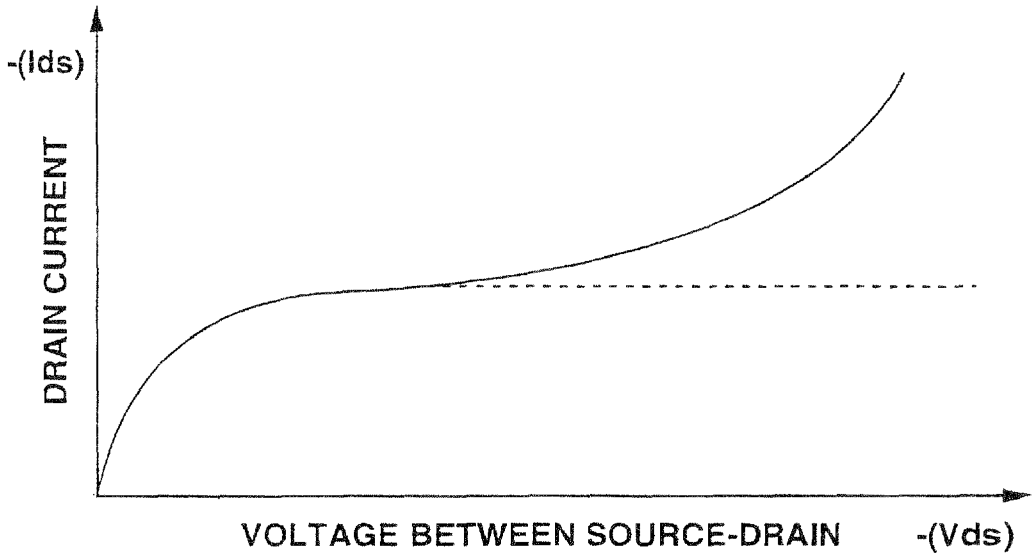
FIG.49B PRIOR ART

FIGS. 49A-49B are drawings showing the basic circuit and voltage-current characteristics of a Pch Thin-Film Field-Effect Transistor in a conventional configuration.

Each of the write-in current generation circuits which forms the data driver in each of the embodiments mentioned above (current generation circuits) or set to a pixel driver circuit (current generation section) which forms the display panel, for example, as shown in FIG. 3, FIG. 5, FIG. 16 and FIG. 21 set as a configuration for the pixel driver circuits comprised of Nch (n-channel type) or Pch (p-channel type) Thin-Film Field-Effect Transistors (also commonly known as a FET; and when including the terminology Thin-Film Transistor known as a TFT); and a current mirror circuit comprised reference current transistors and gradation current transistors.

Here, the dashed lines in FIGS. 48B and 49B, show ideally the Thin-Film Nch transistors which form the current mirror circuit or the pixel driver circuit for light generation drive, as well as show the voltage current-characteristics of the Thin-Film Pch transistors required for the saturation inclination for the voltage Vds between the source-drain consisting of constant drain current in a specified voltage region (saturation voltage region). However, as shown in FIGS. 48A and 49A to substantiate using a basic circuit and, actually, as shown in FIGS. 48B and 49B as a continuous line, once the drain current shows a saturation inclination with buildup of the voltage Vds between the source-drain, the inclination increases gradually as shown. This, for example, is in view of the fact that there have been beneficial improvements in the speed, low-power consumption, high integration and the like in recent years. The Field-Effect Transistor and the like which has a silicon-on-insulator (SOI) semiconductor layer configuration has progressed rapidly through research and development. By means of inducing collision ionization near the isolation region where the electric field concentrates and as a result of flowing in (pouring in) and accumulation (floating substrate effect) of the carrier (An Nch>n-channel type transistor with an electron deficiency or hole and a Pch>p-channel type transistor electron) accordingly generated in the channel region (Equivalent to body region), the threshold voltage falls and drain current increases which is thought to be based on the "Kink" phenomenon (a parasitic phenomenon called "Kink" consisting of a threshold voltage shift).

Therefore, the favorable saturation characteristics of the drain current (voltage-current characteristic) are no longer acquired according to the increased phenomenon of the drain current by such kink phenomenon, and set in a current mirror circuit. In a current generation circuit which requires the ratio of the current value of the gradation current to reference current for the desired design value. That is, the embodiments mentioned above are not set up as the ratio of the channel width of the transistor, and the current values of the write-in current and luminescent drive current at the time of a light generation operation differ in the transistor for the luminescent drive. Therefore, light generation operation in each of the display pixels may be performed by the suitable luminosity gradation based on the display data, and degradation of the display image quality may be caused.

Hereinafter, the transistor for the light drive in the pixel circuits DCy will be explained. Accordingly, explanation will also refer to the pixel driver circuit DCy shown in FIG. 21.

Figure 50A:
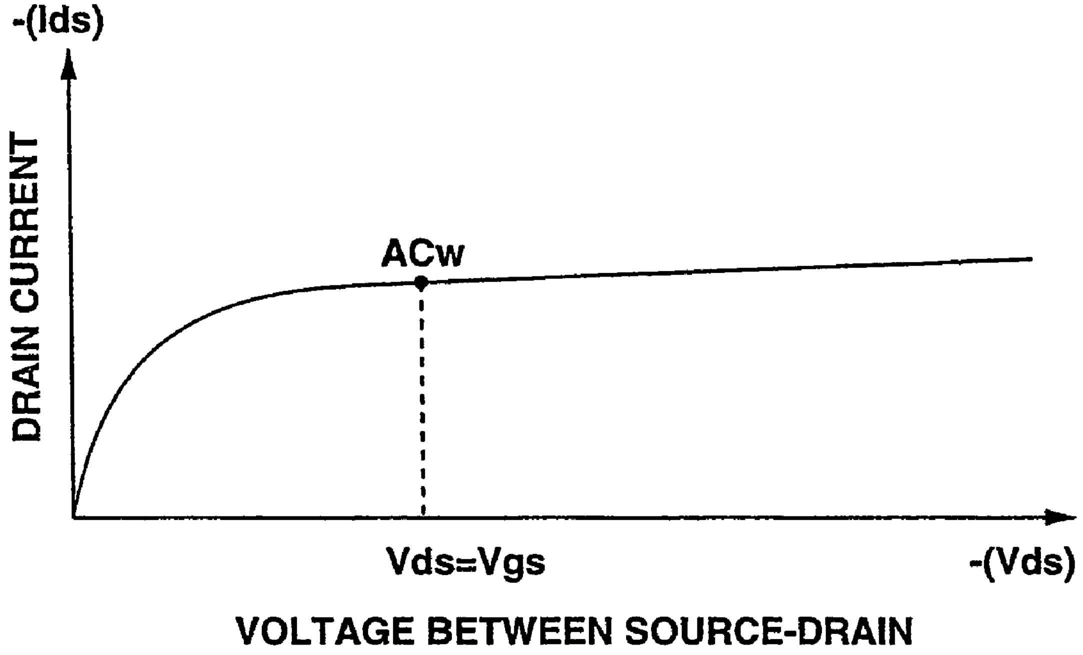
FIGS. 50A-50B are drawings showing the connection between the voltage-current characteristics in the transistor for the light generation drive (Pch transistor), and the current value of the drain current (light generation drive current) which is set at the time of the write-in operation and the light generation operation.
Figure 50B:
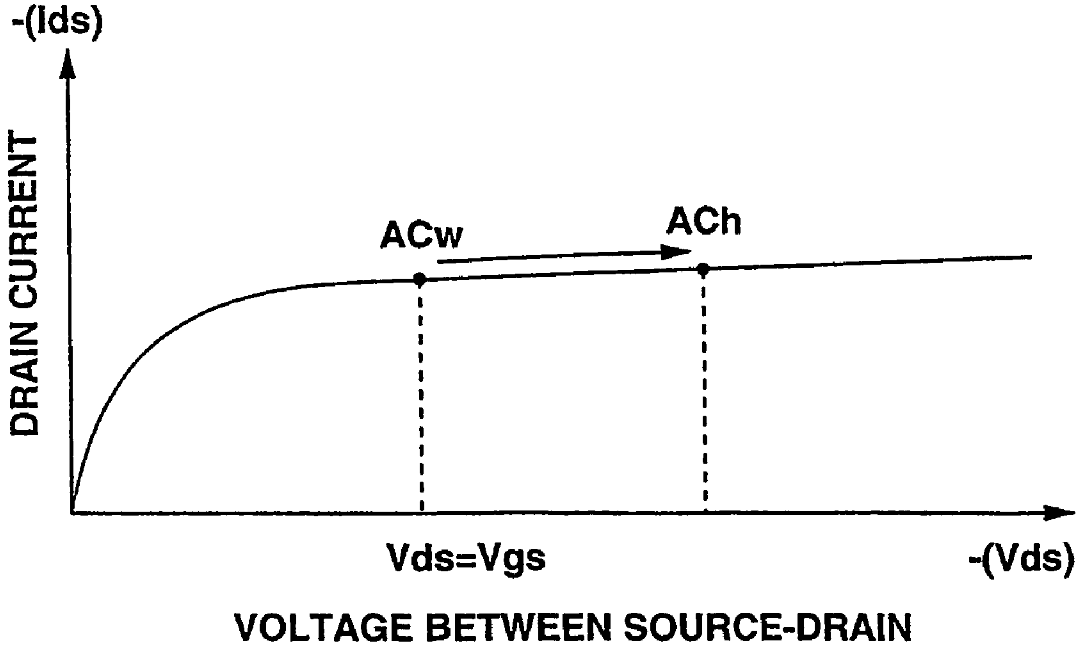

FIGS. 50A-50B are drawings showing the connection between the voltage-current characteristics in the transistor for the light generation drive (Pch transistor) and the current value of the drain current (light generation drive current) which can be set at the time of the write-in operation and the light generation operation. Specifically, because the Pch transistor Tr81 performs "OFF" operation and the Nch transistors Tr82 and Tr84 perform an "ON" operation in the pixel driver circuits DCy shown in FIG. 21 by applying a high-level scanning signal Vsel to the scanning lines SL at the time of the write-in operation as mentioned above, the write-in current Ipix flows into the organic EL devices OEL via the Nch transistor Tr82 and the Pch transistor Tr83. At this time, because the Nch transistor Tr84 is in an "ON" state, the voltage between gate-source Vgs of the Pch transistor Tr83 (between contacts Nya-Nyb) and the voltage between source-drain Vds (between contacts Nya-Nya) become the same. The operating point on the voltage-current characteristic curve at this time constitutes ACw within the region. For example, FIG. 50A shows the saturation characteristics.

Conversely, at the time of light generation operation, because the Pch transistor Tr81 performs and "ON" operation and the Nch transistors Tr82 and Tr84 perform and "OFF" operation, by applying the scanning signal Vsel of a low-level to the scanning lines SL, the light generation drive current flows into the organic EL devices OEL via the Pch transistors Tr81 and Tr83 from the high potential voltage connected to the voltage contact +V. Since the Nch transistor Tr84 is in an "OFF" state at this point, the gate voltage (potential of contact Nyb) of the Pch transistor Tr83 will be in a floating condition. As for the voltage between the gate-source of the Pch transistor Tr83, the potential at the time of the write-in operation ahead of the scanning signal Vsel switches over and is held as the electric charge accumulated in capacitor Cy at the time of the above-mentioned write-in operation. Therefore, as shown in FIGS. 50A and 50B, at this time the operating point on the voltage-current characteristics curve becomes ACh which has moved into the low voltage direction (FIG. 50B right side) within the saturation region rather than the operating point ACw. Here, the transition to the operating point ACh from the operating point ACw from being changed within the saturation region is not concerned with the value of the voltage −(Vds) between the source-drain, but of the almost constant drain current −(Ids) flow. Ideally set up at the time of the above-mentioned write-in operation, the current (light generation drive current) which flows into the organic EL devices OEL will be controlled by a current value almost equivalent to the current (write-in current Ipix) held.

However, when it has the characteristics in which the drain current −(Ids) increases gradually as the voltage-current characteristic of Pch transistor Tr83 shown in FIG. 49B and the absolute value of the voltage −(Vds) between the source-drain increases, the current (light generation drive current) which flows into the organic EL devices OEL will become a different value from the current set up at the time of the write-in operation (write-in current Ipix). It will become impossible for this reason, to perform light generation operation of each of the display pixels by the suitable luminosity gradation based on display data.

Then, in this embodiment, in order to control the kink phenomenon which was mentioned above, the present invention configuration applies Thin-Film Transistors (TFTs) which have at least the so-called body terminal configuration, whereby the body region and source region of SOI type Field-Effect Transistors are electrically connected to reference current transistors in current generation circuits, and gradation current transistors together with transistors for light generation drive in pixel driver circuits.

<<Body Terminal Configuration>>

Here, a Pch (p-channel type) transistor which has a body terminal configuration will be described in detail.

Figure 51A:
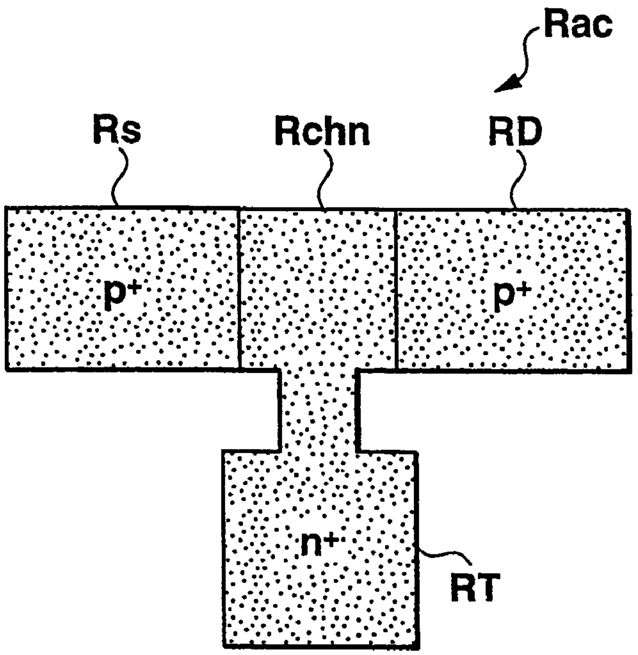
FIGS. 51A-51B are schematic diagrams showing a level surface configuration of a Pch Thin-Film Transistor which has a body terminal configuration.
Figure 51B:
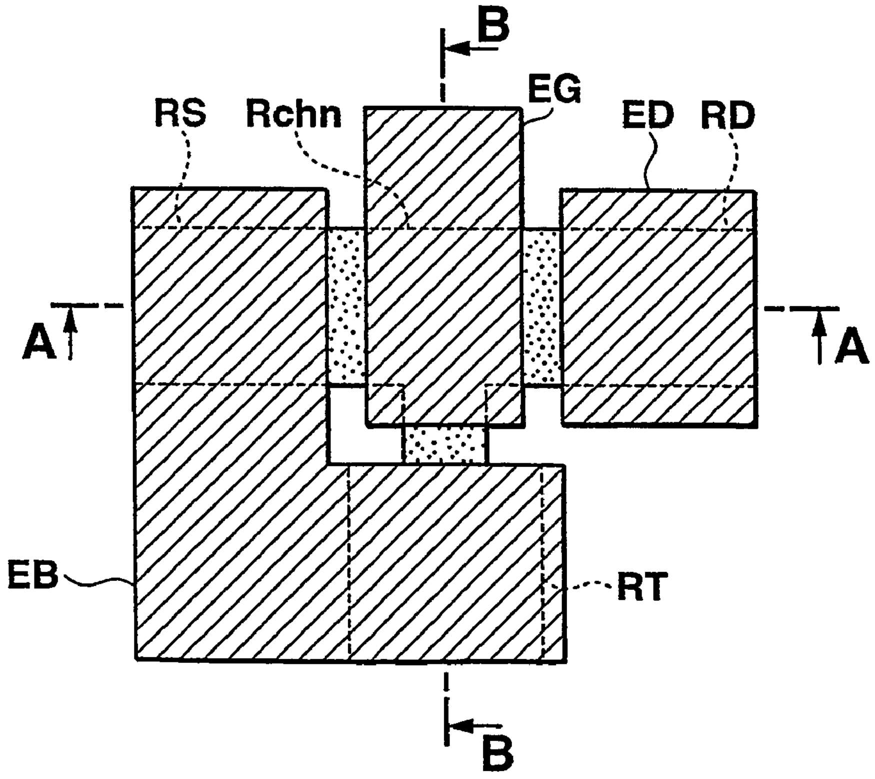

FIGS. 51A-51B are schematic diagrams showing a level surface configuration of a Pch Thin-Film transistor which has a body terminal configuration.

FIGS. 52A-52D are schematic diagrams showing a cross-sectional configuration of a Pch Thin-Film transistor which has a body terminal configuration.

Figure 52A:
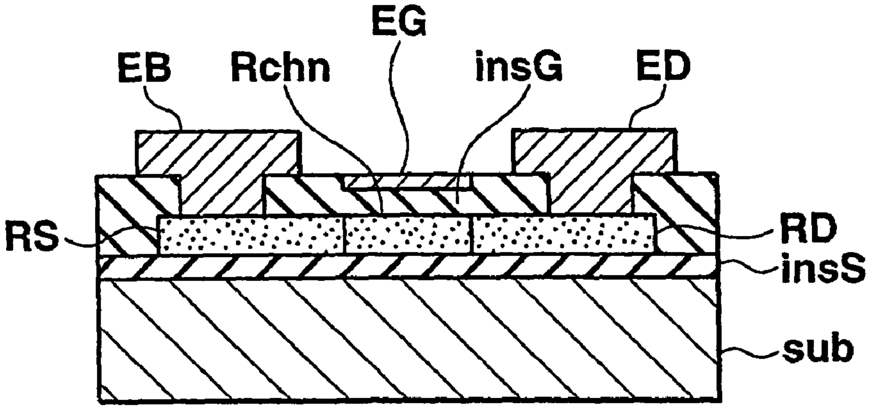
FIGS. 52A-52D are schematic diagrams showing a cross-sectional configuration of a Pch Thin-Film Transistor which has a body terminal configuration.
Figure 52B:
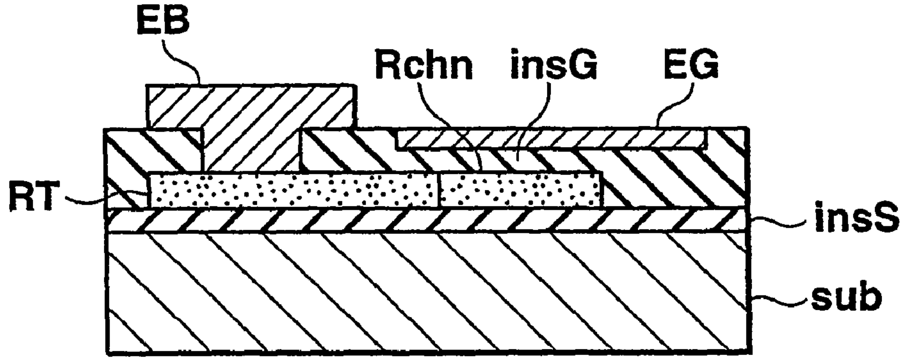
Figure 52C:
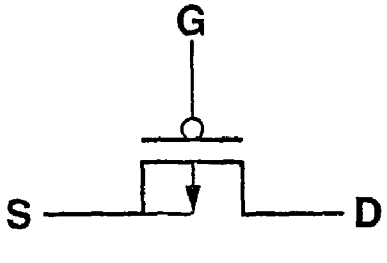
Figure 52D:
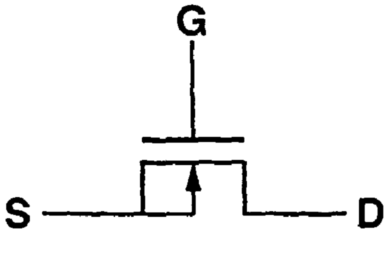

Here, FIG. 51A exhibits the planar structure of the active layer formed on a semiconductor substrate and FIG. 51B expresses a planar structure in the state where the electrode is formed on an active layer. Also, FIG. 52A shows the configuration of the A-A cross-sectional surface of the configuration shown in FIG. 51B. FIG. 52B shows the configuration of the B-B cross-sectional surface of the configuration in FIG. 51B. FIGS. 52C and 52D are circuit notations which show a Pch transistor and an Nch transistor which have a body terminal configuration.

Needless to say, the Field-Effect Transistor that has the body terminal structure shown here may have other transistor structures that have the device characteristics illustrated in the example applications of the current generation circuits or the display device disclosed in this invention, but have equivalent component characteristics.

A Pch (p-channel type) Thin-Film Transistor which has the body terminal configuration as shown in FIG. 51A-51B and FIG. 52A-52B has a configuration comprised of the junction formation terminal region RT (n+) which protrudes from the channel region Rohn in a vertical direction (the up-and-down direction of FIG. 51A) to the opposite axis (horizontal direction of FIG. 51A) of the source region RS and the drain region RD, while the source region RS (p+) and the drain region RD (p+) are formed and separated in an Nch semiconductor layer (active layer Rac) constituted in the entire surface side of silicon and the like on an Nch semiconductor substrate sub via the insulator layer insS across the channel region Rchn (body region).

Additionally, on the upper part the active layer Rac, as shown in FIG. 51B and FIG. 52A-52B, comprises a single body terminal electrode EB provided with ohmic contacts formed in the source region RS and the terminal region RT; the gate electrode EG is formed via the gate insulator layer insG on the upper part of the channel region Rchn; and the drain electrode ED ohmic contact to the drain region RD. An Nch transistor which has such a body terminal configuration is notated with the circuit symbol as shown in FIG. 52C.

Although a Pch type Thin-Film Transistor which has a body terminal configuration mentioned above was explained, an Nch type Thin-Film Transistor which has a body terminal configuration equipped as shown in FIGS. 51A-51B and FIGS. 52A-52B is an almost equivalent configuration. While the source region (n+) and the drain region (n+) are formed in the active layer which consists of a Pch semiconductor layer across the channel region, the terminal region (p+) has a configuration with the junction formation protruding from the channel region. The configuration of the gate electrode, the drain electrode, and the body terminal electrode is the same as that of in the case of the above-mentioned Pch transistor. An Nch transistor which has such a body terminal configuration is notated with the circuit symbol as shown in FIG. 52D.

Figure 53A:
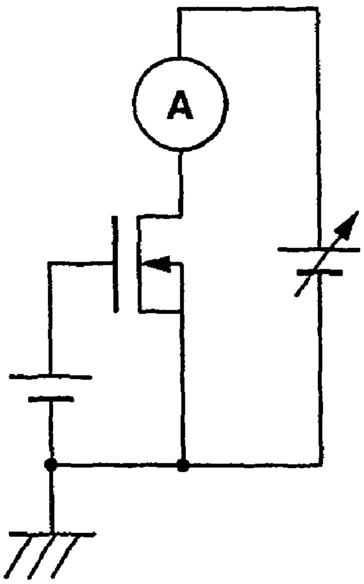
FIGS. 53A-53B are drawings showing the basic circuit of an Nch Thin-Film Transistor which has a body terminal configuration and the voltage-current characteristics.
Figure 53B:
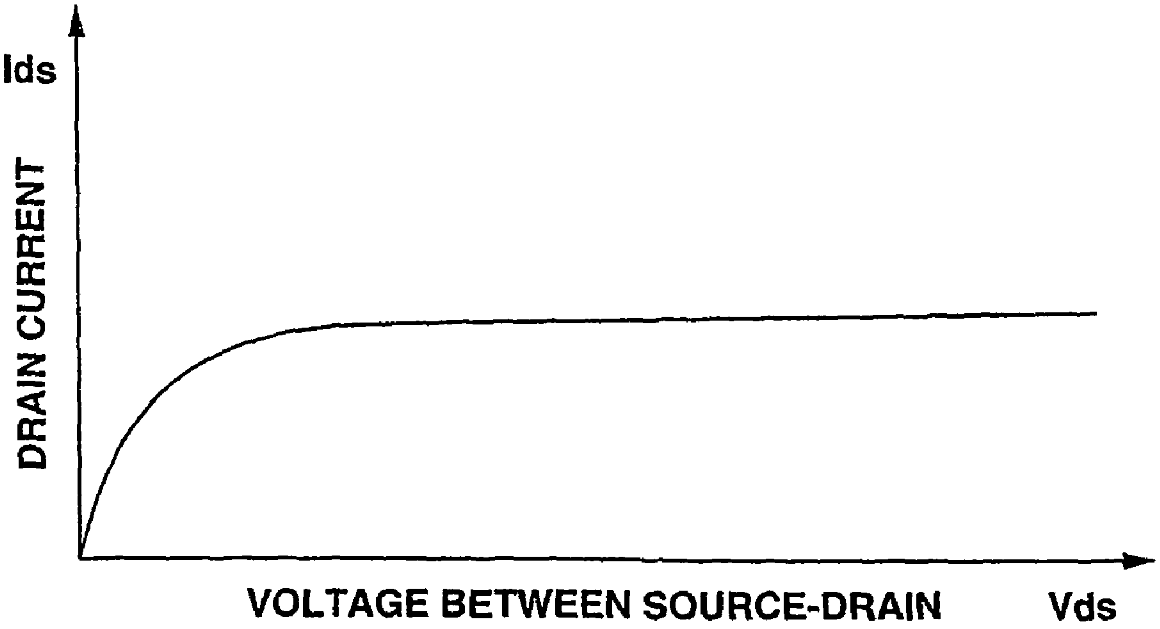

FIGS. 53A-53B are drawings showing the basic circuit of an Nch Thin-Film Transistor which has a body terminal configuration and the voltage-current characteristics.

Figure 54A:
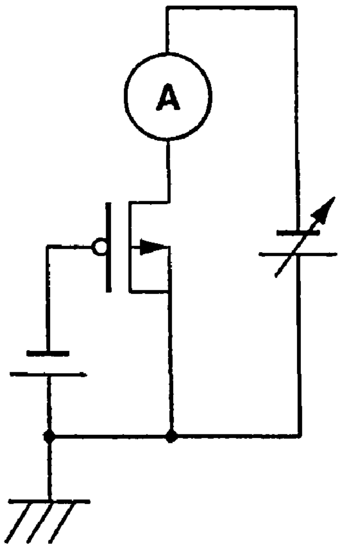
FIGS. 54A-54B are drawings showing the basic circuit of a Pch Thin-Film Transistor which has a body terminal configuration and the voltage-current characteristics.
Figure 54B:
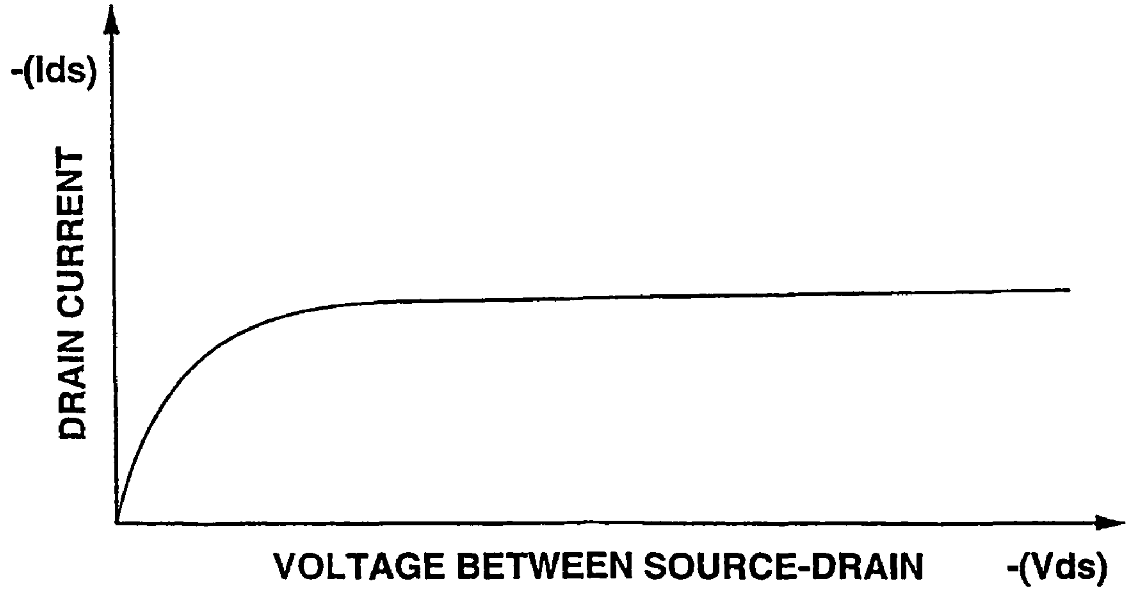

FIGS. 54A-54B are drawings showing the basic circuit of a Pch Thin-Film Transistor which has a body terminal configuration and the voltage-current characteristics.

When verified using a basic circuit as shown in FIG. 53A and FIG. 54A consisting of Nch (n-channel type) transistors which have such a body terminal configuration, and the voltage-current characteristics in Pch (p-channel type) Thin-Film Transistors, as shown in FIG. 53B and FIG. 54B, in the specified voltage region, the voltage Vds, −(Vds) between the source-drain, the drain current Ids, −(Ids) showed a favorable saturation inclination.

This is because generation of the kink phenomenon is controlled as the minority carrier (An Nch>n-channel type transistor with an electron deficiency or hole and a Pch>p-channel type transistor electron) flows into the source region RS via the body terminal electrode EB in the electron and electron hole pairs produced near the boundary of the channel region Rchn and the drain region RD as mentioned above, thus the accumulation to the channel region Rchn is controlled and the decrease in the threshold voltage of a Field-Effect Transistor is alleviated.

Therefore, according to the present invention, the solution is to apply Field-Effect Transistors which have such a voltage-current characteristic to the transistors for light generation drive in the current mirror circuits of the current generation sections in each of the embodiments mentioned above, as well as the pixel driver circuits. Particularly, when configured in the current generation circuits, the data driver of the display devices, the display panels and the like related to this invention, because the write-in current and light generation drive current have a suitable current value corresponding to the current held based on the display data or gradation data are generable. Thus, the light generation operation in each of the display pixels can be performed by a suitable luminosity gradation based on the display data and enhancement in the display image quality can be achieved.

While the present invention has been described with reference to the preferred embodiments, it is intended that the invention be not limited by any of the details of the description thereof.

As this invention may be embodied in several forms without departing from the spirit of the essential characteristics thereof, the present embodiments are therefore illustrative and not restrictive, since the scope of the invention is defined by the appended claims rather than by the description preceding them, and all changes that fall within meets and bounds of the claims, or equivalence of such meets and bounds thereof are intended to be embraced by the claims.

What is claimed is:

1. A display device for displaying image information corresponding to display signals derived from digital signals, the display device comprising:

a display panel comprising a plurality of signal lines and a plurality of scanning lines which intersect perpendicularly with each other and a plurality of display pixels with optical elements arranged near intersecting points of the plurality of signal lines and the plurality of scanning lines;

a scanning driver circuit for sequentially applying a line at a time a scanning signal to each of the plurality of scanning lines for setting the plurality of display pixels in a selective state a line at a time; and a signal driver circuit comprising a plurality of current generation circuits, wherein each of the current generation circuits comprises:

a gradation current generation circuit which generates a plurality of gradation currents corresponding to each bit of the display signals based on a predetermined constant reference current;

a drive current generation circuit which generates a drive current that is selected based on the plurality of gradation currents corresponding to each bit of the display signals, and that is supplied to a corresponding signal line; and a specified state setting circuit which supplies a specified voltage to the corresponding signal line to drive the corresponding optical element in a specified operating state instead of supplying the drive current, when the display signals have a specified value that sets all of the plurality of gradation currents in a non-selection state.

2. The display device according to claim 1, wherein each current generation circuit sets a signal polarity of the drive current so that the drive current flows in a direction drawn from a display pixels side.

3. The display device according to claim 1, wherein each current generation circuit sets a signal polarity of the drive current so the drive current flows in a direction poured into the display pixels.

4. The display device according to claim 1, wherein each of a plurality of current generation circuits in the signal driver circuit is provided corresponding to each of a plurality of the display pixels of each scanning line of the display panel.

5. The display device according to claim 4, wherein the current generation circuits supply the corresponding drive currents simultaneously to each of the plurality of pixels of each scanning line.

6. The display device according to claim 1, wherein each current generation circuit further comprises a signal holding circuit which takes in and holds a display signal.

7. The display device according to claim 6, wherein the drive current generation circuit generates the drive current based on a value of the display signal held in the signal holding circuit.

8. The display device according to claim 6, wherein the signal holding circuit comprises a plurality of latch circuits which take in and hold each bit of the display signals, and outputs an output signal responsive to each bit.

9. The display device according to claim 1, wherein the drive current generation circuit comprises a switching circuit for selecting a current from the plurality of gradation currents in response to each bit value of the display signals.

10. The display device according to claim 9, wherein the current generation circuit further comprises a signal holding circuit for taking in and holding a display signal.

11. The display device according to claim 10, wherein the signal holding circuit comprises a plurality of latch circuits which take in and hold each bit of the display signals and output an output signal responsive to each bit; and wherein the switching circuit selects from the gradation currents and generates the drive current based on the output of the plurality of latch circuits.

12. The display device according to claim 1, wherein a current value of the plurality of gradation currents have a different ratio with respect to each other specified by $2^n$ where n=0, 1, 2 and 3, . . . .

13. The display device according to claim 1, wherein each gradation current generation circuit comprises a plurality of gradation current transistors for generating the plurality of gradation currents.

14. The display device according to claim 13, wherein each of the plurality of gradation current transistors differs in a transistor size and each control terminal thereof is connected in parallel; and wherein the gradation currents flow in a current path of each of the gradation current transistors.

15. The display device according to claim 14, wherein a channel width of each gradation current transistor is set at a different ratio with respect to each other specified by $2^n$ where n=0, 1, 2 and 3, . . . .

16. The display device according to claim 13, wherein each gradation current generation circuit comprises a reference voltage generation circuit for generating a reference voltage based on the constant reference current.

17. The display device according to claim 16, wherein the reference voltage generation circuit comprises a reference current transistor for generating the reference voltage for control terminals;

wherein the reference current is supplied to a current path; and wherein a reference current transistor control terminal is connected in common to the control terminals of the plurality of gradation current transistors.

18. The display device according to claim 17, wherein the reference current transistor and the plurality of gradation current transistors constitute a current mirror circuit.

19. The display device according to claim 17, wherein at least any one of the reference current transistor and the plurality of gradation current transistors has a transistor structure which comprises:

a channel region in a semiconductor layer formed by an insulator layer in an entire surface side of a semiconductor substrate, a source region and a drain region formed across the channel region, a terminal region formed and projected from the channel region in a vertical direction toward an opposite axis of the source region and the drain region;

a gate electrode formed by a gate insulator layer on said channel region;

a drain electrode electrically connected to the drain region; and a single body terminal electrode electrically connected to the source region and the terminal region.

20. The display device according to claim 1, wherein each gradation current generation circuit further comprises a reference voltage generation circuit for generating a reference voltage based on the constant reference current.

21. The display device according to claim 20, wherein the reference voltage generation circuit comprises an electric charge storage circuit for storing an electric charge in response to a current component of the reference current.

22. The display device according to claim 1, wherein the signal driver circuit comprises:

a reference current supply line for supplying the reference current; and a structure in which the reference current is supplied to the plurality of gradation current generation circuits via the reference current supply line.

23. The display device according to claim 22, wherein each gradation generation circuit comprises a supply control switching circuit for controlling a supply state of the reference current from the reference current supply line to the gradation current generation circuit; and wherein the supply control switching circuits selectively perform switching control so the reference current may be supplied only to any one gradation current generation circuit of the plurality of gradation current generation circuits.

24. The display device according to claim 23, wherein each current generation circuit comprises a signal holding circuit for taking in and holding a display signal.

25. The display device according to claim 24, wherein a supply control switching circuit timing of the switching control synchronizes with a timing of the signal holding circuit of taking in and holding the display signal.

26. The display device according to claim 1, wherein the specified voltage is a voltage which drives the corresponding optical element in a minimum gradation state.

27. The display device according to claim 1, wherein the specified state setting circuit comprises:

a specified digital value judgment section for judging whether or not the display signals have the specified value, and a specified voltage application section for applying the specified voltage to the corresponding signal line based on a result of the judgment by the specified digital value judgment section.

28. The display device according to claim 27, wherein the specified digital value judgment section performs the judgment of whether or not said display signals have the specified value based on a logical sum of each bit value of the digital signals of the display signals.

29. The display device according to claim 1, wherein each current generation circuit further comprises a reset circuit for applying a predetermined reset voltage to the corresponding signal line in advance of a timing when the drive current is supplied to the signal line.

30. The display device according to claim 29, wherein the reset voltage is at least a low potential voltage for discharging an electric charge stored up in a capacitative element attached to the corresponding optical element in the corresponding display pixel, and for initializing the optical element.

31. The display device according to claim 29, wherein the drive current is generated by selecting the gradation currents according to each bit of the display signals; and wherein the reset voltage is applied when a display signal specified value presupposes non-selection of all of the plurality of gradation currents.

32. The display device according to claim 31, wherein the reset circuit comprises:

a specified digital value judgment section for judging whether or not the display signals have the specified value; and a reset voltage application section for applying the reset voltage to the corresponding signal line based on a result of the judgment by the specified digital value judgment section.

33. The display device according to claim 32, wherein the specified digital value judgment section performs the judgment of whether or not the display signals have the specified value based on a logical sum of each bit value of the digital signals of the display signals.

34. The display device according to claim 1, wherein the optical elements in the display pixels comprise light emitting elements for accomplishing a light generation operation by way of luminosity gradation according to a current value of the supplied drive currents.

35. The display device according to claim 34, wherein the light emitting elements comprise organic electroluminescent elements.

36. The display device according to claim 34, wherein the display pixels comprise at least a pixel driver circuit; and wherein the pixel driver circuit includes:

a voltage holding circuit for holding a voltage component in response to the drive current supplied from the signal driver circuit; and a current supply circuit for supplying luminescent drive current to the corresponding light emitting element based on the voltage component held in the voltage holding circuit and for making the light emitting element emit light.

37. The display device according to claim 36, wherein the pixel driver circuit comprises an electric discharge circuit for discharging an electric charge responsive to the voltage component stored up in the voltage holding circuit.

38. The display device according to claim 36, wherein the current supply circuit comprises a transistor for use of luminescent drive for supplying luminescent current to the corresponding light emitting element, the transistor for use of luminescent drive has a transistor structure which comprises:

a channel region in a semiconductor layer formed by an insulator layer in an entire surface side of a semiconductor substrate;

a source region and a drain region formed across the channel region;

a terminal region formed and projected from the channel region in a vertical direction toward an opposite axis of the source region and the drain region;

a gate electrode formed by a gate insulator layer on the channel region;

a drain electrode electrically connected to the drain region; and a single body terminal electrode electrically connected to the source region and the terminal region.

39. A method for driving a display device which displays image information corresponding to display signals derived from digital signals on a display panel comprising a plurality of display pixels provided with optical elements arranged near intersecting points of a plurality of signal lines and a plurality of scanning lines, the method comprising:

taking in and holding the display signals corresponding to the plurality of display pixels;

generating a plurality of gradation currents corresponding to each bit of the display signals based on a predetermined constant reference current;

generating a drive current selected based on the plurality of gradation currents corresponding to each bit of the display signals held;

supplying the generated drive current to the corresponding signal line;

judging whether or not the display signals have a specified value that sets all of the plurality of gradation currents in a non-selection state; and when it is judged that the display signals have the specified value, supplying a specified voltage to the corresponding signal line to drive the corresponding display pixel in a specified operating state instead of supplying the generated drive current.

40. The method for driving the display device according to claim 39, wherein a current value of the plurality of gradation currents have a different ratio with respect to each other specified by $2^n$ where n=0, 1, 2, and 3, . . . .

41. The method for driving the display device according to claim 39, wherein the drive current is generated by selecting and integrating the corresponding gradation currents in response to each bit value of the display signals.

42. The method for driving the display device according to claim 39, wherein a signal polarity of the drive current is set so the drive current flows in a direction drawn from a display pixel side.

43. The method for driving the display device according to claim 39, wherein a signal polarity of the drive current is set so the drive current flows in a direction poured into the display pixels.

44. The method for driving the display device according to claim 39, wherein the optical elements in the display pixels comprise light emitting elements which accomplish light generation operation by way of luminosity gradation according to a current value of the supplied drive currents.

45. The method for driving the display device according to claim 44, wherein the light emitting elements comprise organic electroluminescent elements.

46. The method for driving the display device according to claim 44, further comprising:

holding a voltage component corresponding to the drive current; and supplying a luminescent drive current to the corresponding light emitting element based on the held voltage component thereby making the light emitting element emit light.

47. The method for driving the display device according to claim 39, wherein the specified voltage is a voltage setting which drives the corresponding optical element in a minimum gradation state.

48. The method for driving the display device according to claim 39, further comprising applying a predetermined reset voltage to the signal lines at the timing before applying the drive current to each signal line.

49. The method for driving the display device according to claim 48, wherein the reset voltage is at least a low potential voltage for initializing each load and discharging a charge stored up in a capacitative element attached to each load.

50. The method for driving the display device according to claim 49, wherein the drive current is generated by selecting the gradation currents according to each bit of the display signals, and wherein the reset voltage is applied when the display signals have the specified value which presupposes non-selection of all of the gradation currents.

51. The method for driving the display device according to claim 50, further comprising:

judging whether the display signals have the specified value or not, and applying the reset voltage to the corresponding signal line when it is judged that the display signals have the specified value.

52. The method for driving the display device according to claim 39, further comprising discharging a charge stored up in a capacitative element attached to the optical elements in the display pixels at a timing before applying the drive current to each signal line.

* * * * *